(12) United States Patent
Yano

(10) Patent No.: US 10,447,701 B2
(45) Date of Patent: Oct. 15, 2019

(54) AUTHENTICATION SYSTEM, OPERATING APPARATUS, AND AUTHENTICATION METHOD

(71) Applicant: Shunsuke Yano, Kanagawa (JP)

(72) Inventor: Shunsuke Yano, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 150 days.

(21) Appl. No.: 15/451,582

(22) Filed: Mar. 7, 2017

(65) Prior Publication Data

US 2017/0272446 A1  Sep. 21, 2017

(30) Foreign Application Priority Data

Mar. 18, 2016 (JP) ................................. 2016-055808
Mar. 18, 2016 (JP) ................................. 2016-055809

(51) Int. Cl.
*H04L 29/06* (2006.01)
*G06F 3/12* (2006.01)
(Continued)

(52) U.S. Cl.
CPC .......... *H04L 63/102* (2013.01); *G06F 1/3284* (2013.01); *G06F 3/1222* (2013.01);
(Continued)

(58) Field of Classification Search
None
See application file for complete search history.

(56) References Cited

U.S. PATENT DOCUMENTS 10,089,220 B1 * 10/2018 McKelvie ................. G06F 9/50
2010/0115268 A1 * 5/2010 Kudo .................. H04L 63/0815
713/156

(Continued)

FOREIGN PATENT DOCUMENTS

JP  2007-179509  7/2007
JP  2009-288971  12/2009

(Continued)

OTHER PUBLICATIONS

Siddhartha Chhabra, Yan Solihin, i-NVMM: A Secure Non-Volatile Main Memory System with Incremental Encryption, 2011, ISCA'11, Jun. 4-8, 2011, San Jose, California, USA. pp. 177-188. (Year: 2011).*

(Continued)

*Primary Examiner* — Luu T Pham
*Assistant Examiner* — Edward X Long
(74) *Attorney, Agent, or Firm* — IPUSA, PLLC

(57) ABSTRACT

An operating apparatus stores user information including authentication information of users permitted to use a process-carrying-out apparatus; acquires authentication information of a user of the process-carrying-out apparatus; in response, returns a state of the process-carrying-out apparatus from a power saving state into a normal state to carry out a process; carries out authentication of the user based on the authentication information of the user and the stored user information; if the authentication is not successful, requests the process-carrying-out apparatus to carry out authentication the user; if any authentication is successful, permits the use of the process-carrying-out apparatus; and, if the use of the process-carrying-out apparatus is permitted, stores the authentication information of the permitted user.

15 Claims, 39 Drawing Sheets

(51) Int. Cl.
*G06F 1/3234* (2019.01)
*G06F 21/00* (2013.01)
*G06F 21/32* (2013.01)
*G06F 21/34* (2013.01)

(52) U.S. Cl.
CPC .......... *G06F 3/1238* (2013.01); *G06F 3/1285* (2013.01); *G06F 21/00* (2013.01); *G06F 21/32* (2013.01); *G06F 21/34* (2013.01); *H04L 63/0853* (2013.01); *Y02D 10/159* (2018.01); *Y02D 10/1592* (2018.01)

(56) References Cited

U.S. PATENT DOCUMENTS

| | | | | |
|---|---|---|---|---|
| 2014/0282900 | A1* | 9/2014 | Wang | H04L 63/04 726/4 |
| 2015/0358505 | A1* | 12/2015 | Diaz | H04N 1/4413 358/1.14 |
| 2016/0191746 | A1* | 6/2016 | Yokoyama | H04N 1/442 358/1.14 |
| 2016/0224358 | A1* | 8/2016 | Subramanian | G06F 9/45533 |
| 2017/0034143 | A1* | 2/2017 | Pachouri | H04L 63/0815 |

FOREIGN PATENT DOCUMENTS

| | | |
|---|---|---|
| JP | 2010-055524 | 3/2010 |
| JP | 2010-277557 | 12/2010 |
| JP | 2014-060487 | 4/2014 |

OTHER PUBLICATIONS

Vinson Young, et al., Deuce: Write-Efficient Encryption for Non-Volatile Memories, 2015, ASPLOS'15, Mar. 14-18, 2015, Istanbul, Turkey. pp. 33-44. (Year: 2015).*

* cited by examiner

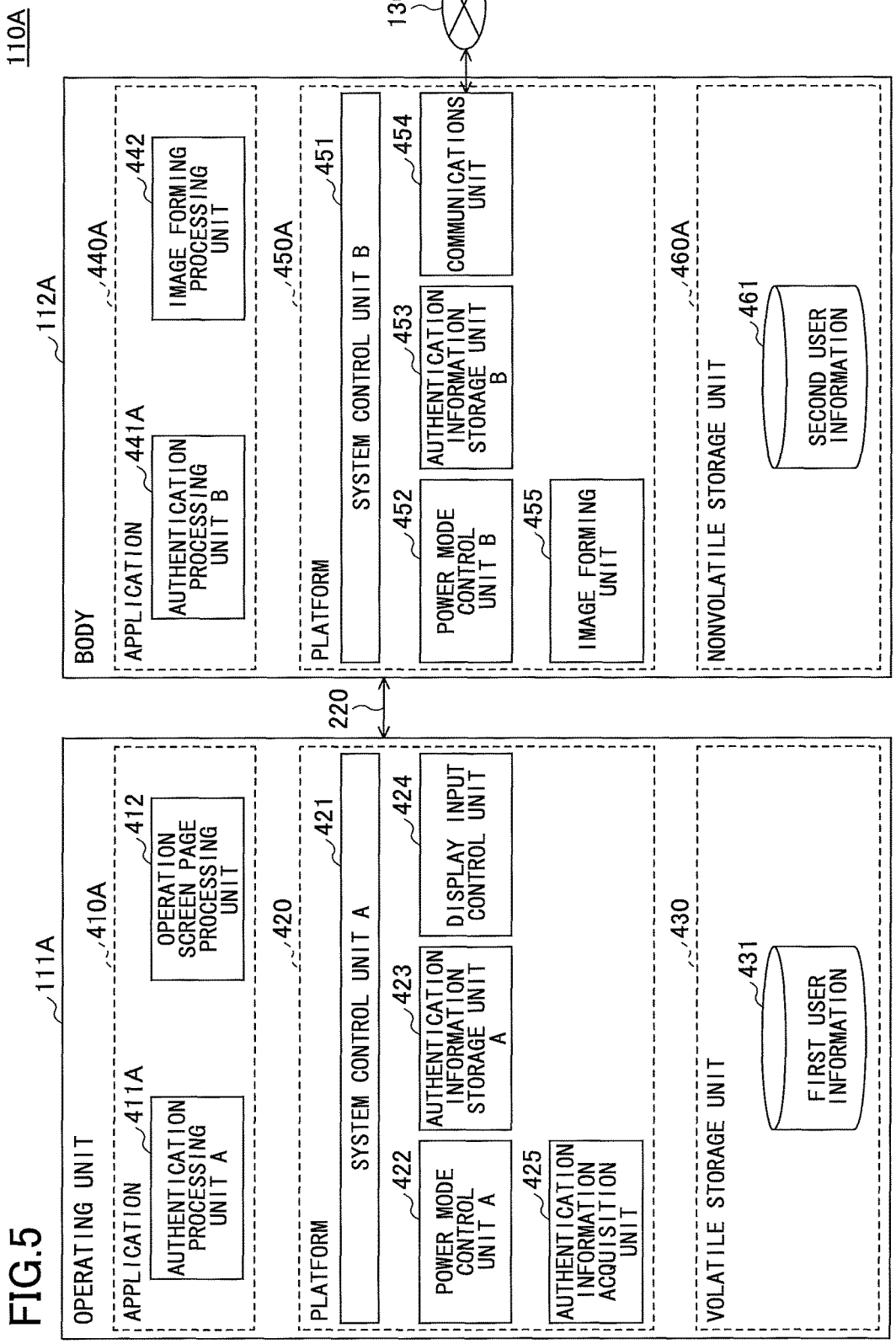

| USER ID | CARD ID | MAIL ADDRESS | ... | FACSIMILE NUMBER | LATEST USED DATE AND TIME |
|---|---|---|---|---|---|
| user001 | card001 | user001@mail | ... | 111-222-333 | 20xx/01/01 10:10:10 |
| user002 | card002 | user002@mail | ... | 444-555-666 | 20xx/01/01 09:00:00 |
| ... | ... | ... | ... | ... | ... |

| CARD ID | USER ID |
|---|---|
| card001 | user001 |
| card002 | user002 |
| ... | ... |

461b

| USER ID | MAIL ADDRESS | FACSIMILE NUMBER | SERVER SYNCHRONIZATION DATE AND TIME | ... | LATEST USED DATE AND TIME |
|---|---|---|---|---|---|
| user001 | user001@mail | 111-222-333 | 20xx/01/01 09:00:00 | ... | 20xx/01/01 10:10:10 |
| user002 | user002@mail | 444-555-666 | 20xx/01/01 09:00:00 | ... | 20xx/01/01 09:00:00 |
| ... | ... | ... | ... | ... | ... |

FIG.8C

| USER ID |
|---|
| user001 |
| user002 |
| ... |

| CARD ID | USER ID |
|---|---|
| card001 | user001 |
| card002 | user002 |
| card022 | user002 |
| ... | ... |

461b

| USER ID | MAIL ADDRESS | FACSIMILE NUMBER | SERVER SYNCHRONIZATION DATE AND TIME | ... | LATEST USED DATE AND TIME |
|---|---|---|---|---|---|
| user001 | user001@mail | 111-222-333 | 20xx/01/01 09:00:00 | ... | 20xx/01/01 10:10:10 |
| user002 | user002@mail | 444-555-666 | 20xx/01/01 09:00:00 | ... | 20xx/01/01 09:00:00 |
| ... | ... | ... | ... | ... | ... |

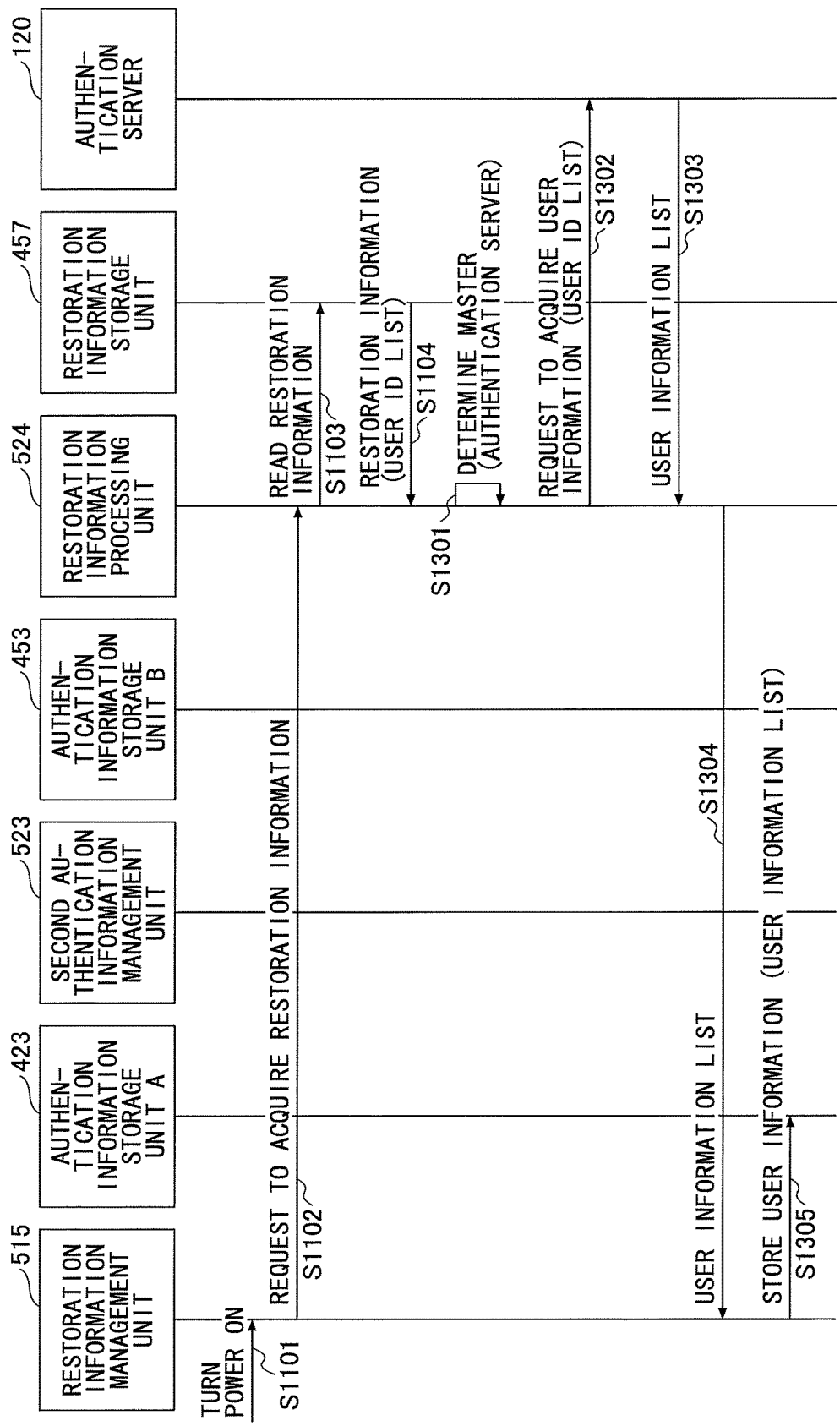

| USER ID | CARD ID | MAIL ADDRESS | FACSIMILE NUMBER | ... | LATEST USED DATE AND TIME |
|---------|---------|--------------|------------------|-----|---------------------------|
| user001 | card001 | user001@mail | 111-222-333 | ... | 20xx/01/01 10:10:10 |
| user002 | card002 | user002@mail | 444-555-666 | ... | 20xx/01/01 09:00:00 |
| ... | ... | ... | ... | ... | ... |

| USER ID | CARD ID | MAIL ADDRESS | FACSIMILE NUMBER | ... | LATEST USED DATE AND TIME |
|---------|---------|--------------|------------------|-----|---------------------------|
| user001 | card001 | user001@mail | 111-222-333 | ... | 20xx/01/01 10:10:10 |
| user002 | card002 | user002@mail | 444-555-666 | ... | 20xx/01/01 09:00:00 |
| ... | ... | ... | ... | ... | ... |

FOR ADDING USER

PLEASE INPUT USER INFORMATION.

USER INFORMATION

LOGIN USER NAME
user002

NAME

KEY DISPLAY NAME

DOMAIN NAME

LOGIN PASSWORD

MAIL ADDRESS

FACSIMILE DESTINATION

USE START DATE ▼ CANCEL    USE END DATE ▼ CANCEL

STATE
◉ VALID
○ INVALID

CARD INFORMATION

| CARD ID |
|---|
| card002 |
| card022 |

ADD
CANCEL

1411

OK   CANCEL

FIG.33B

MANAGEMENT TOOL

FILE(F) EDIT(E) INITIALIZE(I) OPERATION(O) TOOL(T) DISPLAY(V) HELP(H)

SEARCH LOGIN USER NAME ▶  [          ] SEARCH

| CARD ISSUE ON THE DAY | CARD RETURN ON THE DAY | ADD USER | DELETE USER | CHANGE USER | ADD ORDINARY CARD |

USER INFORMATION LIST — 1420

| LOGIN USER NAME | NAME | USE START DATE | USE END DATE | STATE | LATEST USED DATE AND TIME |
|---|---|---|---|---|---|
| user001 | | | | VALID | |
| user002 | | | | VALID | |

1421

AUTHENTICATION SYSTEM, OPERATING APPARATUS, AND AUTHENTICATION METHOD

CROSS-REFERENCE TO APPLICATIONS

The present application claims priority under 35 U.S.C. § 119 to Japanese Patent Application No. 2016-055808, filed Mar. 18, 2016, and Japanese Patent Application No. 2016-055809, filed Mar. 18, 2016. The contents of Japanese Patent Application No. 2016-055808 and Japanese Patent Application No. 2016-055809 are incorporated herein by reference in their entirety.

BACKGROUND

1. Technical Field

The present invention relates an authentication system, an operating apparatus, and an authentication method.

2. Description of the Related Art

Recently, as a method for authenticating a user of an electronic apparatus such as an image forming apparatus, a method is known to use an authentication apparatus such as an IC card reading device or a finger print authentication apparatus, to carry out authentication, for example. Also, a technology with which, after an authentication apparatus (an entering/leaving management system, or the like) other than an image forming apparatus has once authenticated a user, information of the authenticated user is cached in the image forming apparatus, and, thereafter, authentication is carried out for the image forming apparatus using the cached information is known (for example, see Japanese Laid-Open Patent Application No. 2010-277557).

SUMMARY

According to one aspect, an authentication system includes a process-carrying-out apparatus configured to carry out a process and an operating apparatus connected with the process-carrying-out apparatus. The operating apparatus comprises one or more processors configured to store first user information including authentication information of one or more users permitted to use the process-carrying-out apparatus in a first storage unit of the operating apparatus; acquire authentication information of a user of the process-carrying-out apparatus; in response to acquiring the authentication information of the user of the process-carrying-out apparatus, return a state of the process-carrying-out apparatus from a power saving state into a normal state, the normal state being a state of being able to carry out the process and the power saving state being a state of consuming power less than the normal state; carry out first authentication of the user of the process-carrying-out apparatus based on the acquired authentication information of the user of the process-carrying-out apparatus and the first user information; if the first authentication is not successful, request the process-carrying-out apparatus to carry out second authentication of the authentication information of the user of the process-carrying-out apparatus; if the first authentication or the second authentication is successful, permit the use of the process-carrying-out apparatus; and if the use of the process-carrying-out apparatus is permitted, store the authentication information of the user who has been permitted to use the process-carrying-out apparatus to be included in the first user information.

Other objects, features, and advantages will become more apparent from the following detailed description when read in conjunction with the accompanying drawings.

BRIEF DESCRIPTION OF THE DRAWINGS

FIG. 5 is a functional configuration diagram illustrating one example of an image forming apparatus according to a variant of the first embodiment;

FIGS. 8A-8D illustrates information managed by the image forming apparatus according to the first embodiment and the image forming apparatus according to the variant of the first embodiment;

FIG. 19 is a sequence diagram illustrating yet another example of the user information acquisition process according to the first embodiment;

FIGS. 20A and 20B illustrate examples of information managed by an image forming apparatus according to a second embodiment;

FIGS. 33A and 33B illustrate an example of user information input screen pages according to the fourth embodiment;

DETAILED DESCRIPTION OF EMBODIMENTS

An electronic apparatus such as an image forming apparatus may enter a power saving state after no operation has been performed by a user for a certain period of time. In such an electronic apparatus, even when a user wishes to be authenticated using an IC card, for example, authentication is not be carried out until the electronic apparatus returns to a normal state. Therefore, even if the user's authentication information is previously cached, it may be difficult to reduce the authentication period of time.

Also, in an electronic apparatus where user's authentication information is cached in a volatile memory, the user's authentication information has not been cached after power supply is turned on in the electronic apparatus. Therefore, it is not possible to reduce the user's initial authentication period time.

Thus, in the conventional technologies, in an authentication system where a user is authenticated concerning an electronic apparatus that enters a power saving state, a period of time for authentication may be long when the electronic apparatus is in the power saving state, or immediately after power supply is turned on.

The embodiments of the present invention have been devised in consideration of the point, and an object is to reduce a period of time for authentication even when the electronic apparatus is in a power saving state, or even immediately after power supply is turned on, in an authentication system where a user is authenticated concerning an electronic apparatus that enters a power saving state.

Below, the embodiments of the present invention will be described with reference to the accompanying drawings.

<System Configuration>

Figure 1:
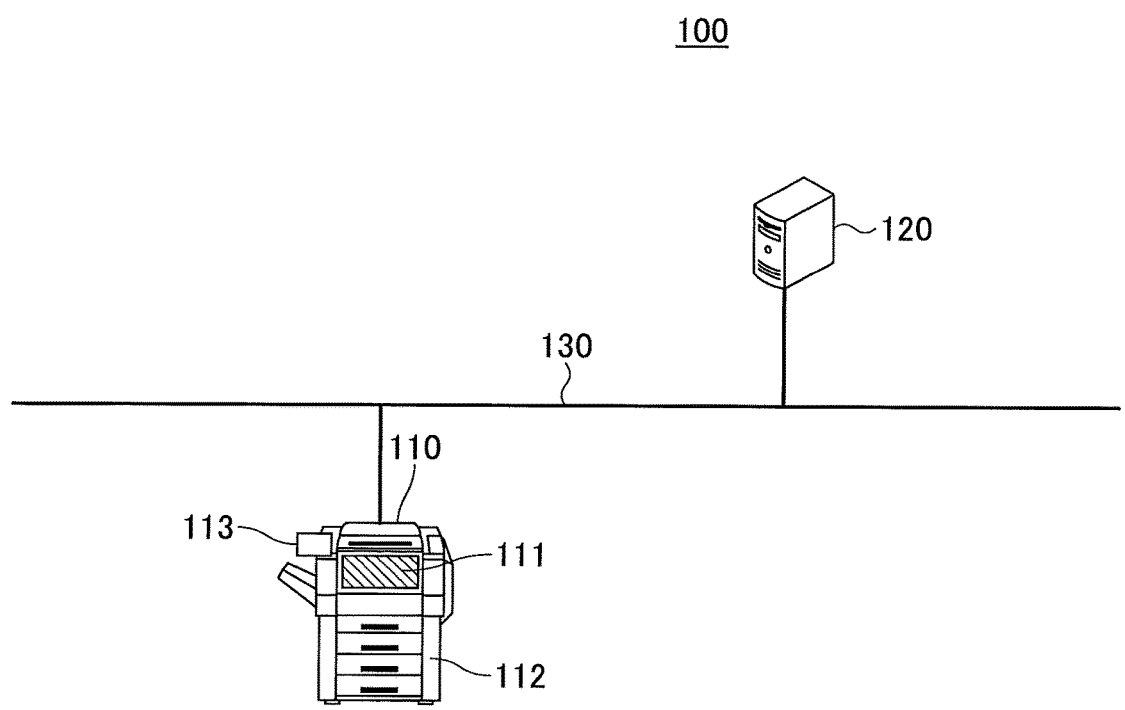
FIG. 1 illustrates a configuration example of an authentication system according to a first embodiment.

FIG. 1 illustrates a configuration example of an authentication system according to a first embodiment. The authentication system 100 includes, for example, an image forming apparatus 110 connected to a network 130 such as the Internet, a LAN (Local Area Network), or the like, and an authentication server 120. The authentication system 100 authenticates the user of the image forming apparatus 110, and permits the use of the image forming apparatus 110 by the authenticated user.

The image forming apparatus 110 is one example of an electronic apparatus such as, for example, a MFP (Multifunction Peripheral) having functions of a printer, a scanner, a copier, a facsimile machine, and so forth, an image forming apparatus such as a printer, or the like.

The image forming apparatus 110 includes, for example, a body 112 carrying out an image forming process (one example of a predetermined process), an operating unit 111 connected to the body 112, and an authentication apparatus 113 (for example, an IC card reader, a finger print reading device, or the like) acquiring the user's authentication information.

The body (one example of a process-carrying-out apparatus) 112 is an information processing apparatus carrying out functions such as, for example, a printing function, a copying function, a scanning function, a function of carrying out facsimile transmission and reception, and so forth that the image forming apparatus 110 has.

The operating unit (one example of an operating apparatus) 111 is an information processing apparatus connected with the body 112 via a communications path, for example, in a wired or wireless manner, and displays an operation screen page for the image forming apparatus 110, and so forth, on a touch panel display, or the like.

The image forming apparatus 110 has a power saving function, and thus, has a normal state where the image forming apparatus 110 can carry out the image forming processes and a power saving mode where the power consumption is reduced. The image forming apparatus 110 enters the power saving state if, for example, no operation has been performed on the image forming apparatus 110 for a predetermined time interval, or the like.

The body 112 stops the power supply to hardware engines such as a printer, a scanner, and so forth, storage devices such as a HDD (Hard Disk Drive), and so forth, in the power saving state, and the time for returning to the normal state in the body 112 is longer than the time for returning to the normal state in the operating unit 111.

On the other hand, the operating unit 111 operates using a low power consuming OS (Operating System), i.e., for example, Android (registered trademark), and, can return to the normal state within a period of time shorter than the body 112 in response to, for example, an input operation performed by the user on the authentication apparatus 113.

The authentication apparatus 113 is an apparatus acquiring user's authentication information, such as, for example, an IC card reading device, a biological information reading device, or the like. According to the first embodiment, the image forming apparatus 110 acquires user's authentication information through the authentication apparatus 113, and, if authentication of the acquired authentication information is succeeded in, the image forming apparatus 110 permits the corresponding user's use of the image forming apparatus 110.

Also, the power is supplied to the authentication apparatus 113 even if the image forming apparatus 110 is in the power saving state. Therefore, even if the image forming apparatus 110 is in the power saving state, the user can input authentication information to the authentication apparatus 113.

If authentication information is input to the authentication apparatus 113 in a state where the image forming apparatus 110 is in the power saving state, the operating unit 111 starts up within a period of time shorter than the body 112, and requests the body 112 to start up. Also, the operating unit 111 according to the first embodiment has an authentication function to authenticate the user, and a cache function to store the authentication information of the user who has succeeded in the authentication. Therefore, without waiting for the start-up of the body 112, the operating unit 11 can carry out the user's authentication using the cached authentication information.

Note that the "cache" function is a function to store high-use-frequency data in a high-speed storage device (for example, a volatile memory of the operating unit 111), and thereby, it is possible to read the data in the second or further subsequent time, more quickly than reading the data from a low-speed storage device (for example, a HDD of the body 112).

In many cases, the image forming apparatus 110 is installed in a certain place, and is used by a specific user, for example. By having the above-described configuration, because the image forming apparatus 110 caches user's authentication information that has been once succeeded in authentication in the high-speed storage device of the operating unit 111, it is possible to increase the speed for carrying out the same user's authentication process in the second or further subsequent time.

Thus, according to the first embodiment, in the authentication system 100 carrying out authentication of the user of the image forming apparatus (i.e., the electronic apparatus) 110 that enters the power saving state, it is possible to shorten the period of time for authenticating the user when the image forming apparatus 110 has been in the power saving state.

Note that, if the image forming apparatus 110 fails in the user's authentication using the authentication information stored in the cache of the operating unit 111, the image forming apparatus 110 can carry out the user's authentication using the body 112 using the authentication information stored in a storage unit of the body 112.

Further, it is also possible that, if the image forming apparatus 110 fails in the user's authentication using the authentication information stored in the storage unit of the body 112, the image forming apparatus 110 requests the authentication server 120 connected via the network 130 to carry out the user's authentication.

The authentication server (one example of an external server) 120 is a system including an information processing apparatus having a server function, or including a plurality of the information processing apparatuses. The authentication server 120 responds to a request from the image forming apparatus 110 to authenticate the user, and send the authentication result to the image forming apparatus 110.

It is desirable that the authentication server 120 authenticates the user's authentication information (for example, a card ID of an IC card), and, if the authentication is succeeded in, sends the user information of the user (for example, a mail address, a facsimile number, or the like) to the image forming apparatus 110.

By having the above-mentioned configuration, the image forming apparatus 110 can carry out an authentication process in the second or further subsequent time for the same user using the cache function of the operating unit 111 even if the image forming apparatus 110 is in the power saving state.

However, the cache function of the operating unit 111 is implemented using, for example, a volatile memory. Therefore, if, for example, the power supply is turned off in the image forming apparatus 110, the cached authentication information is lost. Therefore, in the conventional technology, it may be difficult to shorten the period of time for user's authentication after the power supply is turned on.

Therefore, the operating unit 111 of the image forming apparatus 110 according to the first embodiment caches the user's authentication information in a volatile memory of the operating unit 111, and also, stores, in the nonvolatile memory of the body 112, restoration information for restoring the cached information when the power supply is turned on.

As a result, the operating unit 111 can acquire the restoration information from the nonvolatile memory of the body 112 after, for example, the power supply is turned on in the image forming apparatus 110, and restore the cached information of the operating unit 111.

The "restoration" means a process of storing (restoring) user information that has been stored in the volatile memory of the operating unit 111 before the power supply is turned off in the image forming apparatus 110, in the volatile memory of the operating unit 111 after the power supply is turned on in the image forming apparatus 110.

Note that, the system configuration of FIG. 1 is one example. For example, the image forming apparatus 110 may be one of various electronic apparatuses having functions other than image forming functions, i.e., for example, a TV or video conference apparatus, a projector, an automatic ticket vending machine, an attendance management apparatus, an automated telling machine, and so forth.

Also, the authentication apparatus 113 is not limited to an IC card reading device or a biological information reading device, and may be an authentication apparatus that acquires authentication information from various wireless terminals via wireless communications.

<Hardware Configuration>
(Hardware Configuration of Image Forming Apparatus)

Figure 2:
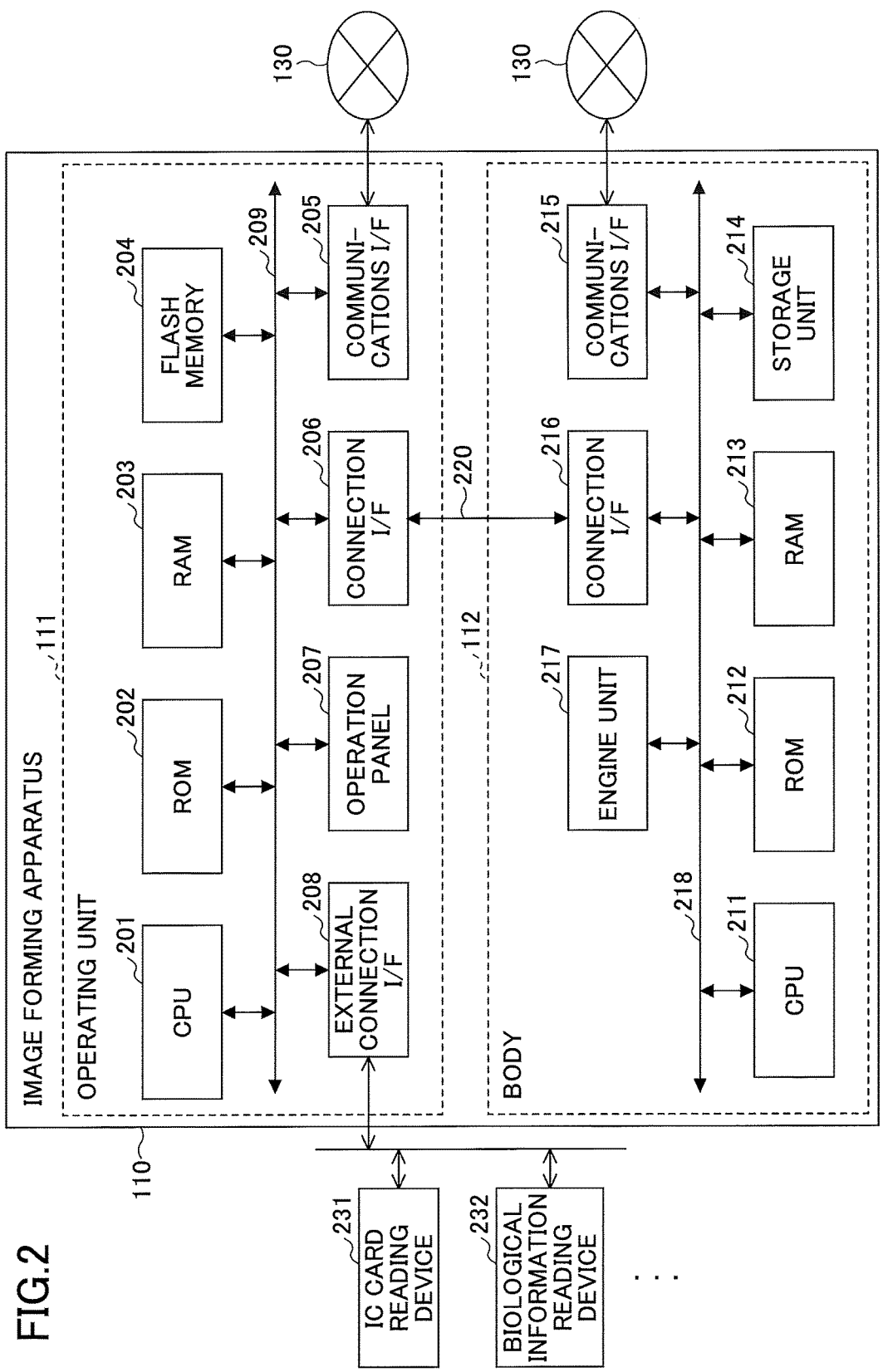
FIG. 2 illustrates one example of a hardware configuration of an image forming apparatus according to the first embodiment.

FIG. 2 illustrates one example of a hardware configuration of the image forming apparatus according to the first embodiment. The image forming apparatus 110 includes, for example, the body 112 implementing various image forming functions such as a copy function, a scanner function, a facsimile function, a printer function, and so forth; and the operating unit 111 receiving a user's operation. Note that, receiving a user's operation means receiving information that is input from a user's operation (that may be a signal that represents coordinate values on a screen). The body 112 and the operating unit 111 are connected via a dedicated communications path 220 in a mutually communicatable manner. For the communications path 220, for example, it is possible to use a USB (Universal Serial Bus) standard. However, any other standard can be applied without regard to whether the communications is carried out in a wired or wireless manner.

Note that the body 112 carries out a process according to an operation performed by the user on an operating unit 111. The body 112 carries out communications with an external apparatus such as a client PC (personal computer), and carries out a process according to an instruction received from the external apparatus.

(Body)

First, a hardware configuration of the body 112 will be described. As illustrated in FIG. 2, the body 112 includes a CPU (Central Processing Unit) 211, a ROM (Read-Only Memory) 212, a RAM (Random Access Memory) 213, a storage unit 214, a communications I/F (Interface) 215, a connection I/F 216, an engine unit 217, and a system bus 218.

The CPU 211 controls processing carried out by the body 112 in a supervising manner. The CPU 211 uses the RAM 213 as a work area to execute programs stored in the ROM 212, the storage unit 214, or the like, and control the entirety of the body 112. For example, the CPU 211 controls the engine unit 217 to implement various functions such as a copy function, a scanner function, a facsimile function, a printer function, and so forth.

The ROM 212 is a nonvolatile memory storing, for example, a BIOS (Basic Input/Output System) used at a time of a start-up of the body 112, various settings, and so forth. The RAM 213 is a volatile memory used as the work area of the CPU 211, or the like. The storage unit 214 is a nonvolatile memory storing, for example, an OS, application programs, various sorts of data, and so forth, and, may be, for example, a HDD, a SSD (Solid State Drive), or the like.

The communications I/F 215 is a network interface for connecting the body 112 to the network 130 for carrying out communications with external apparatuses (for example, the authentication server 120) connected to the network 130. The connection I/F 216 is an interface for carrying out communications with the operating unit 111 via the communications path 220.

The engine unit 217 is hardware for implementing a copy function, a scanner function, a facsimile function, a printer function, and so forth other than general information processing functions and communications functions. The engine unit 217 includes, for example, a scanner (an image reading unit) scanning and reading an original image, a plotter (an image forming unit) printing an image on a sheet material such as paper, a facsimile unit carrying out facsimile communications, and so forth. The engine unit 217 may further include a specific option such as a finisher sorting sheet materials on which printing has been made, an ADF (automatic draft feeder) automatically feeding an original image, or the like.

The system bus 218 is connected to the respective elements, and transmits address signals, data signals, various control signals, and so forth.

(Operating Unit)

Next, a hardware configuration of the operating unit 111 will be described. As illustrated in FIG. 2, the operating unit 111 includes a CPU 201, a ROM 202, a RAM 203, a flash memory 204, a communications I/F 205, a connection I/F 206, an operation panel 207, an external connection I/F 208, a system bus 209, and so forth.

The CPU 201 controls processing carried out by the operating unit 111 in a supervising manner. The CPU 201 uses the RAM 203 as a work area, to execute programs stored in the ROM 202, the flash memory 204, or the like, and controls the entirety of the operating unit 111. For example, the CPU 201 authenticates a user based on authentication information transmitted from the authentication apparatus connected with the external connection I/F 208, and displays an operation screen page for the image forming apparatus 110 on the operation panel 207.

The ROM 202 is a nonvolatile memory storing, for example, a BIOS executed at a time of start-up of the operating unit 111, various settings, and so forth. The RAM 203 is a volatile memory (a storage device) used as the work area of the CPU 201, and so forth. The flash memory 204 is a volatile storage device storing, for example, an OS, application programs, various sorts of data, and so forth.

The communications I/F 205 is a network interface for connecting the operating unit 111 to the network 130, and carrying out communications with external apparatuses connected via the network 130.

The connection I/F 206 is an interface for carrying out communications with the body 112.

The operation panel 207 receives various inputs according to corresponding operations performed by the user, and displays various sorts of information. The operation panel 207 is, for example, a liquid crystal display (LCD) including a touch panel function. However, the operation panel 207 is not limited to this configuration. The operation panel 207 may be, for example, an organic EL (Electro Luminescence) display device including a touch panel function. Further, the operation panel 207 may have, in addition or instead, an operation unit such as hardware keys and a display unit such as lamps.

The external connection I/F 208 is an interface such as, for example, a USB interface, for connecting the authentication apparatus 113 such as an IC card reading device 231, a biological information reading device 232, or the like, to the operating unit 111.

The system bus 209 is connected to the respective elements, and transmits address signals, data signals, various control signals and so forth.

(Hardware Configuration of Computer)

Each of the authentication server 120 and an administrator terminal (that will be described later) is implemented by one or more information processing apparatuses each having a common computer hardware configuration. The common computer hardware configuration will now be described.

Figure 3:
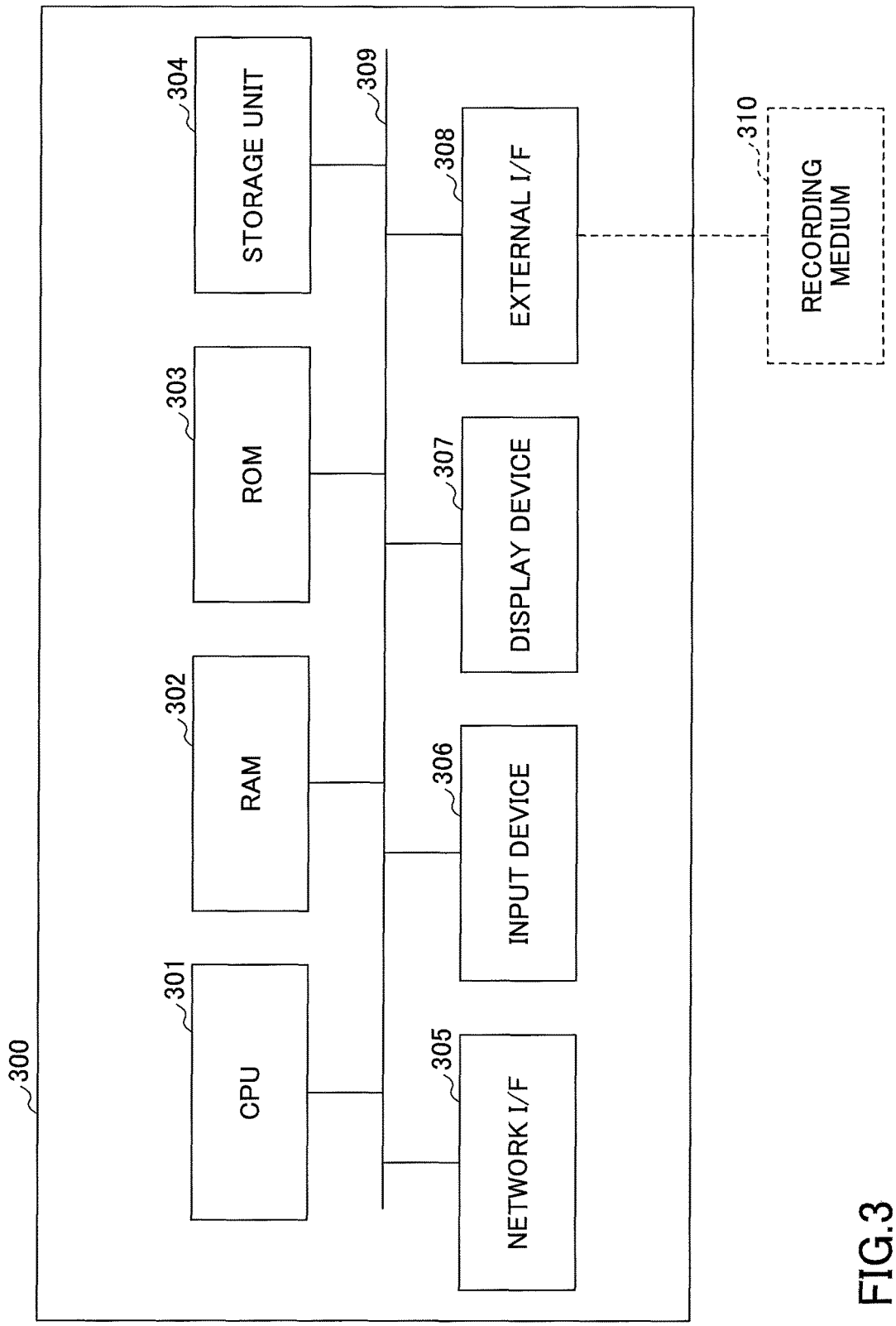
FIG. 3 illustrates an example of a hardware configuration of a computer.

FIG. 3 illustrates an example of a hardware configuration of a computer. The computer 300 includes, for example, a CPU 301, a RAM 302, a ROM 303, a storage unit 304, a network I/F 305, an input device 306, a display device 307, an external I/F 308, and a bus 309.

The CPU 301 implements various functions of the computer 300 by reading programs stored in the ROM 303, the storage unit 304, or the like, onto the RAM 302, and carrying out processes. The RAM 302 is a volatile memory used as a work memory of the CPU 301, or the like. The ROM 303 is a nonvolatile memory capable of holding programs and data even after the power supply is turned off.

The storage unit 304 is a large-capacity storage device, i.e., for example, a HDD, a SSD, or the like, and stores an OS, application programs, various sorts of data, and so forth. The network I/F 305 are a communications interface to connect the computer 300 to the network 130.

The input device 306 includes, for example, a pointing device such as a mouse, and an input device such as a keyboard, and is used to input various operation signals to the computer 300. The display device 307 is, for example, a display, and displays process results of the computer 300, and so forth.

The external I/F 308 is an interface for an external apparatus. The external apparatus may be, for example, a recording medium 310, or the like. For example, the computer 300 stores a certain program in, for example, the recording medium 310, installs the program that is read from the recording medium 310 in the computer 300 via the external I/F 308 to execute the program.

The bus 309 is connected to the respective elements, and transmits address signals, data signals, various control signals and so forth.

Note that, the configuration of FIG. 3 is one example. For example, the computer 300 may externally have the input device 306, the display device 307, and so forth.

First Embodiment and Variant

<Functional Configuration>

Figure 4:
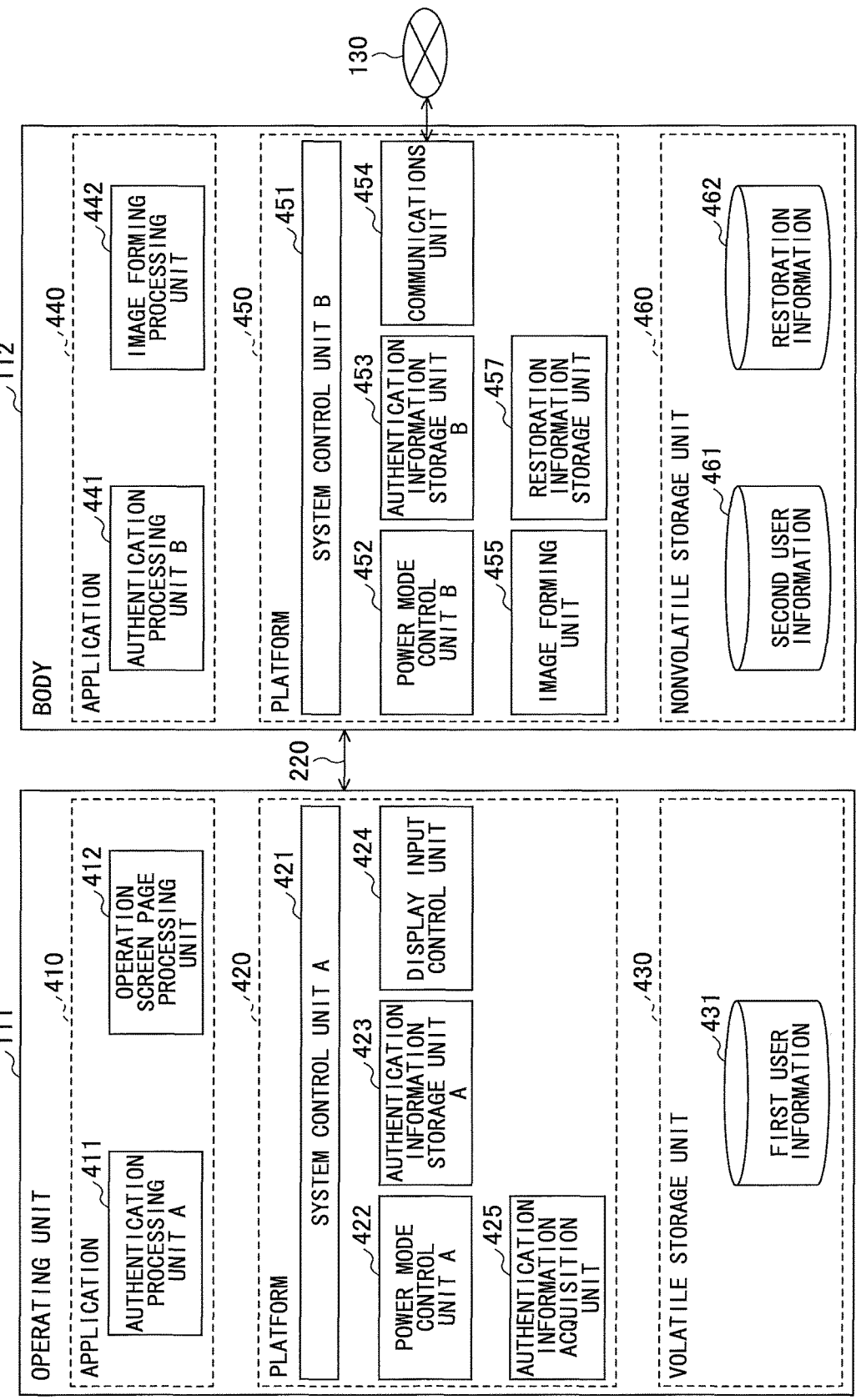
FIG. 4 is a functional configuration diagram illustrating one example of the image forming apparatus according to the first embodiment.

FIG. 4 is a functional configuration diagram of the image forming apparatus in the authentication system 100 according to the first embodiment. In the image forming apparatus 110, the operating unit 111 and the body 112 are communicatably connected via the communications path 220.

FIG. 5 is a functional configuration diagram of an image forming apparatus in an authentication system 100A according to a variant of the first embodiment. In the image forming apparatus 110A, an operating unit 111A and a body 112A are communicatably connected via a communications path 220.

Note that the authentication system 100A according to the variant of the first embodiment is almost the same as the authentication system 100 according to the first embodiment. The same reference numerals are given to the elements the same as the elements of the first embodiment, while the suffix "A" is added to the reference numerals of the elements (for example, "110A" with respect to "110") that are almost the same as the elements of the first embodiment. Also, concerning the image forming apparatus 110A according to the variant of the first embodiment, mainly points different from the image forming apparatus 110 according to the first embodiment will be described, and duplicate description will be omitted.

(Functional Configuration of Operating Unit)

The operating unit 111 executes a certain program by the CPU 201 of FIG. 2 to implement an application 410, a platform 420, and a volatile storage unit 430.

The application 410 includes, for example, an authentication processing unit A 411, and an operation screen page processing unit 412.

The authentication processing unit A 411 includes one or more application programs (hereinafter, referred to as applications) each using various functions provided by the platform 420 to carry out an authentication process of the operating unit 111. Note that, the authentication processing unit A 411 will be described later in detail.

The operation screen page processing unit 412 is an application using various functions provided by the platform 42, to display an operation screen page on the operation panel 207, and, in response to an operation performed by the user on the operation screen page, requesting the body 112 to carry out an image forming process, or the like.

The platform 420 is implemented by the OS, and programs providing various services. The platform 420 includes, for example, a system control unit A 421, a power mode control unit A 422, an authentication information storage unit A 423, a display input control unit 424, and an authentication information acquisition unit 425.

The system control unit A 421 provides an API (Application Programming Interface) for the application 410, the body 112, or the like, to use the platform 420 of the operating unit 111, and controls the entirety of the operating unit 111.

The power mode control unit A (a power supply state control unit) 422 controls the power supply state (the normal state, the power saving state, or the like) of the operating unit 111, and, uses the power mode control unit B 452 of the body 112 to control the power supply state of the image forming apparatus 110.

The authentication information storage unit A (a first authentication information storage unit) 423 stores first user information 431 in a volatile storage unit 430 and manages the first user information 431. Note that, the first user information 431 will be described later in detail.

The display input control unit 424 responds to, for example, an instruction from the operation screen page processing unit 412, to display an operation screen page on the operation panel 207 to receive the user's inputting operation.

The authentication information acquisition unit 425 uses the authentication apparatus 113 to acquire user's authentication information (for example, the card ID of a IC card, the user's biological information, or the like). For example, the authentication information acquisition unit 425 acquires the card ID (one example of the authentication information) that is read by the IC card reading device 231 from the user's IC card, from the IC card reading device 231.

The volatile storage unit (a first the storage unit) 430 is a volatile storage unit in which the authentication information storage unit A 423 stores the first user information 431, and, for example, is implemented by the RAM 203 of FIG. 2.

(Functional Configuration of Authentication Processing Unit A)

The authentication processing unit A 411 is implemented by one or more applications.

Figure 6A:
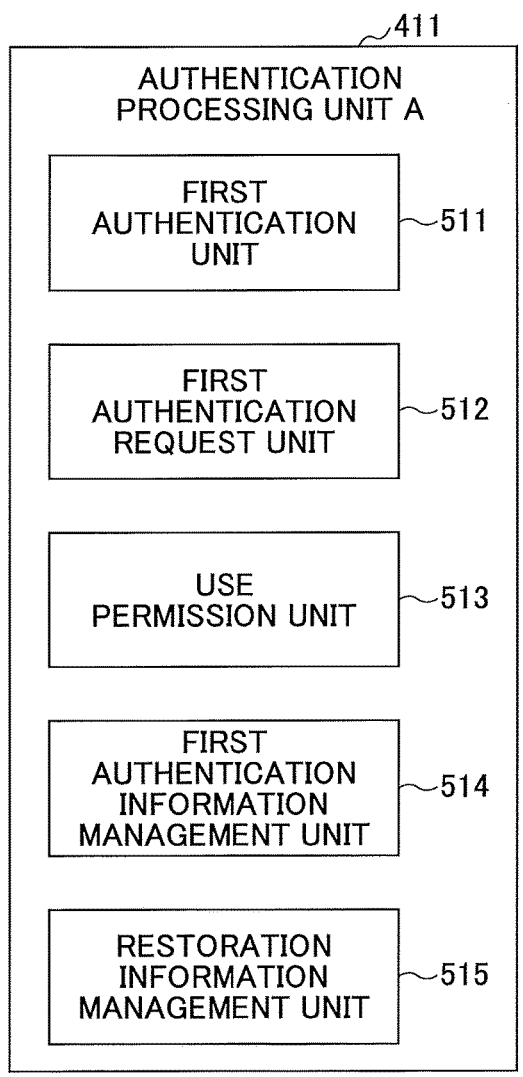
FIGS. 6A and 6B illustrate one example of a functional configuration of authentication processing units according to the first embodiment.
Figure 7A:
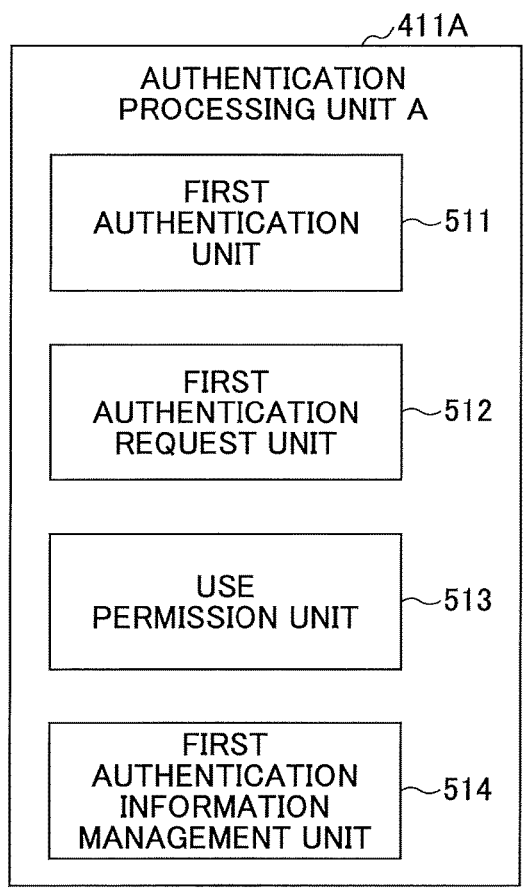
FIGS. 7A and 7B illustrate one example of a functional configuration of authentication processing units according to the variant of the first embodiment.

The authentication processing unit A 411 includes, for example, as illustrated in FIG. 6A, a first authentication unit 511, a first authentication request unit 512, a use permission unit 513, a first authentication information management unit 514, and a restoration information management unit 515. As illustrated in FIG. 7A, the restoration information management unit 515 is omitted according to the variant of the first embodiment.

The first authentication unit 511 carries out user's authentication (first authentication) based on user's authentication information acquired by the authentication information acquisition unit 425 and the first user information 431 stored in the volatile storage unit 430 by the authentication information storage unit A 423. For example, the first authentication unit 511 determines that the user's first authentication is succeeded in, if the user's card ID (one example of the authentication information) acquired by the authentication information acquisition unit 425 is included in the first user information.

The first authentication request unit 512 transmits an authentication request requesting the body 112 to authenticate the user's authentication information acquired by the authentication information acquisition unit 425 if the first authentication unit 511 has failed in the first authentication.

The use permission unit 513 permits the user's use of the image forming apparatus 110 (for example, permits the user to login to the image forming apparatus 110) if the first authentication carried out by the first authentication unit 511 or the authentication carried out by the body 112 is succeeded in.

Also, the use permission unit 513 requests the first authentication information management unit 514 to register the user information of the user who has been permitted to use the image forming apparatus 110.

The first authentication information management unit 514 registers, in response to an instruction of the use permission unit 513, the user information of the user who has been permitted to use the image forming apparatus 110 to be included in the first user information 431 stored in the authentication information storage unit A 423 (if the same user's authentication information is already present, the user information is updated).

FIG. 8A illustrates one example of the first user information 431 stored in the volatile storage unit 430 by the authentication information storage unit A 423. In the example of FIG. 8A, the first user information 431 includes "user ID", "card ID", "mail address", "facsimile number", and "latest use date and time".

The "user ID" is information for identifying a user. The "card ID" is identification information of an IC card held by the user, and is one example of user's authentication information. The user's authentication information also may be, for example, a biological feature such as a finger print, authentication information such as a password, or the like.

The "mail address" is the user's mail address. The "facsimile number" is the user's facsimile number. The mail address and the facsimile number are examples of user's destination information.

Thus, in the first user information 431, the user information of one or more users who have been permitted to use the image forming apparatus 110 is included.

The "latest use date and time" is the latest date and time at which the information of each user has been updated. The volatile storage unit 430 has a relatively small storage capacity, and the number of records of the first user information is limited (for example, 50 records, i.e., for 50 users, or so).

After the number of records of the user information reaches the limit of storable number of records of the first user information 431, the first authentication information management unit 514 deletes records of the information from the record of the information having the oldest latest use date and time, in sequence, and registers (stores) new user information in the first user information 431. Note that, if the record of the same user is already included in the stored first user information, the first authentication information management unit 514 updates (overwrites) the user information of the same user.

As a result, the first authentication information management unit 514 implements the cache function to store the information of the user who has the higher use frequency in the high speed storage device (volatile storage unit 430), whereby second or further subsequent reading the same information can be carried out at a higher speed than reading the information from the low-speed storage device (the nonvolatile storage unit 460).

Also, as described above, the volatile storage unit 430 has the relatively small storage capacity. Therefore, it is desired that the information to be included in the first user information 431 is limited to the actually desired information from among the second user information stored in the body 112.

For example, if the user has a plurality of IC cards, the second user information of the body 112 stores the card IDs of the user's IC cards. On the other hand, it is desired that the first user information 431 used by the operating unit 111 includes the card ID of the IC card used by the user most recently and does not store the card IDs of the other IC cards. The reason is that the likelihood that the same user uses the same IC card for again using the image forming apparatus 110 is high.

The restoration information management unit 515 according to the first embodiment controls the first authentication information management unit 514 in such a manner that the first authentication information management unit 514 stores information (hereinafter, referred to as restoration information) for restoring the first user information 431 stored in the volatile storage unit 430 in the nonvolatile storage unit 460 of the body 112.

Also, the restoration information management unit 515 according to the first embodiment restores the first user information 431 of the volatile storage unit 430, using the restoration information stored in the nonvolatile storage unit 460 of the body 112, if, for example, the power supply is turned on in the image forming apparatus 110, or the like. Note that, it is also possible that the restoration information management unit 515 restores the first user information 431 of the volatile storage unit 430, for example, each predetermined time, or when the first user information is lost, or the like, in addition to when the power supply is turned on in the image forming apparatus.

FIG. 8C illustrates one example of the restoration information stored in the nonvolatile storage unit 460 of the body 112 by the restoration information management unit 515 according to the first embodiment. In the example of FIG. 8C, the restoration information 462 includes "user ID" that is also included in the first user information 431 illustrated in FIG. 8A. Note that, the "user ID" is one example of information for identifying the user included in the first user information. The information for identifying the user included in the first user information used in the restoration information 462 may be information different from "user ID" (i.e., for example, "card ID", "mail address", or the like).

For example, if the first authentication information management unit 514 updates the first user information 431, the restoration information management unit 515 generates the restoration information 462 from the updated first user information 431, and stores the generated restoration information in the nonvolatile storage unit 460 of the body 112.

Also, when the power supply is turned on in the image forming apparatus 110, the restoration information management unit 515 acquires the restoration information 462 stored in the nonvolatile storage unit 460 of the body 112, then acquires the user information of the users included in the restoration information 462 from the body 112, and stores the acquired user information as the first user information 431.

(Functional Configuration of Body)

As illustrated in FIG. 4, in the body 112, as a result of a program being executed by the CPU 211 of FIG. 2, an application 440, a platform 450, and a nonvolatile storage unit 460 are implemented.

The application 440 includes, for example, an authentication processing unit B 441, and an image forming processing unit 442.

The authentication processing unit B 441 includes one or more applications that use various functions provided by the platform 450 to carry out an authentication process of the body 112. Note that, the authentication processing unit B 441 will be described later in detail.

The image forming processing unit 442 includes an application that uses various functions provided by the platform 450 to control image forming processes such as printing, copying, scanning, carrying out a facsimile function, and so forth.

The platform 450 is implemented by the OS and programs for providing various services. The platform 450 includes, for example, a system control unit B 451, a power mode control unit B 452, an authentication information storage unit B 453, a communications unit 454, an image forming unit 455, and a restoration information storage unit 457. In this regard, as illustrated in FIG. 5, the restoration information storage unit 457 is omitted according to the variant of the first embodiment.

The system control unit B 451 provides APIs for the application 440, and provides APIs for the operating unit 111 to use the platform 450 of the body 112, and controls the entirety of the body 112.

The power mode control unit B 452 controls the power supply state of the body 112 (i.e., the normal state, the power saving state, or the like). For example, the power mode control unit B 452 responds to a request from the operating unit 111 to return the body 112 to the normal state from the power saving state.

The authentication information storage unit B (i.e., a second authentication information storage unit) 453 stores the second user information 461 in the nonvolatile storage unit 460, and manages the second user information 461. The second user information 461 will be described later in detail.

The communications unit 454 uses, for example, the communications I/F 215 to connect the image forming apparatus 110 to the network 130, and carries out communications with apparatuses (for example, the authentication server 120) connected to the network 130.

The image forming unit 455 responds to instructions from the image forming processing unit 442 to control the engine unit 217, and carries out the image forming processes.

The nonvolatile storage unit (a second storage unit) 460 is a nonvolatile storage unit in which the authentication information storage unit B 453 stores the second user information 461, and, for example, is implemented by the storage unit 214 of FIG. 2, or the like.

(Functional Configuration of Authentication Processing Unit B)

Figure 6B:
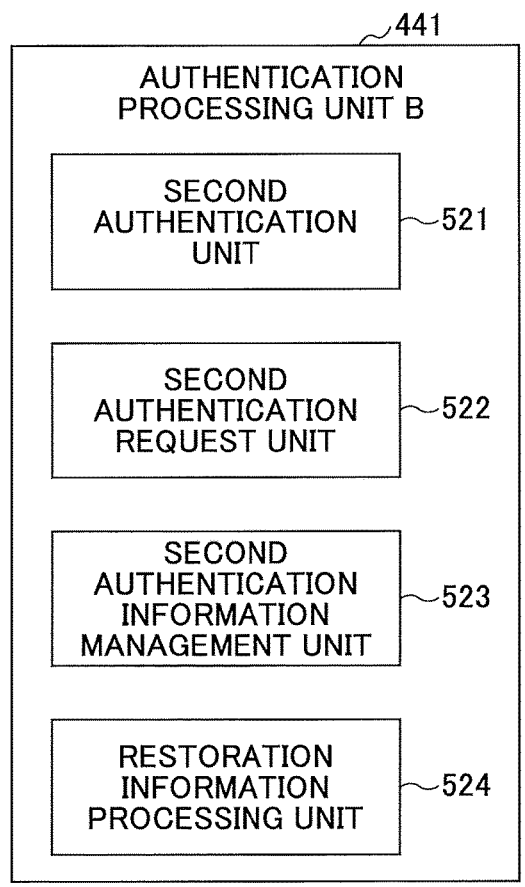
Figure 7B:
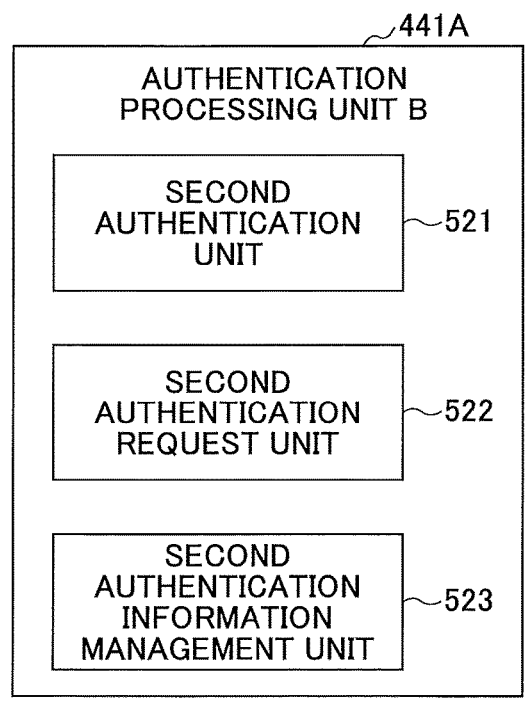

As illustrated in FIG. 6B, the authentication processing unit B 441 includes, for example, a second authentication unit 521, a second authentication request unit 522, a second authentication management unit 523, and a restoration information processing unit 524, according to the first embodiment. In this regard, as illustrated in FIG. 7B, the restoration information processing unit 524 is omitted according to the variant of the first embodiment.

The second authentication unit 521 carries out user's authentication (second authentication), in response to an authentication request from the operating unit 111, based on the user's authentication information included in the authentication request, and the second user information 461 stored in the nonvolatile storage unit 460 by the authentication information storage unit B 453. For example, if the second user information stored by the second authentication unit 521 includes the user's card ID included in the authentication request, the second authentication unit 521 succeeds in the user's second authentication.

If the second authentication unit 521 has failed in the second authentication, the second authentication request unit 522 sends an authentication request requesting the authentication server 120 to authenticate (i.e., third authentication) the user's authentication information included in the authentication request.

The authentication server 120 authenticates (the third authentication) the user's authentication information included in the authentication request from the second authentication request unit 522, and, if the authentication server 120 succeeds in the authentication, the authentication server 120 returns an authentication result including the user information of the user for whom the authentication is succeeded in, to the second authentication request unit 522.

If the authentication server 120 has thus succeeded in the third authentication, the second authentication request unit 522 can acquire, from the authentication server 120, the user information of the user for whom the authentication is thus succeeded in.

If the second authentication unit 521 has succeeded in the second authentication or the authentication server 120 has succeeded in the third authentication, the authentication processing unit B 441 sends the authentication result including the user information of the user for whom the authentication is thus succeeded in, to the authentication processing unit A 411 of the operating unit 111.

In response to an instruction from the operating unit 111 or the like, the second authentication management unit 523 registers the user information of the user thus permitted to use the image forming apparatus 110 to be included in the second user information 461 stored by the authentication information storage unit B 453 (if the second user information 461 of the same user is already present, the second authentication management unit 523 updates the second user information 461 of the user).

FIGS. 8B and 8D illustrate examples of the second user information 461 stored in the nonvolatile storage unit 460 by the authentication information storage unit B 453. In the examples of FIGS. 8B and 8D, the second user information 461 includes a mapping table 461a where, for each "card ID", the corresponding "user ID" is stored; and a user information table 461b where, for each "user ID", user information (accompanying information) is stored.

The second user information 461 stores a greater amount of the user information than the first user information 431 stored by the operating unit 111. Therefore, in order to be able to carry out a high-speed search using the card ID as a key in the second authentication, the authentication information storage unit B stores the mapping table (first correspondence information) 461a separate from the user information table 461b.

Also, the user information table (second correspondence information) 461b includes information, i.e., for example, "user ID", "mail address", "facsimile number", "server synchronization date and time", and "latest use date and time". In the above-mentioned information, the "user ID", the "mail address", the "facsimile number", and the "latest use date and time" correspond to the respective items of information included in FIG. 8A. The "server synchronization date and time" represents, for example, the date and time at which the user information was acquired from the authentication server 120.

Thus, the second user information 461 includes the user information of one or more users previously registered with the authentication system 100.

When the user information will be stored to be included in the second user information 461, if the information of the same user is already included in the second user information 461, the second authentication management unit 523 updates (overwrites) the user information of the same user. Also, if the information of the user is not included in the second user information 461, the second authentication management unit 523 newly registers (adds) the user information of the user.

According to the first embodiment, the restoration information processing unit 524 responds to a restoration information update request from the restoration information management unit 515 of the operating unit 111 to update the restoration information stored in the nonvolatile storage unit 460 by the restoration information storage unit 457. Also, the restoration information processing unit 524 responds to a restoration information acquisition request from the restoration information management unit 515 of the operating unit 111 to read the restoration information stored in the nonvolatile storage unit 460 by the restoration information storage unit 457, and transmits the read information to the restoration information processing unit 524.

Note that, according to the first embodiment, the operating unit 111 and the body 112 operate with the different OSs, respectively. For example, it is possible that, as the OS of the operating unit 111, Android is used, while, as the OS of the body 112, Linux (registered trademark) is used. As a result, the operating unit 111 can be in a standby state with low power consumption, and also, can return to the normal state within a short period of time, in the same manner as, for example, a smartphone or a tablet terminal.

Note that, the functional configuration of the image forming apparatus 110 shown in FIG. 4 is one example. For example, the operating unit 111 and the body 112 may operate with a single common OS. The application and the platform may not necessarily be separated. Also, each application may be divided into a plurality of applications.

Also, the function of the authentication processing unit B 441 of the body 112 may be carried out by the authentication processing unit A 411 of the operating unit 113 with the use of the platform 450.

<Process Flow>

Next, a flow of a process of an authentication method carried out by the authentication system 100 according to the first embodiment and a flow of a process of an authentication method carried out by the authentication system 100A according to the variant of the first embodiment will be described.

Note that the flow of the process of the authentication method carried out by the authentication system 100A according to the variant of the first embodiment is almost the same as the flow of the process of the authentication method carried out by the authentication system 100 according to the first embodiment. Therefore, the same step numbers are given to steps the same as steps of the first embodiment, and duplicate description will be omitted.

Hereinafter, as one example, it is assumed that the authentication apparatus 113 is an IC card reading device 231.

(Process of Operating Unit)

Figure 9:
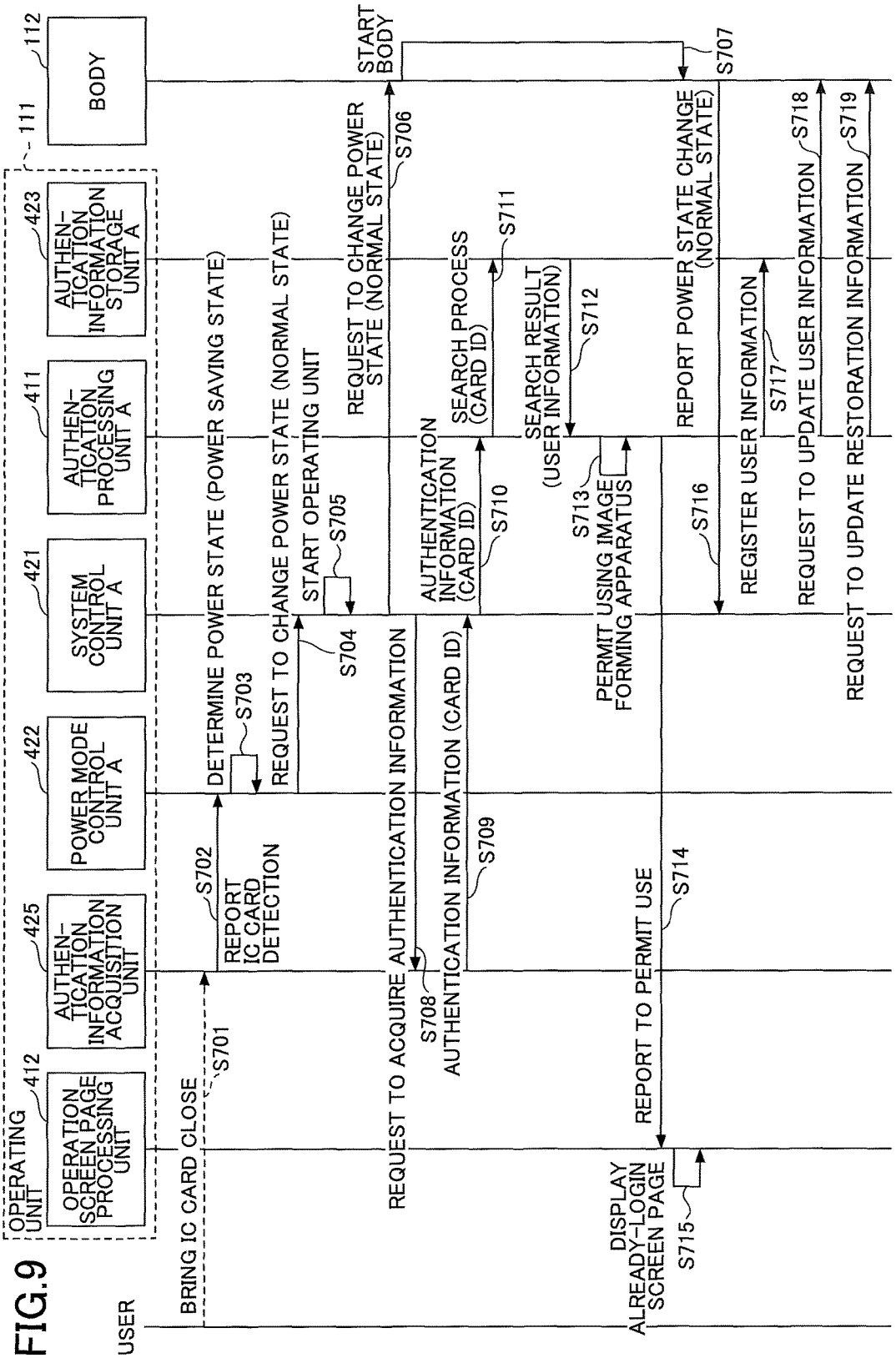
FIG. 9 is a sequence diagram illustrating one example of a process of an operating unit according to the first embodiment.

FIG. 9 is a sequence diagram illustrating one example of a process of the operating unit according to the first embodiment. Note that, it is assumed that, when the process of FIG. 9 is started, the image forming apparatus 110 is in the power saving state. Also, in the process of FIG. 9, the card ID of the user's IC card (one example of the authentication information) has been included in the stored first user information 431.

In step S701, the user, for example, holds the IC card and causes the IC card to be near the IC card reading device 231 to cause the IC card reading device 231 to read information from the IC card.

In step S702, the authentication information acquisition unit 425 receives, from the IC card reading device 231, information indicating the detection of the IC card to send information indicating the detection of the IC card to the power mode control unit A 422.

In step S703, the power mode control unit A 422 determines the current power state of the operating unit 111. Here, it is assumed that the operating unit 111 is in the power saving state.

In step S704, the power mode control unit A 422 sends a request (a power supply state change request) to the system control unit A 421 to enter the normal state.

In step S705, the system control unit A 421 starts the operating unit 111 and transmits, in step S706, the power supply state change request to the body 112 to enter the normal state.

As a result, in step S707, the body 112 carries out a starting process. Note that, starting the body 112 includes, for example, starting the HDD, and so forth. Therefore, it is assumed that starting the body 112 takes a longer time than starting the operating unit 111.

In step S708, the system control unit A 421 requests the authentication information acquisition unit 425 to acquire authentication information.

In step S709, the authentication information acquisition unit 425 acquires, from the IC card reading device 231, the user's authentication information (the card ID), and sends the acquired user's authentication information to the system control unit A 421.

In step S710, the system control unit A 421 sends the user's authentication information sent from the authentication information acquisition unit 425 to the authentication processing unit A 411.

In steps S711 and S712, the first authentication unit 511 of the authentication processing unit A 411 authenticates the user's authentication information sent from the system control unit A 421 (the first authentication).

For example, in step S711, the first authentication unit 511 uses the card ID included in the user's authentication information as a key to search the first user information 431 stored in the authentication information storage unit A 423.

Here, as described above, the card ID of the user's IC card is included in the first user information 431. Therefore, in step S712, as a search result, the user information of the user corresponding to the card ID is acquired. Note that, a case where the card ID of the user's IC card is not included in the first user information 431 will be described later with reference to FIG. 11.

In step S713, the use permission unit 513 of the authentication processing unit A 411 permits the use of the image forming apparatus 110 because the first authentication carried out by the first authentication unit 511 results in success.

In step S714, the authentication processing unit A 411 sends a use permission report indicating that the use of the image forming apparatus 110 is permitted to the operation screen page processing unit 412.

In step S715, the operation screen page processing unit 412 displays an already-login operation screen page on the operation panel 207. The already-login operation screen page is such a screen page that, for example, the operation screen page processing unit 412 closes a pop-up or the like indicating that authentication is still being carried out having been displayed, to start receiving the user's operation from the operation screen page.

In step S716, if the start-up of the body 112 has been completed, the body 112 transmits a power supply state change report indicating the completion of a start-up of the body 112 to the operating unit 111. Note that a timing of the completion of a start-up of the body 112 in FIG. 9 is one example.

In step S717, the first authentication information management unit 514 of the authentication processing unit A 411 registers (stores) the user information including the authentication information of the user who has been permitted by the use permission unit 513 to use the image forming apparatus 110 (body 112) to be included in the first user information.

In step S718, the first authentication information management unit 514 of the authentication processing unit A 411 transmits, to the body 112, a user information update request requesting to update the user information of the user thus permitted to use the image forming apparatus 110. The user information update request includes, for example, information such as the user ID, the card ID, the mail address, the facsimile number, the latest use date and time, and so forth of the user thus permitted to use the image forming apparatus 110 has been permitted.

In step S719, the restoration information management unit 515 of the authentication processing unit A 411 transmits, to the body 112, a restoration information update request to request to update the restoration information. The restoration information update request includes, for example, the restoration information 462 such as that illustrated in FIG. 8C. For example, the restoration information management unit 515 generates the restoration information 462 such as that illustrated in FIG. 8C from the first user information 431 updated in step S717, includes the information 462 in the restoration information update request, and transmits the generated information as being included in the restoration information update request to the body 112.

Thus, the image forming apparatus 110 according to the first embodiment can start the first authentication before the completion of the start-up of the body 112. As a result, if the user information of the user is included in the first user information 431 of the operating unit, the image forming apparatus 110 comes to be able to permit the user to use the image forming apparatus 110 without waiting the start-up of the body 112.

According to the first embodiment, the image forming apparatus 110 stores, in the nonvolatile storage unit 460 of the body 112, the restoration information including the information for identifying the users (for example, the list of user IDs) included in the first user information 431 stored in the volatile storage unit 430.

Figure 10:
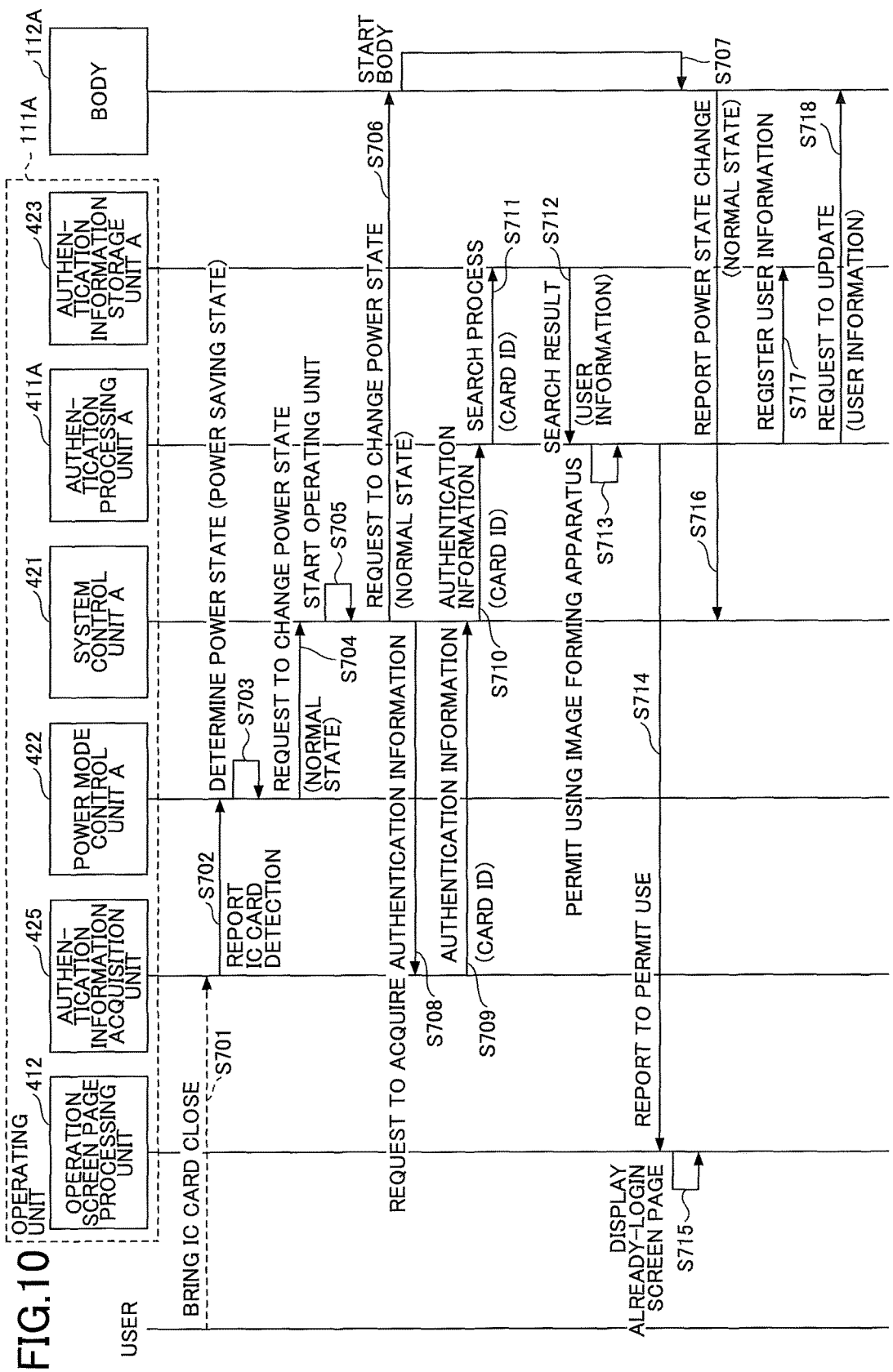
FIG. 10 is a sequence diagram illustrating one example of a process of an operating unit according to the variant of the first embodiment.

Note that, as illustrated in FIG. 10, step 719 concerning the restoration information is omitted according to the variant of the first embodiment.

Figure 11:
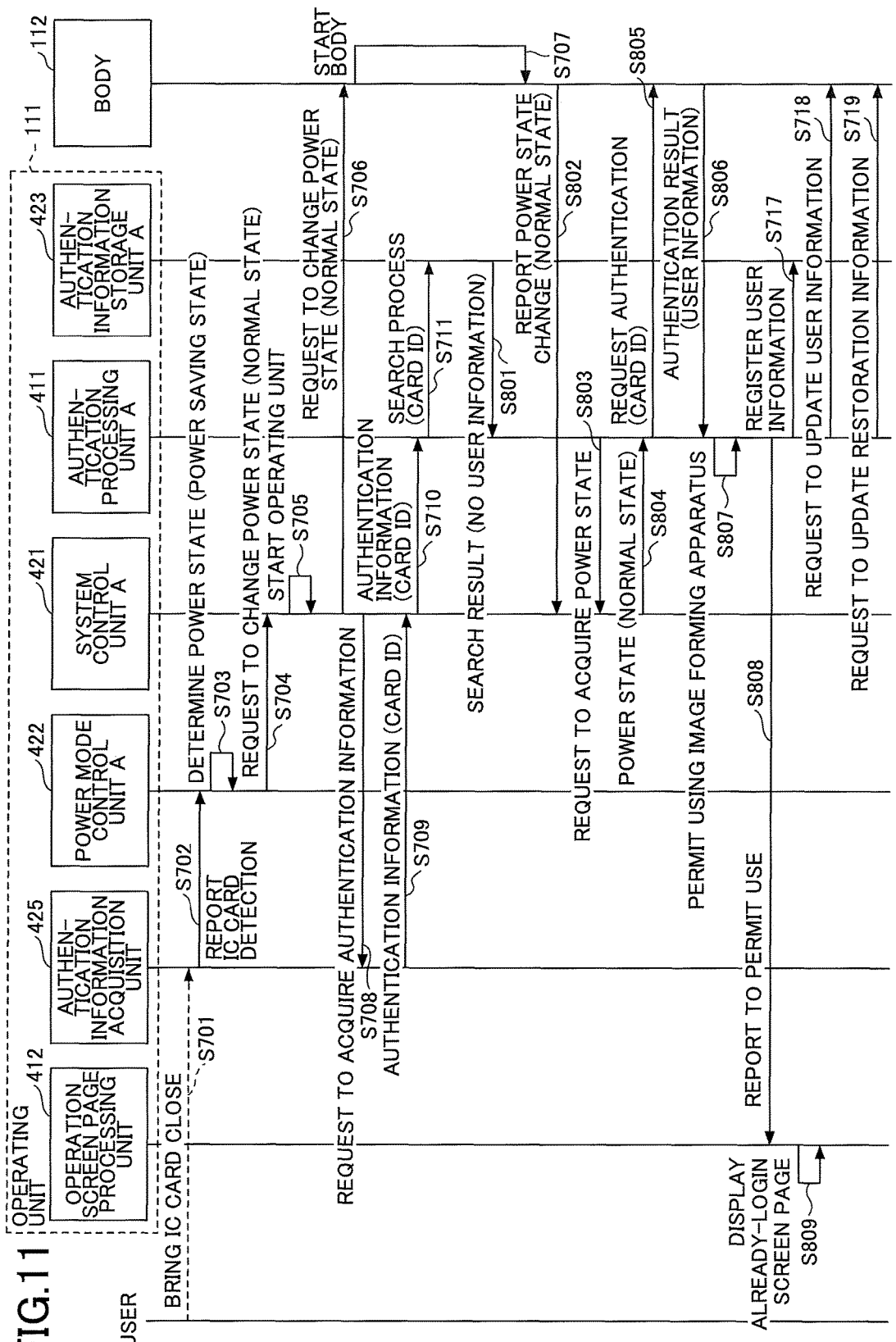
FIG. 11 illustrates another example of a process of the operating unit according to the first embodiment.

FIG. 11 illustrates another example of the process of the operating unit according to the first embodiment. Note that, it is assumed that, at the time of starting the process of FIG. 11, the image forming apparatus 110 is in the power saving state. Also, in the process of FIG. 11, it is assumed that the card ID of the user's IC card (one example of the authentication information) is not included in the stored first user information 431.

Note that, steps S701-S711 and steps S717 and S718 are the same as steps S701-S711 and steps S717 and S718 of FIG. 9, and therefore, mainly the differences from the process of FIG. 9 will now be described.

In steps S711 and S801, the first authentication unit 511 of the authentication processing unit A 411 authenticates (first authentication) the user's authentication information sent from the system control unit A 421.

For example, in step S711, the first authentication unit 511 uses the card ID included in the user's authentication information as a key to search the first user information 431 stored in the authentication information storage unit A 423.

Here, because the card ID of the user's IC card is not included in the first user information 431, it is not possible for the first authentication unit 511 to acquire the user information of the user corresponding to the card ID as the search result of step S801.

In this case, the first authentication request unit 512 of the authentication processing unit A 411, for example, acquires, from the system control unit A 421, information concerning the power supply state of the body 112, and, after the power supply state of the body 112 becomes the normal state, transmits the authentication request requesting authentication of the user's card ID to the body 112.

In FIG. 11, as one example, it is assumed that, in step S802, a start-up of the body 112 has been completed, and the body 112 sends a power supply state change report indicating that the body 112 enters the normal state to the operating unit 111.

In step S803, the first authentication request unit 512 of the authentication processing unit A 411 requests the system control unit A 421 to acquire the power supply state.

In step S804, the system control unit A 421 reports the power supply state of the body 112 that is the normal state to the first authentication request unit 512 of the authentication processing unit A 411.

In step S805, the first authentication request unit 512 of the authentication processing unit A 411 transmits an authentication request requesting authentication of the user's card ID to the body 112.

In step S806, the authentication processing unit A 411 receives, from the body 112, the authentication result. Here, it is assumed that the body 112 succeeds in the authentication (second or third authentication that will be described later), and the authentication result includes the user information of the user corresponding to the card ID.

In this case, in step S807, the use permission unit 513 of the authentication processing unit A 411 determines that the body 112 has succeeded in the user's authentication, and permits the user's use of the image forming apparatus 110.

In step S808, the use permission unit 513 of the authentication processing unit A 411 sends a use permission report indicating that the use of the image forming apparatus 110 has been permitted to the operation screen page processing unit 412.

In step S809, the operation screen page processing unit 412 displays an already-login operation screen page on the operation panel 207 through the display input control unit 424.

Note that, if the use permission unit 513 of the authentication processing unit A 411 has received, from body 112, an authentication result (not including the user information) indicating a failure in the user's authentication in step S806, the use permission unit 513 does not permit the use of the image forming apparatus 110.

Figure 12:
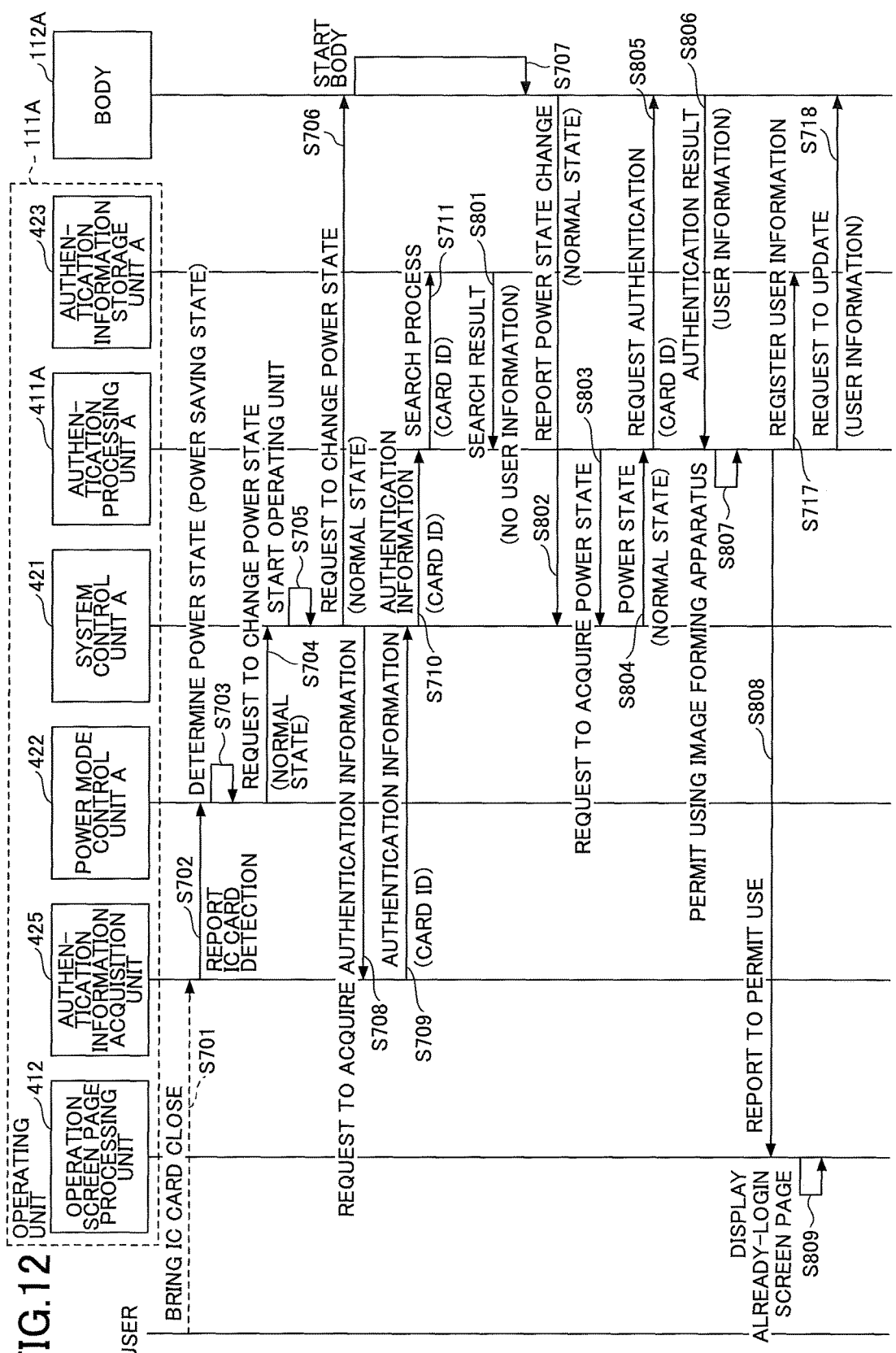
FIG. 12 illustrates another example of the process of the operating unit according to the variant of the first embodiment.

As illustrated in FIG. 12, step S719 concerning the restoration information is omitted according to the variant of the first embodiment.

(Process of Body)

Figure 13:
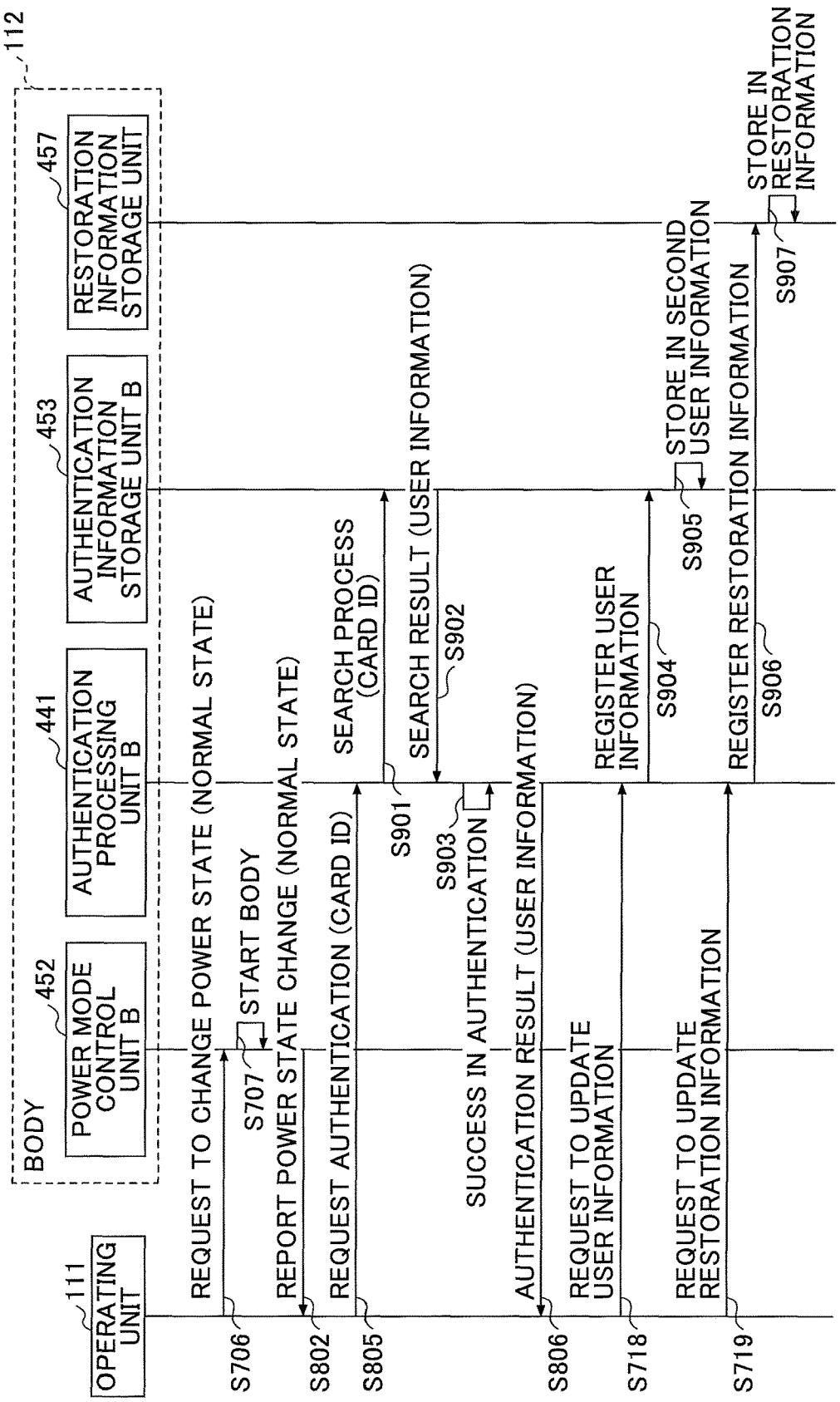
FIG. 13 is a sequence diagram illustrating one example of a process of the body according to the first embodiment.

FIG. 13 is a sequence diagram illustrating one example of a process of the body according to the first embodiment. The process illustrated in FIG. 9 illustrates a process of the body 112 corresponding to the process illustrated in FIG. 11, and the numbers of steps concerning messages transmitted to and received from the operating unit 111 correspond to the numbers of steps in FIG. 11. For example, a power supply state change request transmitted by the operating unit 111 in step S706 of FIG. 13 corresponds to the power supply state change request transmitted by the system control unit A 421 of the operating unit 111 in step S706 of FIG. 11.

Also, here, it is assumed that the card ID of the user's IC card is included in the stored second user information 461.

In step S706, the power mode control unit B 452 of the body 112 receives, from the operating unit 111, the power supply state change request requesting to enter the normal state.

In step S707, the power mode control unit B 452 of the body 112 starts a start-up of the body 112, and, after the completion of the start-up, the power mode control unit B 452 transmits, in step S802, the power supply state change report indicating the completion of a start-up of the body 112 to the operating unit 111.

In step S805, the authentication processing unit B 441 of the body 112 receives the authentication request requesting authentication of the user's card ID from the first authentication request unit 512 of the operating unit 111.

In steps S901 and S902, the second authentication unit 521 of the authentication processing unit B 441 authenticates (second authentication) the card ID included in the authentication request received from the operating unit 111.

For example, the second authentication unit 521 searches the mapping table 461a illustrated in FIG. 8B using the card ID included in the authentication request as a key, in step S901.

Here, as described above, the card ID of the user's IC card is included in the stored second user information 461, and therefore, the second authentication unit 521 acquires the user information of the user corresponding to the card ID, in step S902. For example, the second authentication unit 521 acquires the user information of the user corresponding to the card ID from the user information table 461b illustrated in FIG. 8B. Note that, a process when the card ID of the user's IC card is not included in the stored second user information 461 will be described later using FIG. 15.

In step S903, because the card ID included in the authentication request received from the operating unit 111 is included in the stored second user information 461, the authentication processing unit B 441 determines that the user's second authentication is succeeded in.

In step S806, the authentication processing unit B 441 transmits the authentication result including the user information of the user corresponding to the card ID to the operating unit 111.

In step S718, the authentication processing unit B 441 receives, from the operating unit 111, the user information update request.

In step S904, the second authentication management unit 523 of the authentication processing unit B 441 registers the user information included in the user information update request received from the operating unit 111 to be included in the second user information 461 stored in the nonvolatile storage unit 460 by the authentication information storage unit B 453.

In step S905, the user information for which the operating unit 111 requests an update is included in the stored second user information.

In step S719, the authentication processing unit B 441 receives, from the operating unit 111, the restoration information update request.

In step S906, the restoration information processing unit 524 of the authentication processing unit B 441 registers the restoration information included in the user information update request received from the operating unit 111 to be included in the restoration information 462 stored in the nonvolatile storage unit 460 by the restoration information storage unit 457.

In step S907, the restoration information for which the operating unit requests an update is included (for example, is overwritten) in the stored restoration information 462.

Figure 14:
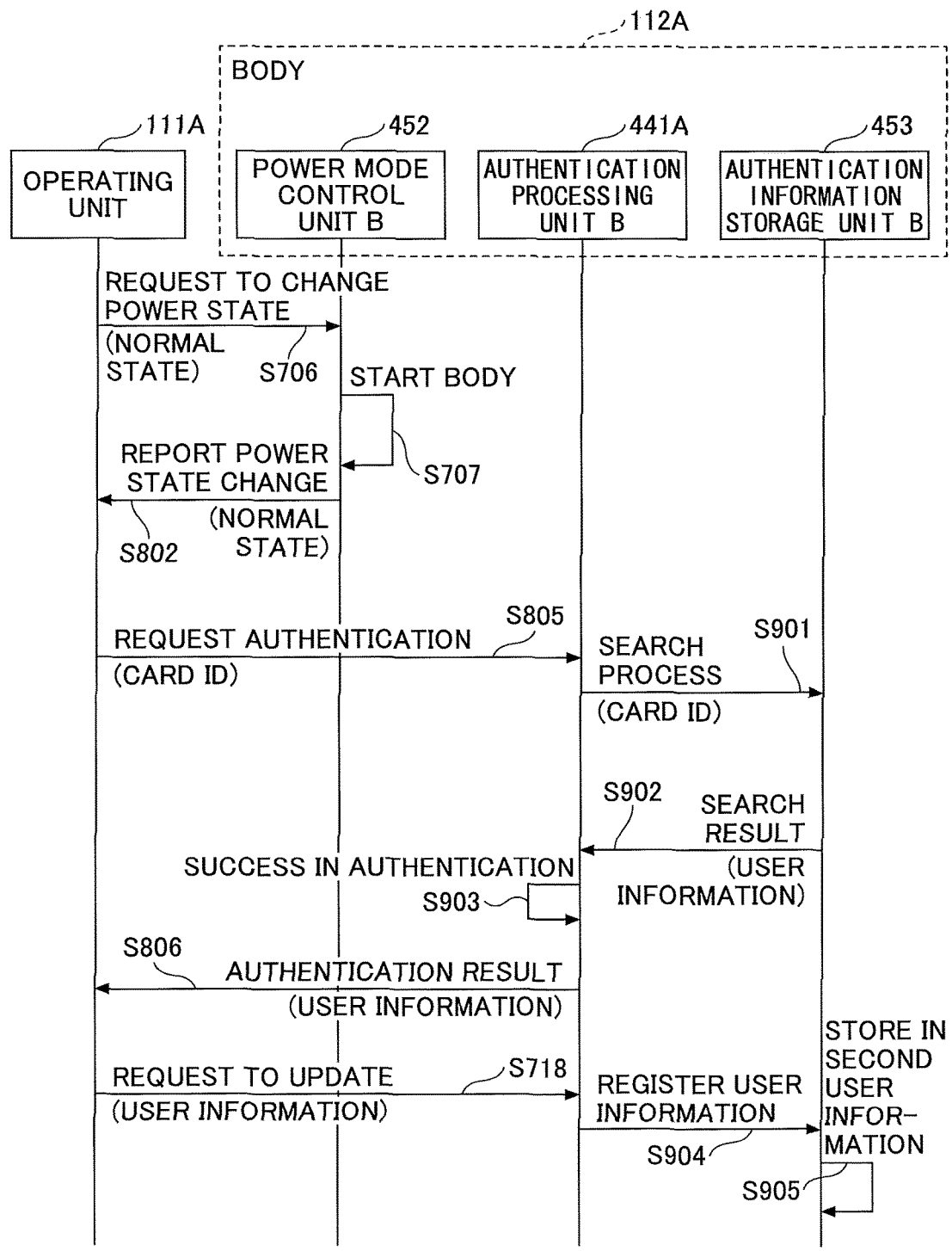
FIG. 14 is a sequence diagram illustrating one example of a process of the body according to the variant of the first embodiment.

As illustrated in FIG. 14, steps S719-S907 concerning the restoration information are omitted according to the variant of the first embodiment.

Figure 15:
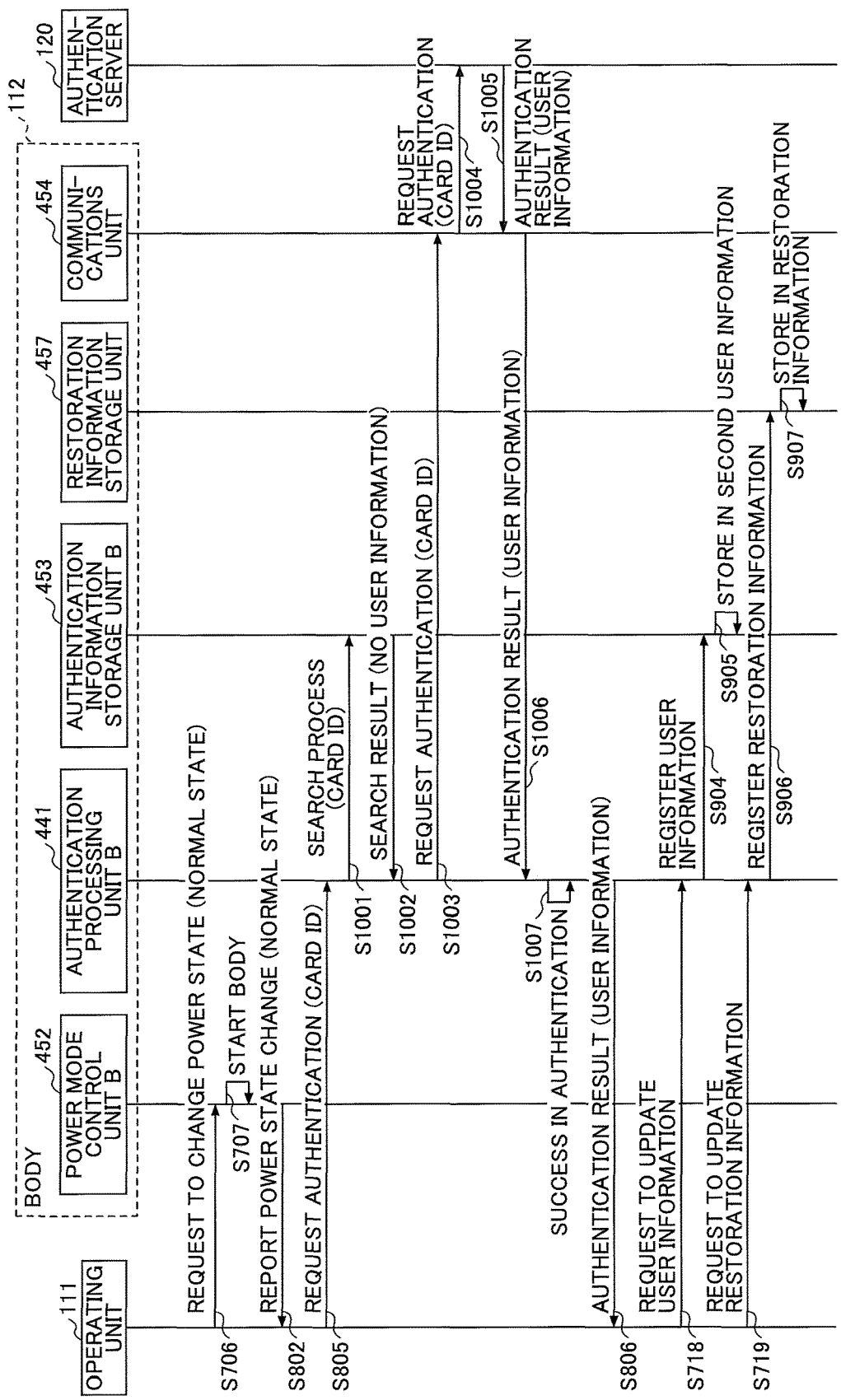
FIG. 15 is a sequence diagram illustrating another example of the process of the body according to the first embodiment.

FIG. 15 is a sequence diagram illustrating another example of a process of the body according to the first embodiment. The process illustrated in FIG. 15 illustrates a process of the body 112 corresponding to the process illustrated in FIG. 11. The numbers of steps concerning messages transmitted to and received from the operating unit 111 correspond to the numbers of steps of FIG. 11. Here, it is assumed that the card ID of the user's IC card is not included in the stored second user information 461, and is registered with the authentication server 120.

Note that, in FIG. 15, the process other than steps S1001-S1006 is the same as the process in FIG. 13. Therefore, mainly the points different from FIG. 13 will now be described.

In steps S1001 and S1002, the second authentication unit 521 of the authentication processing unit B 441 authenticates (second authentication) the card ID included in the authentication request received from the operating unit 111.

For example, the second authentication unit 521 searches, for example, the mapping table 461a illustrated in FIG. 8B using the card ID included in the authentication request as a key in step S1001.

Here, as described above, the card ID of the user's IC card is not included in the stored second user information 461, and therefore, in step S1002, the search result that there is no user information corresponding to the card ID (failure in the second authentication) results.

In steps S1003 and S1004, if the second authentication request unit 522 of the authentication processing unit B 441 fails in the second authentication, the second authentication request unit 522 transmits, through the communications unit 454, an authentication request requesting authentication (the third authentication) of the user's card ID to the authentication server 120.

After receiving the authentication request from the image forming apparatus 110, the authentication server 120 authenticates the card ID included in the authentication request, and returns the corresponding authentication result to the image forming apparatus 110. For example, if the authentication server 120 succeeds in the authentication of the card ID included in the authentication request, the authentication server 120 returns the authentication result including the user information of the user corresponding to the card ID to the image forming apparatus 110. On the other hand, if the authentication server 120 fails in the authentication of the card ID included in the authentication request, the authentication server 120 returns the authentication result not including the user information to the image forming apparatus 110.

Here, as described above, the user's card ID is stored in the authentication server 120, and therefore, in steps S1005 and S1006, the authentication processing unit B 441 receives, from the authentication server 120 through the communications unit 456, the authentication result including the user information.

In step S1007, because the authentication result transmitted from the authentication server 120 includes the user information, the second authentication request unit 522 of the authentication processing unit B 441 determines that the user's authentication (third authentication) is succeeded in, and transmits the authentication result including the user information to the operating unit 111 in step S806.

Figure 16:
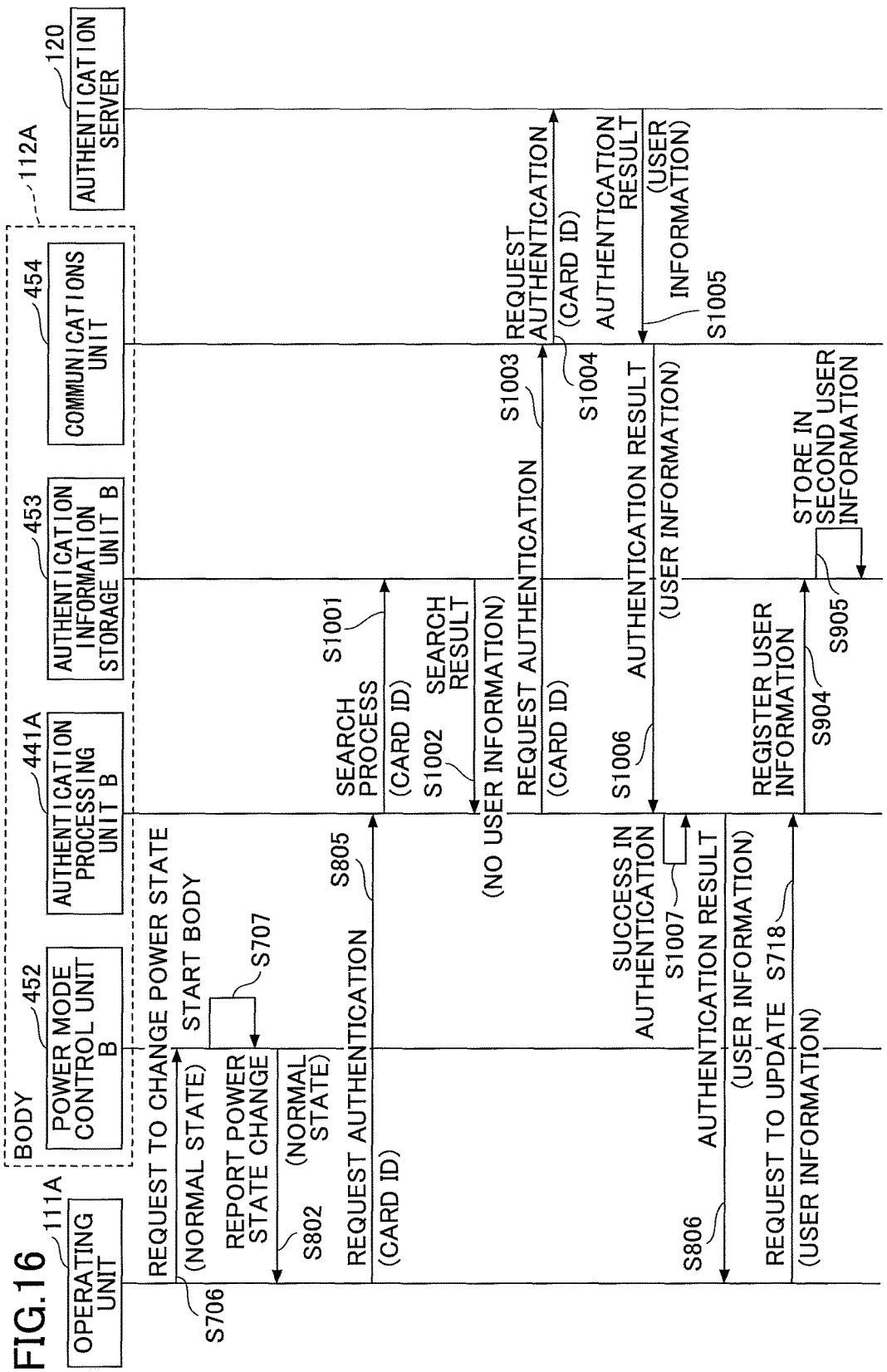
FIG. 16 is a sequence diagram illustrating another example of the process of the body according to the variant of the first embodiment.

As illustrated in FIG. 16, steps S719-S907 concerning the restoration information are omitted according to the variant of the first embodiment.

Thus, if the image forming apparatus 110 fails in the first authentication, the image forming apparatus 110 can carry out the second authentication using the second user information 461 stored in the nonvolatile storage unit 460 of the body 112.

Also, if the image forming apparatus 110 fails in the second authentication, the image forming apparatus 110 can carry out the third authentication using the authentication server 120.

Further, the image forming apparatus 110 permits the user who has succeeded in any one of the first through third authentication to use the image forming apparatus 110, and stores the user information of the user for whom the use is permitted to be included in the first user information 431 of the volatile storage unit 430. Thus, the image forming apparatus 110 can rapidly carry out the second or further subsequent authentication for the same user using the first user information 431 of the volatile storage unit 430.

As illustrated in FIG. 16, steps S719-S907 concerning the restoration information are omitted according to the variant of the first embodiment.

Thus, according to each of the first embodiment and the variant of the first embodiment, in the authentication system 100 or 100A carrying out authentication of the user of the image forming apparatus (i.e., the electronic apparatus) 110 or 110A that enters the power saving state, it is possible to shorten the period of time for authenticating the user when the image forming apparatus 110 or 110A has been in the power saving state.

(User Information Acquisition Process)

Next, a user information acquisition process carried out when, for example, the power supply is turned on in the image forming apparatus 110, or the like, according to the first embodiment will be described.

Figure 17:
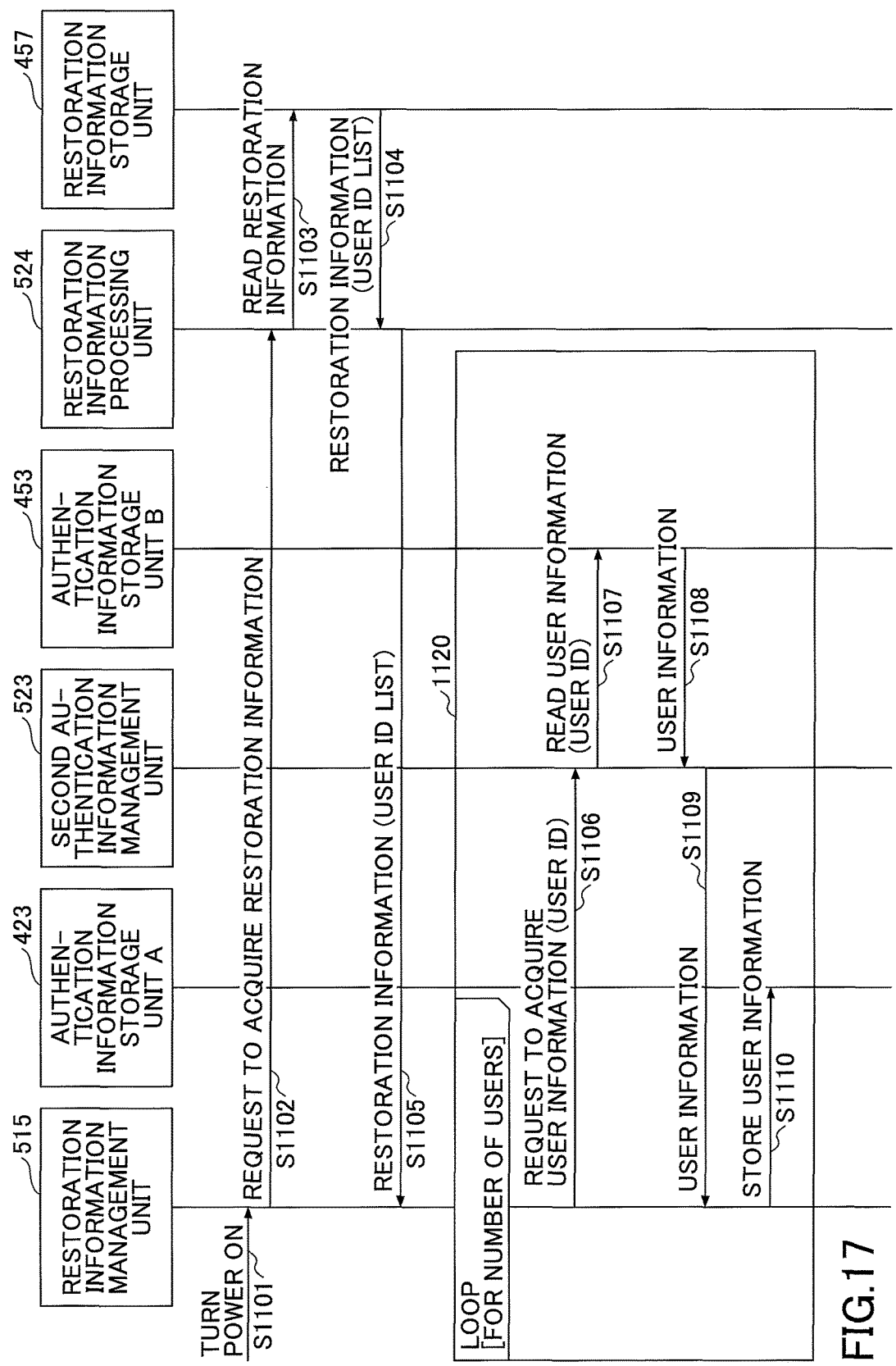
FIG. 17 is a sequence diagram of one example of a user information acquisition process according to the first embodiment.

FIG. 17 is a sequence diagram of one example of a user information acquisition process according to the first embodiment.

It is assumed that, in step S1101, for example, the power supply will be turned on in the image forming apparatus 110 in which the power supply has been turned off.

In step S1102, the restoration information management unit 515 of the operating unit 111 automatically starts up after the power supply is turned on in the image forming apparatus 110, and transmits a restoration information acquisition request requesting the restoration information from the restoration information processing unit 524 of the body 112.

In steps S1103 and S1104, the restoration information processing unit 524 of the body 112 acquires, from the restoration information storage unit 457, the restoration information 462 stored in the nonvolatile storage unit 460. Note that, according to the first embodiment, the restoration information 462 includes, for example, as illustrated in FIG. 8C, the information for identifying the users (for example, the list of user IDs) included in the first user information 431.

In step S1105, the restoration information processing unit 524 of the body 112 transmits the acquired restoration information 462 to the restoration information management unit 515 of the operating unit 111.

Next, the restoration information management unit 515 of the operating unit 111 carries out a process 1120 to acquire the user information of the users included in the restoration information 462 from the body 112. For example, the restoration information management unit 515 repeats steps S1108-S1110 the number of times equal to the number of users.

In step S1106, the restoration information management unit 515 of the operating unit 111 transmits a user information acquisition request to the second authentication management unit 523 of the body 112. The user information acquisition request includes the information for identifying a user (for example, the user ID).

In steps S1107 and S1108, the second authentication management unit 523 acquires the user information of the requested user from the second user information 461 stored in the nonvolatile storage unit 460 by the authentication information storage unit B 453. At this time, the user information to acquire includes information, for example, the card ID, the mail address, the facsimile number, the latest use date and time, and so forth, as illustrated in FIG. 8B, for restoring the first user information 431 illustrated in FIG. 8A.

In step S1109, the second authentication management unit 523 transmits the acquired user information to the restoration information management unit 515 of the operating unit 111.

In step S1110, the restoration information management unit 515 of the operating unit 111 stores the user information acquired from the body 112 to be included in the first user information 431 that is stored in the volatile storage unit 430 by the authentication information storage unit A 423.

By repeating steps S1106-S1110 the number of times equal to the number of the users, the first user information 431 stored in the volatile storage unit 430 of the operating unit 111 is restored to the state before the power supply was turned off in the image forming apparatus 110.

Note that the process of repeating steps S1106-S1110 the number of times equal to the number of the users is one example of the process 1120 to acquire the user information. For example, it is also possible that, in step S1106, the restoration information management unit 515 transmits a user information acquisition request including the list of user IDs that includes a plurality of user IDs to the second authentication management unit 523, acquires the user information of the plurality of users together, and stores the acquired user information to be included in the first user information 431.

(User Information Acquisition Process)

Figure 18:
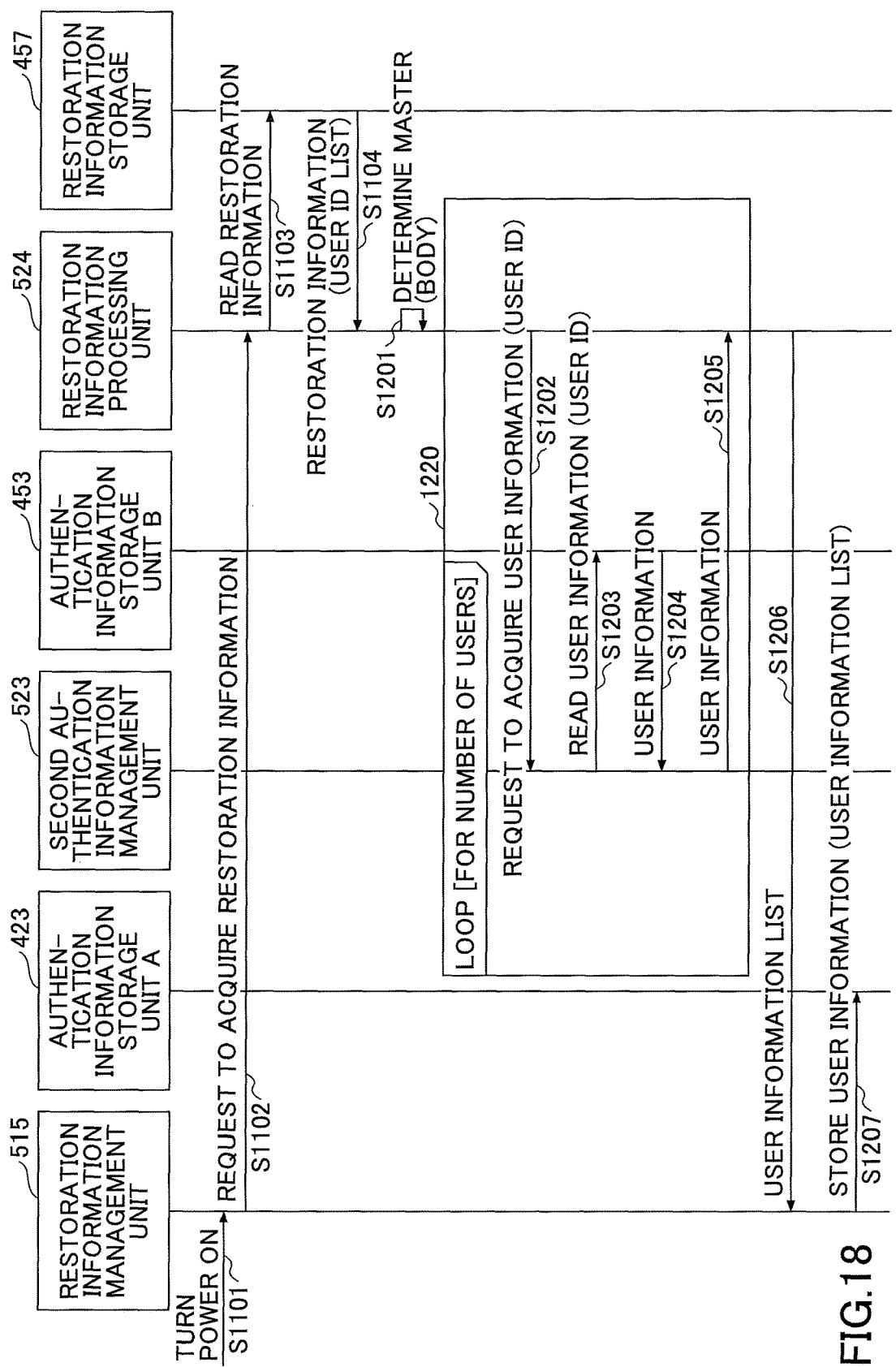
FIG. 18 is a sequence diagram illustrating another example of the user information acquisition process according to the first embodiment.

FIG. 18 is a sequence diagram illustrating another example of the user information acquisition process according to the first embodiment. This process is another example of the user information acquisition process illustrated in FIG. 17. Note that, steps S1101-S1104 in FIG. 18 are the same as steps S1101-S1104 in FIG. 17. Therefore, mainly the points different from the process of FIG. 17 will now be described.

In step S1201, the restoration information processing unit 524 determines a master of the user information.

The master of the user information means an apparatus that manages the original user information. For example, in the system having the authentication server 120 as illustrated in FIG. 1, the authentication server 120 is the master of the user information. On the other hand, in a system not using the authentication server 120 but using the user information stored in the body 112 of the image forming apparatus 110 as the original user information, the body 112 of the image forming apparatus 110 is the master of the user information. Below, it is assumed that the body 112 is the master of the user information.

In this case, the restoration information processing unit 524 of the body 112 carries out a process 1220 to acquire the user information of the users included in the restoration information 462 acquired from the restoration information storage unit 457. For example, the restoration information processing unit 524 repeats steps S1202-S1205 the number of times equal to the number of the users.

In step S1202, the restoration information processing unit 524 of the body 112 transmits a user information acquisition request to the second authentication management unit 523 of the body 112. The user information acquisition request includes the information for identifying a user (for example, the user ID).

In steps S1203 and S1204, the second authentication management unit 523 acquires the user information of the requested user from the second user information 461 stored in the nonvolatile storage unit 460 by the authentication information storage unit B 453. At this time, the user information to acquire is information, i.e., for example, the card ID, the mail address, the facsimile number, the latest use date and time, and so forth, illustrated in FIG. 8B, for restoring the first user information 431 illustrated in FIG. 8A.

In step S1205, the second authentication management unit 523 transmits the acquired user information to the restoration information processing unit 524 of the body 112.

Note that, the process of relating steps S1202-S1205 the number of times equal to the number of the users is one example of the process 1220 to acquire the user information. For example, it is also possible that, in step S1202, the restoration information processing unit 524 transmits a user information acquisition request including the list of user IDs that includes a plurality of user IDs to the second authentication management unit 523 to acquire the user information of the plurality of users together.

In step S1206, the restoration information processing unit 524 generates a user information list including the acquired user information of the plurality of the users, and transmits the list to the restoration information management unit 515 of the operating unit 111. The user information list to be transmitted by the restoration information processing unit 524 at this time is the same information as the first user information 431 illustrated in FIG. 8A, for example.

In step S1207, the restoration information management unit 515 of the operating unit 111 stores the user information list acquired from the body 112 to be included in the first user information 431 stored in the volatile storage unit 430 by the authentication information storage unit A 423.

Thus, the first user information 431 stored in the volatile storage unit 430 of the operating unit 111 is restored to the state before the power supply was turned off in the image forming apparatus 110.

(User Information Acquisition Process)

FIG. 19 is a sequence diagram illustrating yet another example of the user information acquisition process according to the first embodiment. This process is one example of a process in a case where the master is the authentication server 120. Note that, steps S1101-S1104 in FIG. 19 are the same as steps S1101-S1104 in FIG. 17. Therefore, mainly the points different from the process of FIG. 17 will now be described.

In step S1301, the restoration information processing unit 524 determines the master of the user information. Here, as described above, the authentication server 120 is determined as the master of the user information.

In this case, the restoration information processing unit 524 of the body 112 acquires, from the authentication server 120, the user information of the users included in the restoration information 462 acquired from the restoration information storage unit 457.

For example, in step S1302, the restoration information processing unit 524 of the body 112 transmits, to the authentication server 120, a user information acquisition request including the list of user IDs included in the restoration information 462 such as that illustrated in FIG. 8C.

In step S1303, the restoration information processing unit 524 of the body 112 receives the user information list from the authentication server 120.

In step S1304, the restoration information processing unit 524 of the body 112 transmits the user information list received from the authentication server 120 to the restoration information management unit 515 of the operating unit 111.

In step S1305, the restoration information management unit 515 of the operating unit 111 stores the user information list acquired from the body 112 to be included in the first user information 431 stored in the volatile storage unit 430 by the authentication information storage unit A 423.

Note that, in this case, the user information list acquired from the authentication server 120 does not include the information "latest use date and time", for example, illustrated in FIG. 8A. Therefore, as the information "latest use date and time", the date and time at which the first user information has been restored is stored, for example.

Further, if the number of records of the user information has reached the limit of the storage capacity of the first user information 431, and a plurality of records having the old "latest use date and time" information are stored, the first authentication information management unit 514 deletes records of the user information in the order of the storage (for example, in the order from the top), for example.

Through any one of the processes of FIGS. 17-19, the restoration information management unit 515 can restore the first user information 431 stored in the volatile storage unit 430 of the operating unit 111 to the information before the power supply was turned off in the image forming apparatus 110.

As a result, in the image forming apparatus 110, it is possible to increase the speed of the user's authentication using the cached information stored in the volatile storage unit 430 of the operating unit 111, even after the power supply is turned on, in the same way as before the power supply was turned off.

Second Embodiment

According to the first embodiment described above, the restoration information 462 stored by the nonvolatile storage unit 460 of the body 112 is the information for identifying a user (for example, the user ID). According to a second embodiment of the present invention, the restoration information 462 stored by the nonvolatile storage unit 460 of the body 112 is the same as the first user information stored by the volatile storage unit 430 of the operating unit 111.

(Restoration Information)

FIGS. 20A and 20B illustrate examples of information managed by an image forming apparatus according to the second embodiment. First user information 431 illustrated in FIG. 20A is the same as the first user information 431 illustrated in FIG. 8A.

On the other hand, as restoration information 462 illustrated in FIG. 20B, the same information as the first user information illustrated in FIG. 20A is stored, instead of the list of user IDs of the restoration information 462 illustrated in FIG. 8C.

(Restoration Information Storage Process)

The process of the operating unit 111 according to the second embodiment is the same as the process of, for example, the operating unit according to the first embodiment illustrated in FIG. 9. However, in step S719 of FIG. 9, the restoration information request transmitted by the restoration information management unit 515 of the authentication processing unit A 411 includes the user information of the user permitted to use the image forming apparatus 110 by the use permission unit 513.

Also, a process of the body 112 according to the second embodiment is the same as, for example, the process of the body according to the first embodiment illustrated in FIG. 13. However, in step S906 of FIG. 13, the restoration information processing unit 524 of the authentication processing unit B 441 registers the user information acquired from the operating unit 111 to be included in the restoration information 462 in the same way as the first user information.

According to the second embodiment, the number of records of user information storable as the restoration information 462 is the same as the first user information 431. Also, if the number of records of user information has reached the limit of the number of records of user information storable as the restoration information 462, the restoration information processing unit 524 deletes the user information from the user information having the oldest latest use date and time information in sequence, and stores the new user information to be included in the restoration information 462.

As a result, the restoration information processing unit 524 stores, as the restoration information 462 stored by the nonvolatile storage unit 460 of the body 112, the same information as the first user information 431 stored by the volatile storage unit 430 of the operating unit 111.

(User Information Acquisition Process)

Figure 21:
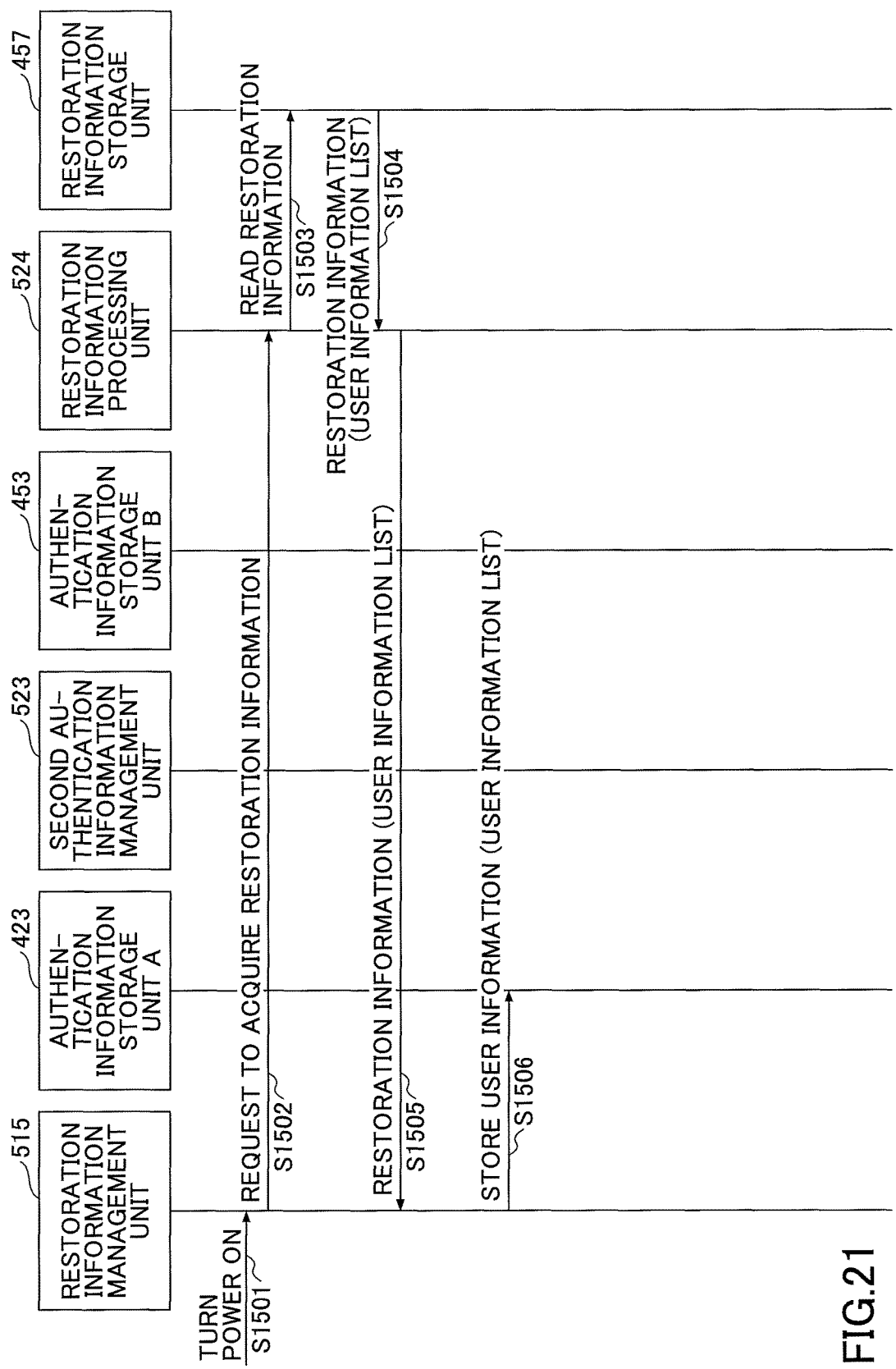
FIG. 21 is a sequence diagram illustrating one example of a user information acquisition process according to the second embodiment.

FIG. 21 is a sequence diagram illustrating one example of a user information acquisition process according to the second embodiment.

In step S1501, for example, it is assumed that, in the image forming apparatus 110 where the power supply has been turned off, the power supply will be turned on.

In step S1502, the restoration information management unit 515 of the operating unit 111 transmits, to the restoration information processing unit 524 of the body 112, a restoration information acquisition request requesting to acquire the restoration information.

In steps S1503 and S1504, the restoration information processing unit 524 acquires the restoration information 462 stored in the nonvolatile storage unit 460 by the restoration information storage unit 457. Note that, according to the second embodiment, the restoration information 462 includes, as illustrated in FIG. 20B, the user information of a plurality of users (hereinafter, referred to as a user information list), as being the same as the first user information 431.

In step S1505, the restoration information processing unit 524 of the body 112 transmits the acquired restoration information 462 to the restoration information management unit 515 of the operating unit 111.

In step S1506, the restoration information management unit 515 of the operating unit 111 stores the restoration information 462 acquired from the body 112 as the first user information 431 stored in the volatile storage unit 430 by the authentication information storage unit A 423.

Thus, the restoration information management unit 515 can restore the first user information 431 stored in the volatile storage unit 430 of the operating unit 111 to the information that was present before the power supply in the image forming apparatus 110 was turned off.

Third Embodiment

According to the first and second embodiments described above, the authentication processing unit A 411 of the operating unit 111 cooperates with the authentication processing unit B 441 of the body 112, and carries out various processes (the authentication process, the restoration process, and so forth). In another example, it is also possible that the authentication processing unit A 411 of the operating unit 111 does not use the applications of the body 112, uses an API provided by the system control unit B 451 of the body, to carry out the various processes.

<Functional Configuration>

Figure 22:
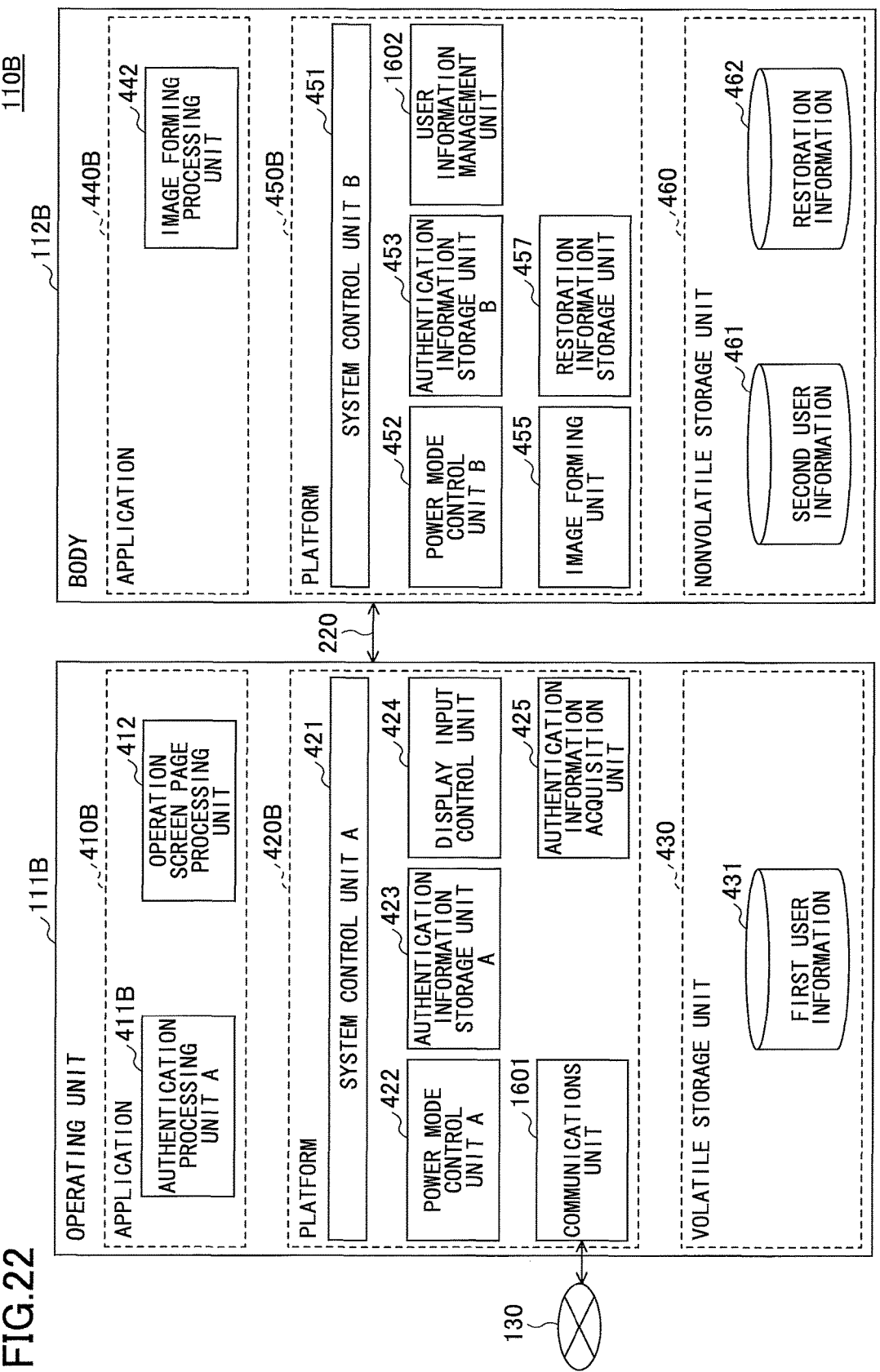
FIG. 22 is a functional configuration diagram illustrating one example of an image forming apparatus according to a third embodiment.

FIG. 22 is a functional configuration diagram of an image forming apparatus according to the third embodiment.

Note that the image forming apparatus 110B according to the third embodiment is almost the same as the image forming apparatus 110 according to the first embodiment. The same reference numerals are given to the elements the same as the elements of the first embodiment, while the suffix "B" is added to the reference numerals of the elements (for example, "110B" with respect to "110") that are almost the same as the elements of the first embodiment. Also, concerning the image forming apparatus 110B according to the third embodiment, mainly points different from the image forming apparatus 110 according to the first embodiment will be described, and duplicate description will be omitted.

(Functional Configuration of Operating Unit)

In FIG. 22, the operating unit 111B of the image forming apparatus 110B according to the third embodiment includes, in addition to the functional configuration of the operating unit 111 according to the first embodiment illustrated in FIG. 4, a communications unit 1601.

The communications unit 1601 uses, for example, the communications I/F 205 of FIG. 2, to connect the image forming apparatus 110B to the network 130, and carry out communications with an apparatus connected to the network 130 (for example, the authentication server 120).

Figure 23:
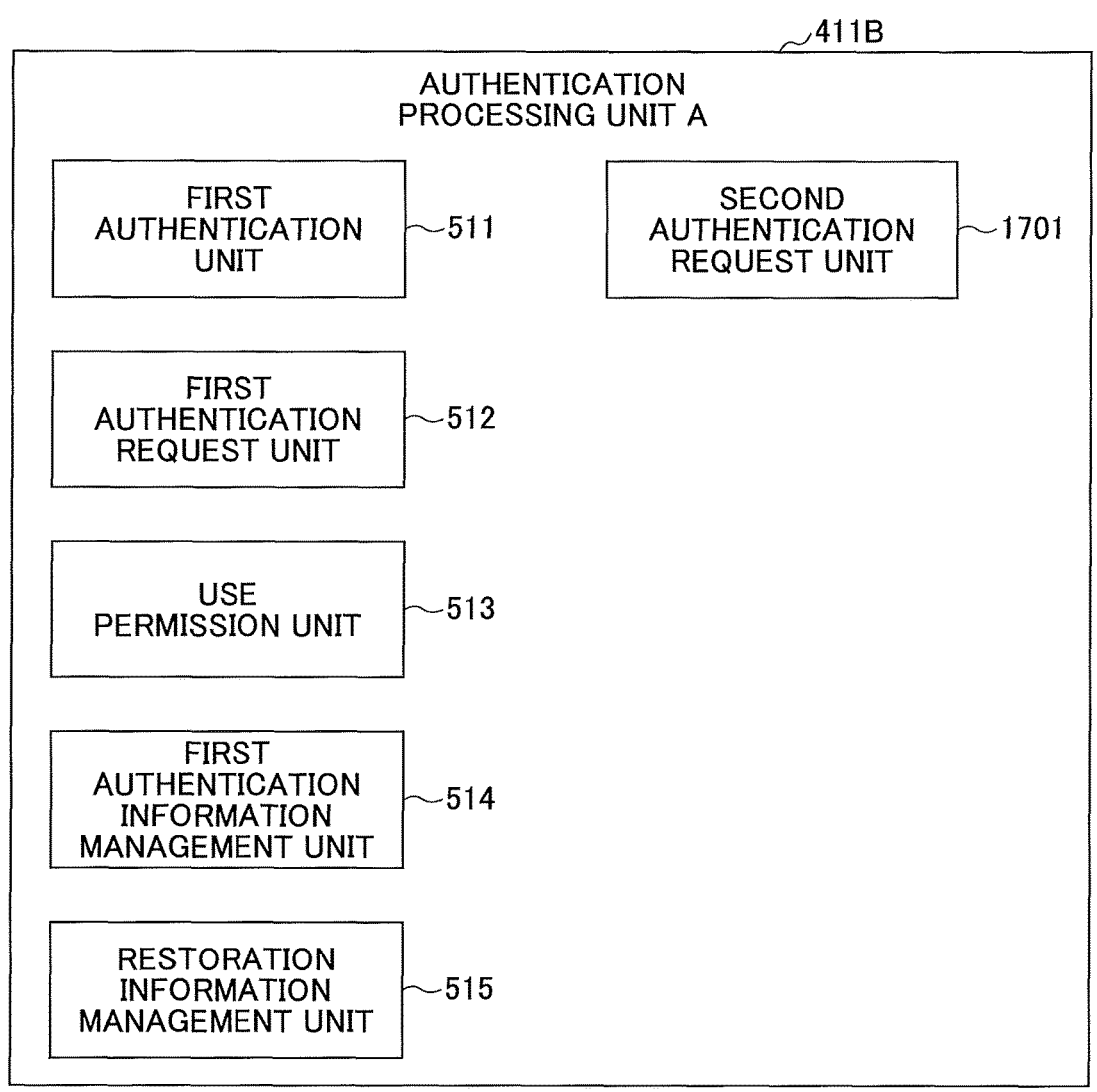
FIG. 23 illustrates one example of a functional configuration of an authentication processing unit according to the third embodiment.

Also, an authentication processing unit A 411B according to the third embodiment includes, as illustrated in FIG. 23, a second authentication request unit 1701, in addition to the authentication processing unit A 411 according to the first embodiment illustrated in FIG. 6A.

If the first authentication request unit 512 has failed in the second authentication requested to the body 112B, the second authentication request unit 1701 requests the authentication server 120 through the communications unit 1601 to authenticate (second authentication) the user's authentication information acquired by the authentication information acquisition unit 425.

Note that, the functional configuration of the operating unit 111B other than the functional configuration mentioned above is the same as the functional configuration of the operating unit 111 according to the first embodiment illustrated in FIG. 4.

(Functional Configuration of Body)

In FIG. 22, the body 112B of the image forming apparatus 110B includes, instead of the authentication processing unit B 441 included in the application 440 included in the operating unit 111 according to the first embodiment illustrated in FIG. 4, a user information management unit 1602 in a platform 450B. Also, according to the third embodiment, the communications unit 454 may be omitted from the platform 450B of the body 112B as illustrated in FIG. 22.

The user information management unit 1602 uses the API provided by the system control unit B 451, and responds to, for example, a request from the operating unit 111B, to carry out the second authentication process of searching the second user information using the user's authentication information (the card ID, or the like) as a key.

Note that, the functional configuration of the body 112B other than the above-mentioned configuration is the same as the configuration of the body 112 according to the first embodiment illustrated in FIG. 4.

<Process Flow>
(Process of Operating Unit)

According to the third embodiment, in one example, a process carried out by the operating unit 111B when the user's authentication information (the card ID, or the like) acquired by the authentication information acquisition unit 425 has been stored to be included in the first user information of the operating unit 111B is the same as the process of the operating unit according to the first embodiment illustrated in FIG. 9.

Figure 24:
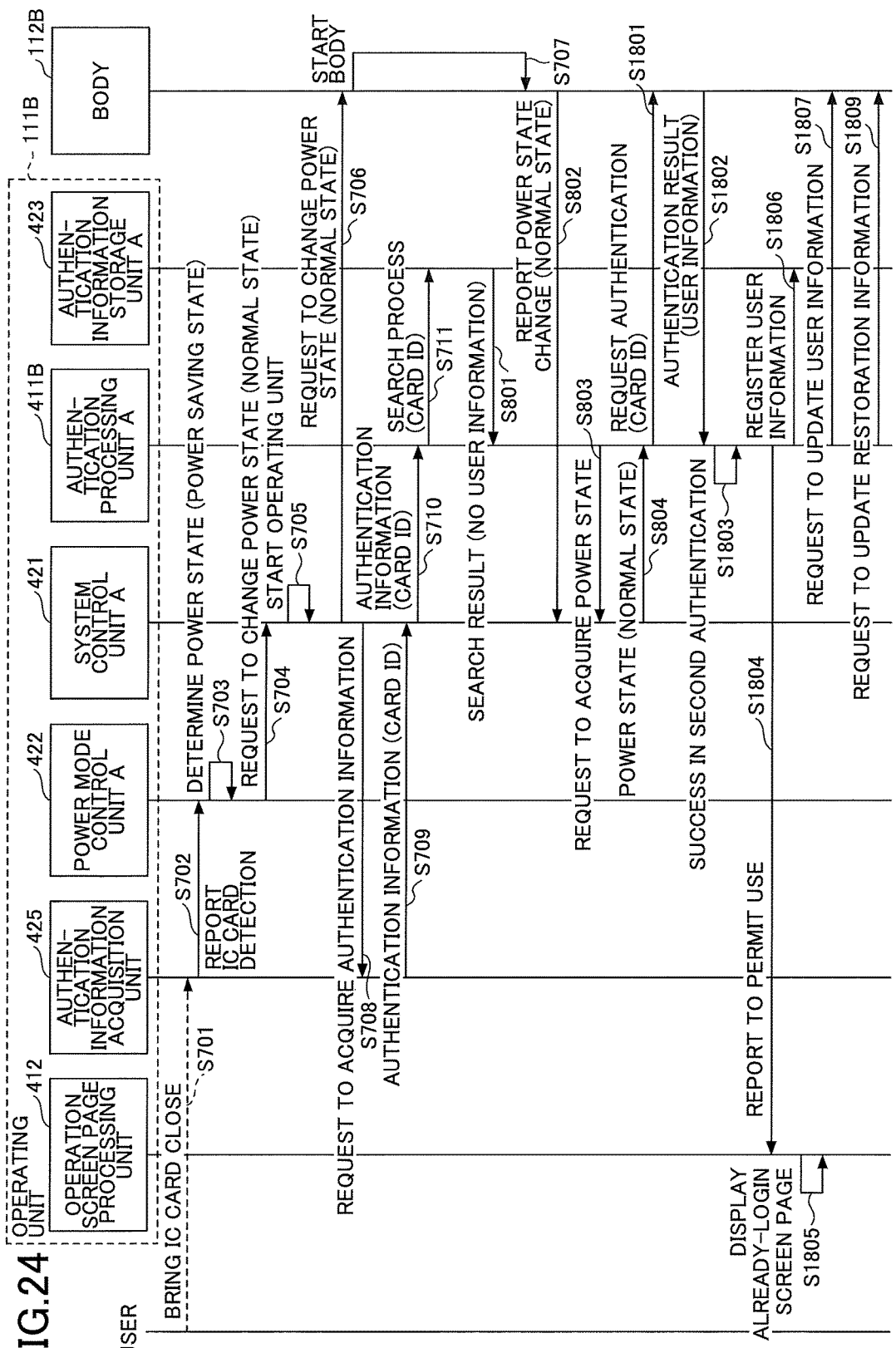
FIG. 24 is a sequence diagram illustrating one example of a process of an operating unit according to the third embodiment.

FIG. 24 is a sequence diagram illustrating another example of a process of the operating unit 111B according to the third embodiment. This process is an example of a process carried out by the operating unit 111B when the user's authentication information (the card ID, or the like) acquired by the authentication information acquisition unit 425 is stored to be included in the second user information of the body 112B. Note that, in FIG. 24, steps S701-S804 are the same as steps S701-S804 of the process of the operating unit according to the first embodiment illustrated in FIG. 11. Therefore, mainly the points different from the first embodiment will now be described.

If the authentication processing unit A 411B of the operating unit 111B has failed in the first authentication carried out by the first authentication unit 511 (step S801), the authentication processing unit A 411B carries out step S1801, for example, after confirming that the body 112B has started up in steps S803 and S804.

In step S1801, the first authentication request unit 512 of the authentication processing unit A 411B uses an API provided by the system control unit B 451 of the body 112, to request the user information management unit 1602 to carry out the authentication of the user's card ID acquired by the authentication information acquisition unit 425.

In step S1802, the first authentication request unit 512 of the authentication processing unit A 411B receives, from the body 112B, the authentication result. Here, as described above, the second user information of the body 112B includes the card ID. Therefore, the authentication result transmitted from the body 112 includes the user information of the user corresponding to the card ID.

In step S1803, the use permission unit 513 of the operating unit 111B determines that the second authentication is succeeded in, and, in step S1804, the use permission unit 513 transmits a use permission report indicating that the use of the image forming apparatus 110 has been permitted to the operation screen page processing unit 412.

In step S1805, the operation screen page processing unit 412 displays an already-login operation screen page on the operation panel 207 through the display input control unit 424.

In step S1806, the first authentication information management unit 514 of the authentication processing unit A 411B registers (stores) the user information including the authentication information of the user who has been permitted by the use permission unit 513 to use the image forming apparatus 110B to be included in the first user information.

In step S1807, the first authentication information management unit 514 of the authentication processing unit A 411B uses an API provided by the system control unit B 451 of the body 112B, to request to update the user information of the user permitted to use the image forming apparatus 110B.

In step S1809, the restoration information management unit 515 of the authentication processing unit A 411B uses an API provided by the system control unit B 451 of the body 112B, to request to update the restoration information. The corresponding restoration information update request includes, for example, the restoration information 462 illustrated in FIG. 8C.

Thus, the authentication processing unit A 411B of the operating unit 111B can carry out the second authentication, update the second user information 461, and update the restoration information 462 using the API provided by the system control unit B 451 of the body 112B.

Figure 25:
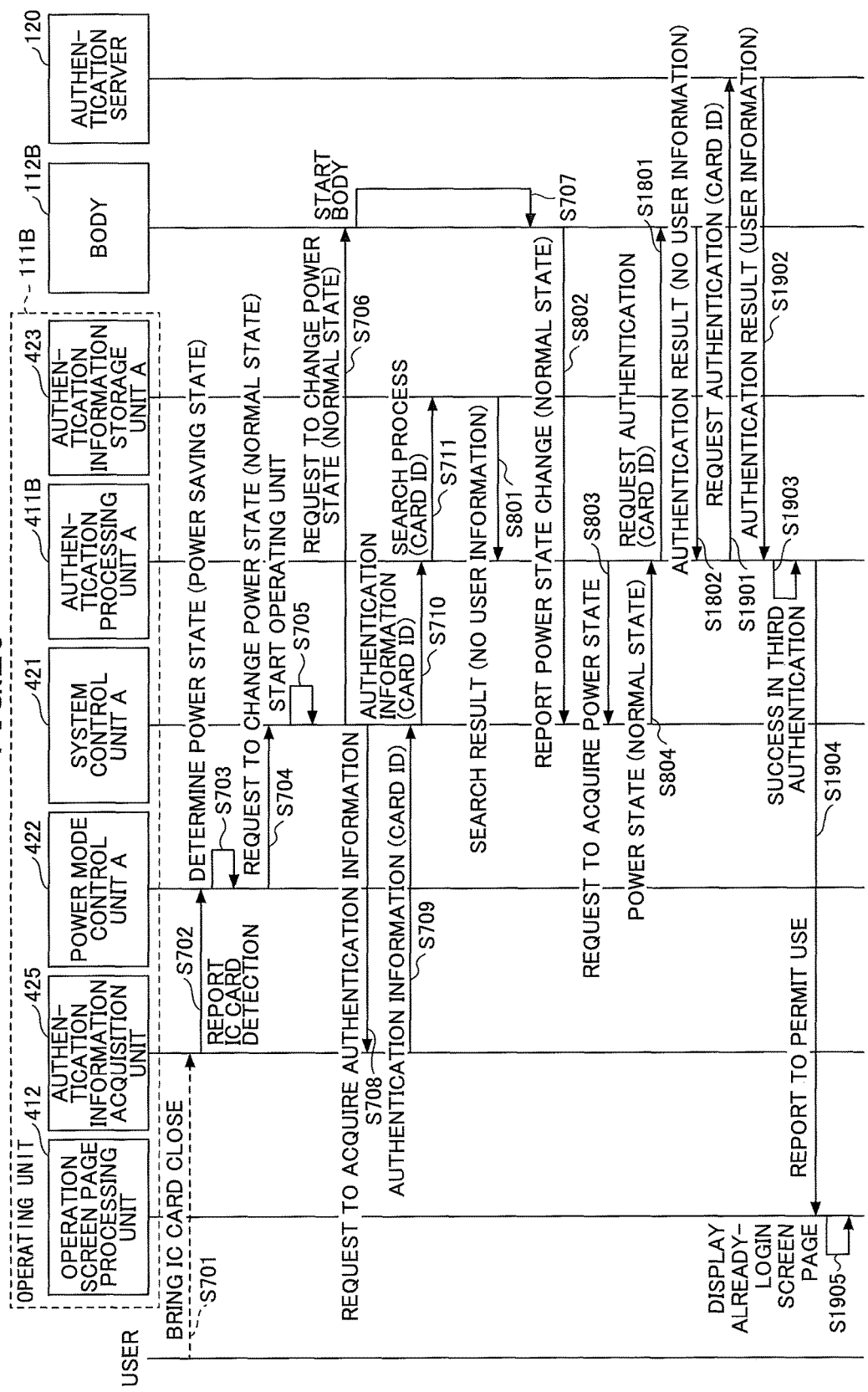
FIG. 25 is a sequence diagram illustrating another example of the process of the operating unit according to the third embodiment.

FIG. 25 is a sequence diagram illustrating yet another example of a process of the operating unit according to the third embodiment. This process is one example of a process carried out when the user's authentication information (the card ID, or the like) acquired by the authentication information acquisition unit 425 has not been stored to be included in the second user information of the body, and has been stored in the authentication server 120. Note that, in FIG. 25, steps S701-S804 are the same as steps S701-S804 of the process of the operating unit according to the first embodiment illustrated in FIG. 11. Therefore, mainly the points different from the first embodiment will now be described.

If the authentication processing unit A 411B of the operating unit 111B has failed in the first authentication carried out by the first authentication unit 511 (step S801), the authentication processing unit A 411B carries out step S1801, for example, after confirming, in steps S803 and S804, that the body 112B has started up.

In step S1801, the first authentication request unit 512 of the authentication processing unit A 411B uses an API provided by the system control unit B 451 of the body 112B to request the user information management unit 1602 to carry out the authentication of the user's card ID acquired from the authentication information acquisition unit 425.

In step S1802, the first authentication request unit 512 of the authentication processing unit A 411B receives the authentication result from the body 112B. Here, as described above, in the stored second user information of the body 112B, no card ID is included. Therefore, the authentication result transmitted from the body 112B does not include the user information of the user corresponding to the card ID.

In step S1901, the second authentication request unit 1701 of the authentication processing unit A 411B determines that the second authentication is failed in, and requests the authentication server 120 through the communications unit 1601 to authenticate (third authentication) the user's card ID acquired by the authentication information acquisition unit 425.

In step S1902, the second authentication request unit 1701 of the authentication processing unit A acquires the authentication result from the authentication server 120. Here, as described above, the user's card ID acquired by the authentication information acquisition unit 425 is stored in the authentication server 120. Therefore, the authentication result includes the user information of the user corresponding to the card ID.

In step S1903, the use permission unit 513 of the operating unit 111B determines that the third authentication is succeeded in, and, in step S1904, the use permission unit 513 sends a use permission report indicating that the use of the image forming apparatus 110B has been permitted to the operation screen page processing unit 412.

In step S1905, the operation screen page processing unit 412 displays an already-login operation screen page on the operation panel 207 through the display input control unit 424.

After carrying out step S1905, the authentication processing unit A 411B of the operating unit 111B carried out the process the same as steps S1806-S1809 of FIG. 24.

Thus, if the first authentication and the second authentication have been failed in, the authentication processing unit A 411B of the operating unit 111B can cause the third authentication to be carried out by the authentication server 120 using the communications unit 1601 of the operating unit 111B (Process of Body)

Figure 26:
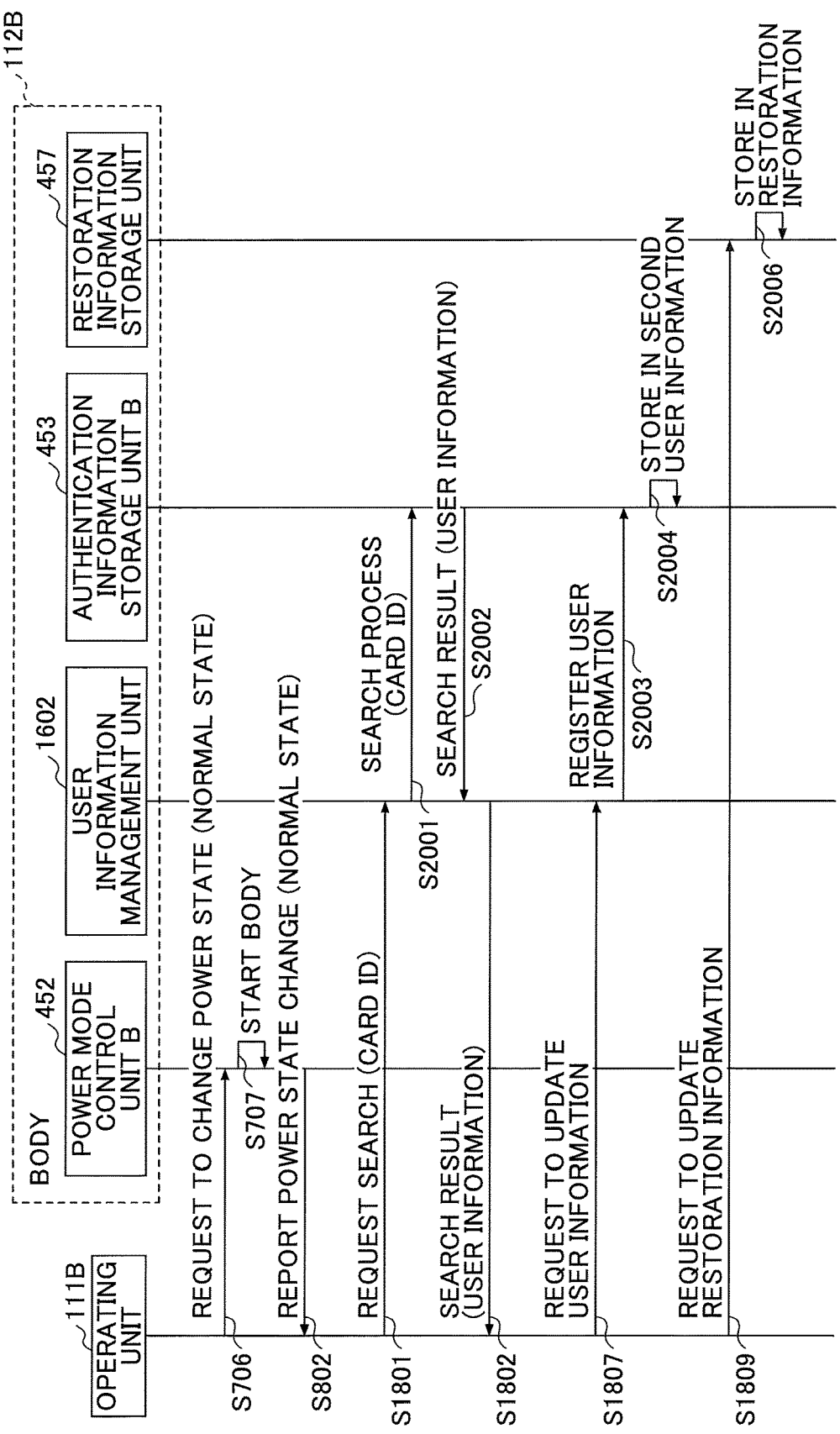
FIG. 26 is a sequence diagram illustrating one example of a process of a body according to the third embodiment.

FIG. 26 is a sequence diagram illustrating one example of a process of the body according to the third embodiment. The process illustrated in FIG. 26 illustrates a process of the body 112B corresponding to the process illustrated in FIG. 24, and the numbers of steps concerning the messages transmitted to or received from the operating unit 111B correspond to the number of steps of FIG. 24. For example, a search request transmitted by the operating unit 111B in step S1801 of FIG. 26 corresponds to the authentication request transmitted by the first authentication request unit 512 of the operating unit 111B in step S1801 of FIG. 24.

Also, hereinafter, it is assumed that the card ID of the user's IC card has been included in the stored second user information 461.

In step S706, the power mode control unit B 452 of the body 112B receives, from the operating unit 111B, a power supply state change request requesting to enter the normal state.

In step S707, the power mode control unit B 452 of the body 112B starts a process to start up the body 112B, and, after the start up is completed, the power mode control unit B 452 transmits, in step S802, a power supply state change report indicating that the start-up of the body 112B has been completed, to the operating unit 111B.

In step S1801, the user information management unit 1602 of the body 112B receives, from the first authentication request unit 512 of the operating unit 111, the authentication request requesting authentication of the user's card ID transmitted using the API of the system control unit B 451.

In steps S2001 and S2002, the user information management unit 1602 carries out a search (the second authentication) for the card ID included in the authentication request received from the operating unit 111.

For example, in step S2001, the user information management unit 1602 searches the mapping table 461a illustrated in FIG. 8B using the card ID included in the authentication request as a key.

Here, as described above, the card ID of the user's IC card is included in the stored second user information 461. Therefore, the user information management unit 1602 acquires the user information of the user corresponding to the card ID in step S2002.

In step S1802, the user information management unit 1602 transmits the authentication result including the user information of the user corresponding to the card ID to the operating unit 111B.

In step S1807, the user information management unit 1602 of the body 112B receives the user information update request generated using the API of the system control unit B 451 from the first authentication information management unit 514 of the operating unit 111B.

In step S2003, the user information management unit 1602 of the body 112B registers the user information included in the user information update request received from the operating unit 111B to be included in the second user information 461 stored in the nonvolatile storage unit 460 by the authentication information storage unit B 453.

In step S2004, the user information with which the operating unit 111 requests to update is included in the stored second user information.

In step S1809, the restoration information storage unit 457 of the body 112B receives, from the restoration information management unit 515 of the operating unit 111B, the restoration information update request generated using the API of the system control unit B 451.

In step S2006, the restoration information storage unit 457 of the body 112B stores the restoration information included in the restoration information update request received from the operating unit 111B to be included in the restoration information 462 of the nonvolatile storage unit 460.

(User Information Acquisition Process)

Next, a user information acquisition process according to the third embodiment will be described. This process is one example of a process carried out when the above-described master of the user information is the second user information stored in the nonvolatile storage unit 460 of the body 112B.

Figure 27:
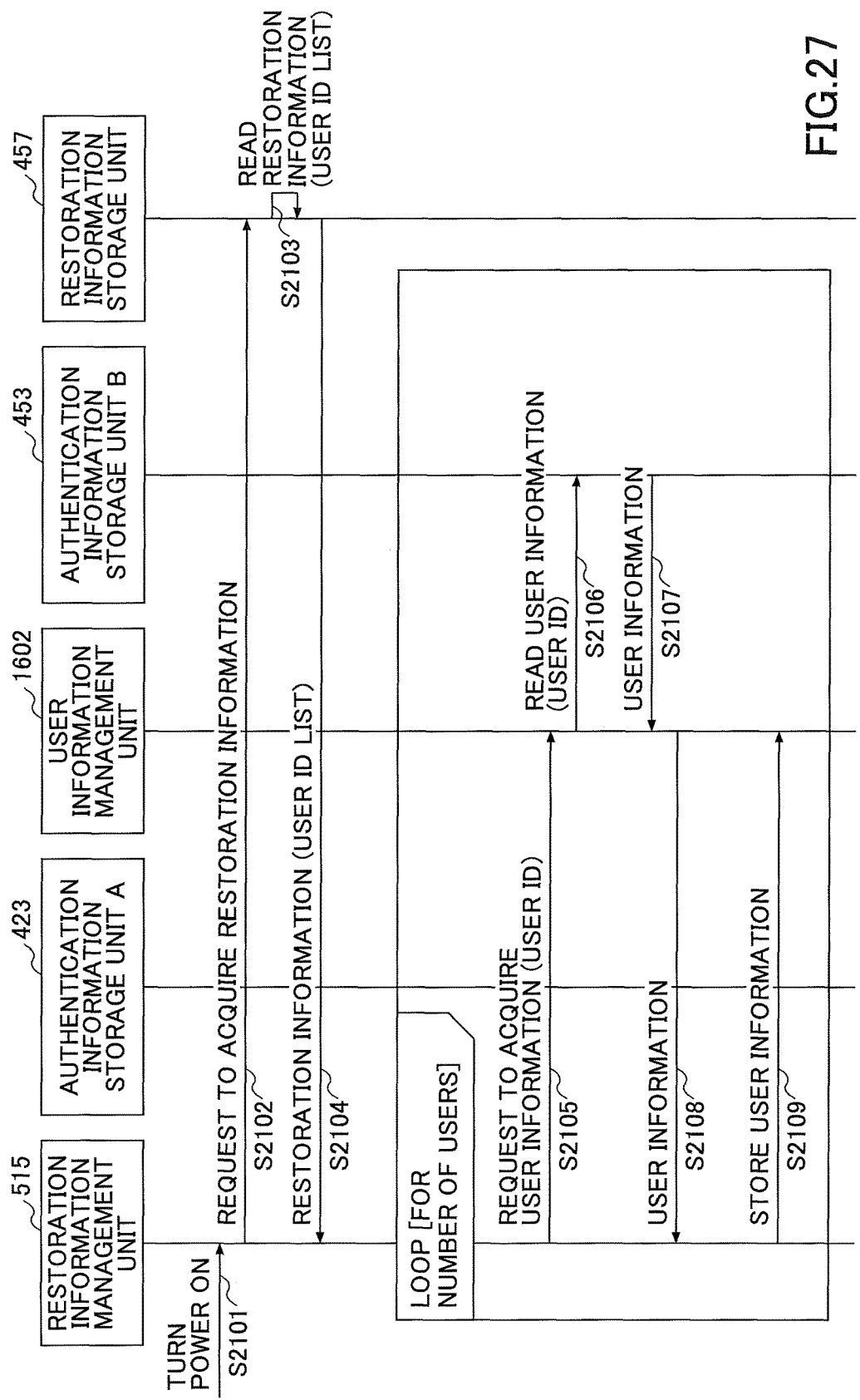
FIG. 27 is a sequence diagram illustrating one example of a user information acquisition process according to the third embodiment.

FIG. 27 is a sequence diagram illustrating one example of a user information acquisition process according to the third embodiment.

In step S2101, for example, it is assumed that in the image forming apparatus 110B where the power supply has been turned off, the power supply will be turned on.

In step S2102, the restoration information management unit 515 of the operating unit 111B uses an API provided by the system control unit B 451 of the body 112B to request the restoration information storage unit 457 of the body 112B to acquire the restoration information.

In step S2103, the restoration information storage unit 457 reads the restoration information 462 stored in the nonvolatile storage unit 460. Note that, the restoration information 462 includes, for example, as illustrated in FIG. 8C, the list of user IDs for identifying the first user information 431.

In step S2104, the restoration information storage unit 457 of the body 112B transmits the read restoration information 462 to the restoration information management unit 515 of the operating unit 111B.

Next, the restoration information management unit 515 of the operating unit 111B carries out a process 2120 to acquire the user information of the users included in the restoration information 462 acquired from the body 112B. For example, the restoration information management unit 515 repeats steps S2105-S2109 the number of times equal to the number of users.

In step S2105, the restoration information management unit 515 of the operating unit 111B uses an API provided by the system control unit B 451 of the body 112B to request the user information management unit 1602 to acquire the user information. This request includes information (the user ID) for identifying a user.

In steps S2106 and S2107, the user information management unit 1602 of the body 112B acquires the user information of the requested user from the second user information 461 stored in the nonvolatile storage unit 460 by the authentication information storage unit B 453. At this time, the user information to be acquired includes information, i.e., for example, the card ID, the mail address, the facsimile number, the latest use date and time, and so forth, illustrated in FIG. 8B, for restoring the first user information 431 illustrated in FIG. 8A. In step S2108, the user information management unit 1602 of the body 112B transmits the acquired user information to the restoration information management unit 515 of the operating unit 111B.

In step S2109, the restoration information management unit 515 of the operating unit 111B stores the user information acquired from the body 112B to be included in the first user information 431 stored in the volatile storage unit 430 by the authentication information storage unit A 423.

Next, another example of the user information acquisition process for a case where the master of the user information is the authentication server 120 will now be described.

Figure 28:
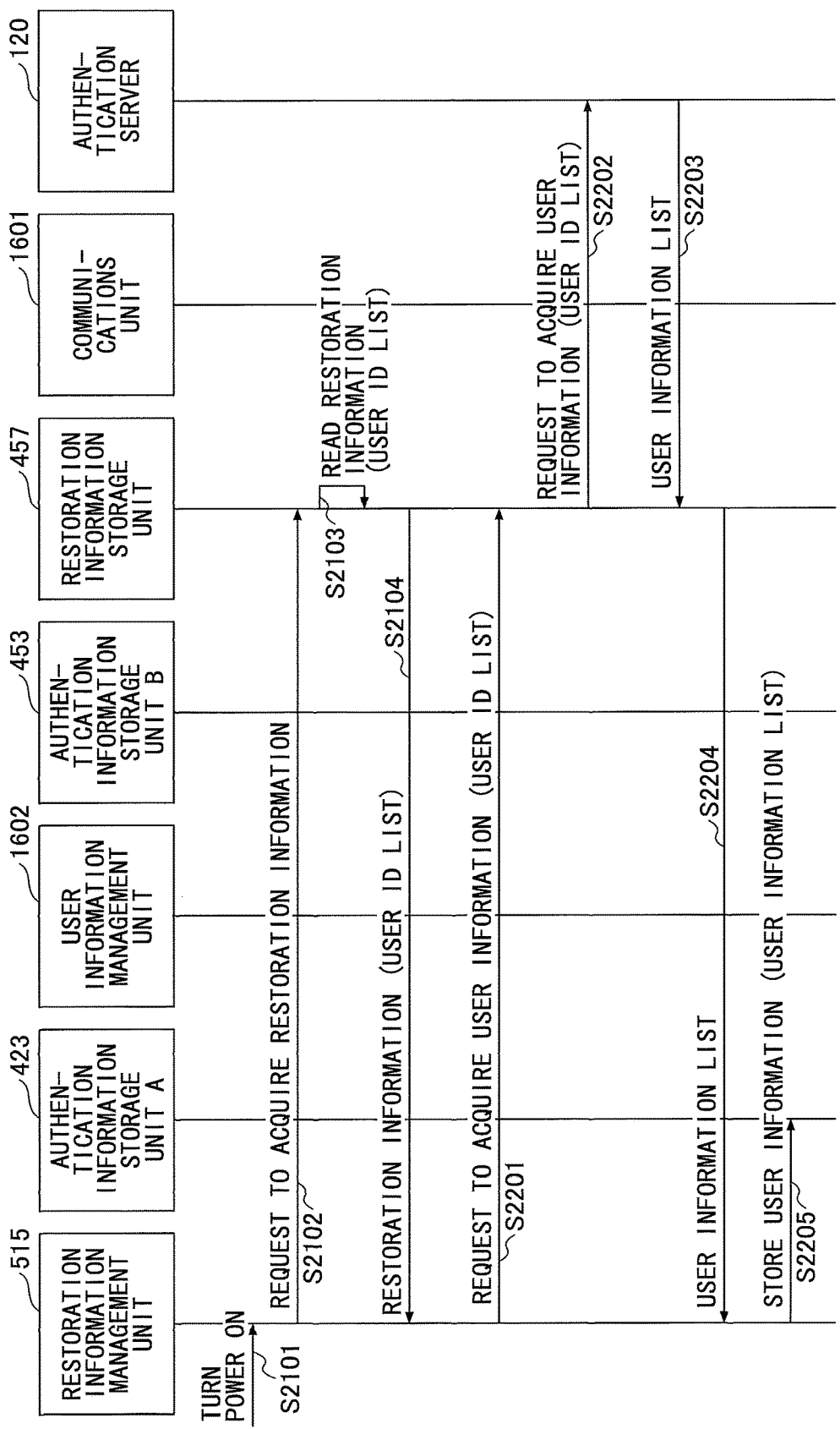
FIG. 28 is a sequence diagram illustrating another example of the user information acquisition process according to the third embodiment.

FIG. 28 is a sequence diagram illustrating another example of the user information acquisition process according to the third embodiment. Note that, steps S2101-S2104 in FIG. 28 are the same as steps S2101-S2104 of FIG. 27. Therefore, mainly the points different from the process illustrated in FIG. 27 will now be described.

In steps S2201 and S2202, the restoration information management unit 515 of the operating unit 111B transmits the user information acquisition request including the list of user IDs to the authentication server 120 through the communications unit 1601.

In steps S2203 and S2204, the restoration information processing unit 524 of the body 112B receives the user information list from the authentication server 120 through the communications unit 1601.

In step S2205, the restoration information management unit 515 of the operating unit 111B stores the user information list acquired from the authentication server 120 as the first user information 431 stored in the volatile storage unit 430 by the authentication information storage unit A 423.

Next, in the same way as the second embodiment described above, yet another example of the user information acquisition process for a case where the restoration information is the same as the first user information will be described.

Figure 29:
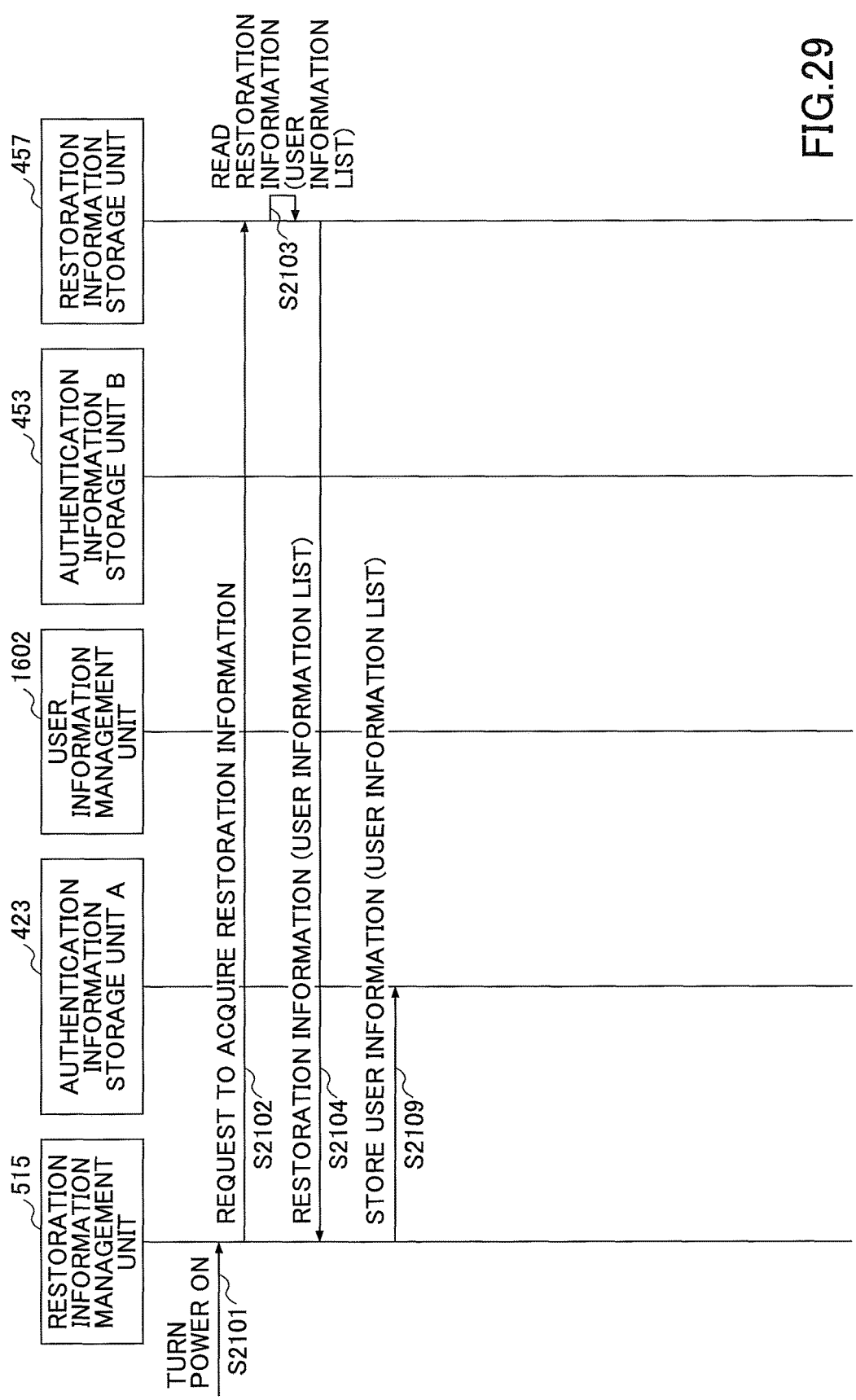
FIG. 29 is a sequence diagram illustrating yet another example of the user information acquisition process according to the third embodiment.

FIG. 29 is a sequence diagram illustrating yet another example of the user information acquisition process according to the third embodiment. Note that, steps S2101 and S2102 illustrated in FIG. 29 are the same as steps S2101 and S2102 illustrated in FIG. 27. Therefore, mainly the points different from the process illustrated in FIG. 21 will now be described.

In step S2103, the restoration information storage unit 457 reads the restoration information 462 stored in the nonvolatile storage unit 460. Note that, here, the restoration information 462 includes, for example, the information for the plurality of users (the user information list) as illustrated in FIG. 20B stored as the first user information 431.

In step S2104, the restoration information storage unit 457 of the body 112B transmits the read restoration information 462 to the restoration information management unit 515 of the operating unit 111B.

In step S2109, the restoration information management unit 515 of the operating unit 111B stores the user information list acquired from the restoration information storage unit 457 of the body 112B as the first user information 431 stored in the volatile storage unit 430 by the authentication information storage unit A 423.

Thus, according to the image forming apparatus 110B in the third embodiment, it is possible to carry out the same process as the first embodiment using an application of the operating unit 111B without using an application of the body 112B.

Fourth Embodiment

Figure 30:
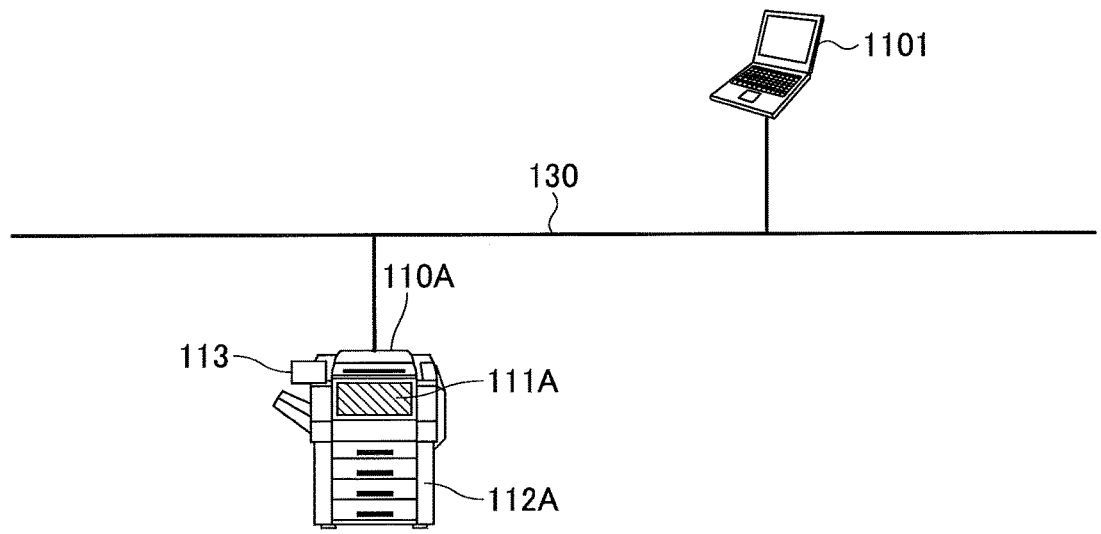
FIG. 30 illustrates one example of a configuration of an authentication system according to a fourth embodiment.

FIG. 30 illustrates one example of a configuration of an authentication system according to a fourth embodiment of the present invention. In FIG. 30, the authentication system 1100 includes the image forming apparatus 110A and an administrator terminal 1101 connected with the image forming apparatus 110A via a network 130.

According to the fourth embodiment, the image forming apparatus 110A does not use the authentication server 120, and uses the administrator terminal 1101 to register the second user information with the nonvolatile storage unit 460 of the body 112.

<Functional Configuration>

Figure 31:
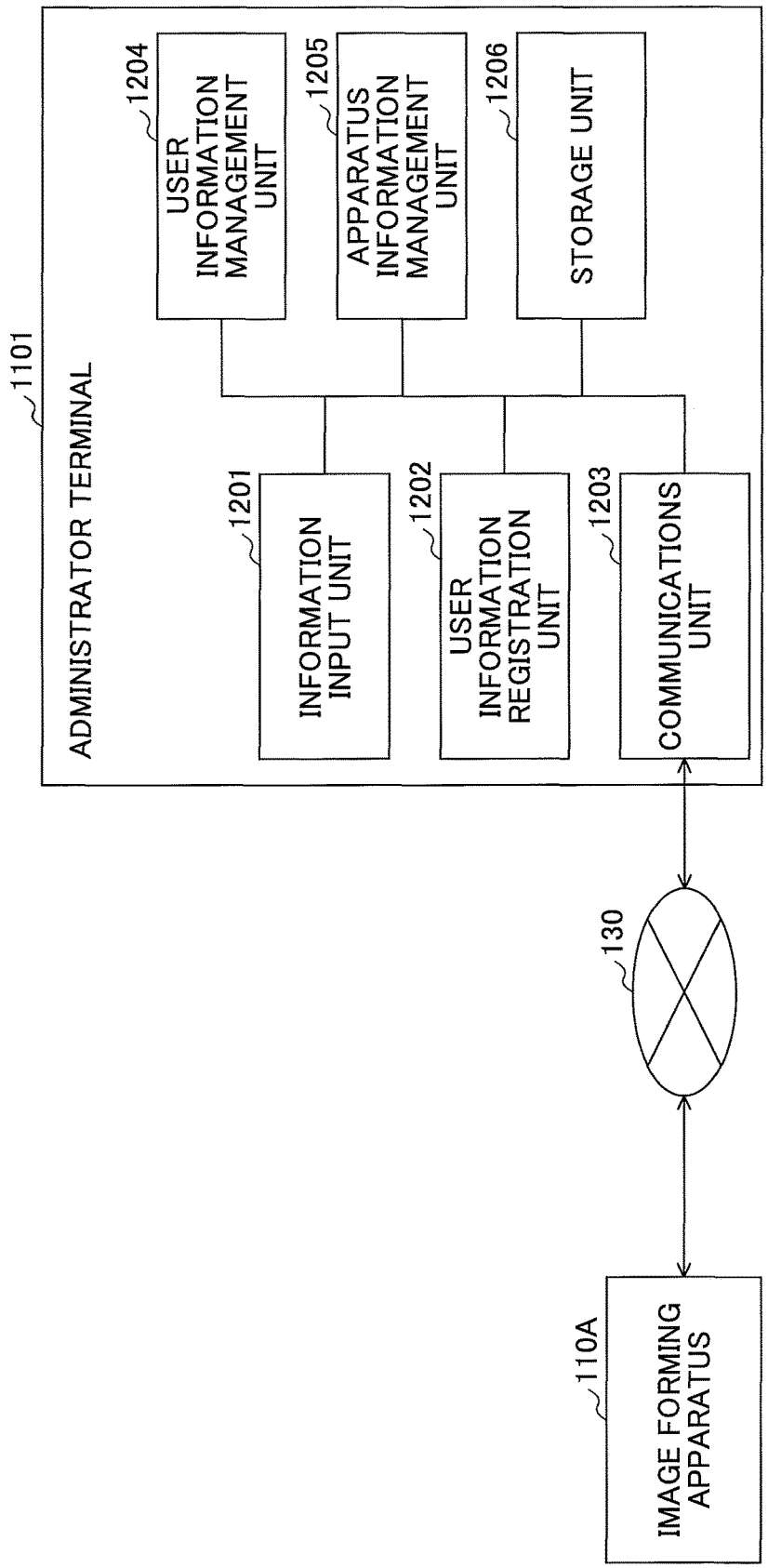
FIG. 31 is a functional configuration diagram of an administrator terminal according to the fourth embodiment.

FIG. 31 is a functional configuration diagram of the administrator terminal 1101 according to the fourth embodiment.

Note that the image forming apparatus 110A may be the same as the image forming apparatus 110A according to the variant of the first embodiment described above using FIGS. 5 and 7B, and so forth.

The administrator terminal (an information terminal) 1101 is, for example, an information processing apparatus having a configuration of the common computer 300 illustrated in FIG. 3, or the like.

The administrator terminal 1101 executes an application (a management tool) prepared for the administrator terminal 1101, to implement an information input unit 1201, a user information registration unit 1202, a communications unit 1203, a user information management unit 1204, an apparatus information management unit 1205, and a storage unit 1206.

The information input unit 1201 displays an input screen page, for example, for inputting the user information, for example, as illustrated in FIG. 8A or 8D on the display device 307, to receive the user information that is input by the administrator.

Also, the information input unit 1201 displays a registration screen page for registering information (a host name, an IP address, or the like) unique to the image forming apparatus 110A in which the user information will be set, on the display device 307, to receive apparatus information that is input by the administrator.

The user information registration unit 1202 registers the user information having been input from the information input unit 1201 through an operation performed by the administrator with the image forming apparatus 110A.

The communications unit 1203 connects the administrator terminal 1101 to the network 130, and carries out communications with the image forming apparatus 110A.

The user information management unit 1204 stores the user information that is input from the information input unit 1201 in the storage unit 1206, and manages the stored user information.

The apparatus information management unit 1205 stores the apparatus information that is input from the information input unit 1201 in the storage unit 1206, and manages the stored apparatus information.

The storage unit 1206 stores the user information, the apparatus information, and so forth.

<Process Flow>

(User Information Registration Process)

Figure 32:
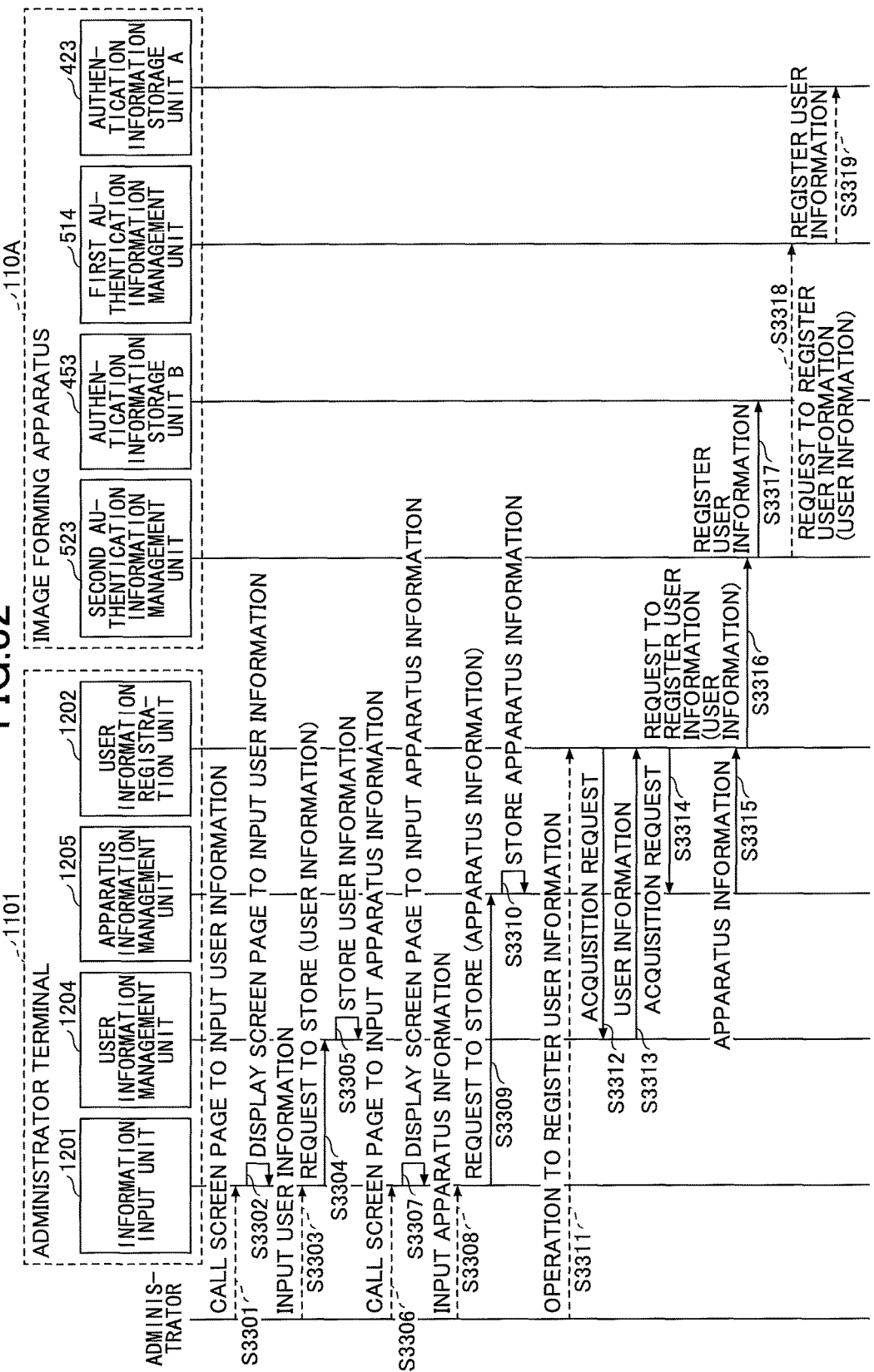
FIG. 32 is a sequence diagram illustrating one example of a user information registration process according to the forth embodiment.

FIG. 32 is a sequence diagram illustrating one example of a user information registration process according to the forth embodiment.

In step S3301, when the administrator performs operation to call the user information input screen page, for example, as illustrated in FIG. 33A, the user information input screen page 1410 is displayed on the display device 307 of the administrator terminal 1101 in step S3302.

In step S3303, the administrator inputs information (i.e., the user information) from the user information input screen page 1410, and selects the "OK" button 1411. Thus, the user information is input.

In step S3304, the information input unit 1201 receives the thus input user information, and requests the user information management unit 1204 to store the received user information.

In step S3305, the user information management unit 1204 stores the requested user information in the storage unit 1206. As a result, for example, as illustrated in FIG. 33B, a user information list screen page 1420 of an administrator tool displays the user name of the registered user.

Note that if the user information of a plurality of users will be registered steps S3301-S3305 are repeated, for example.

Figure 34A:
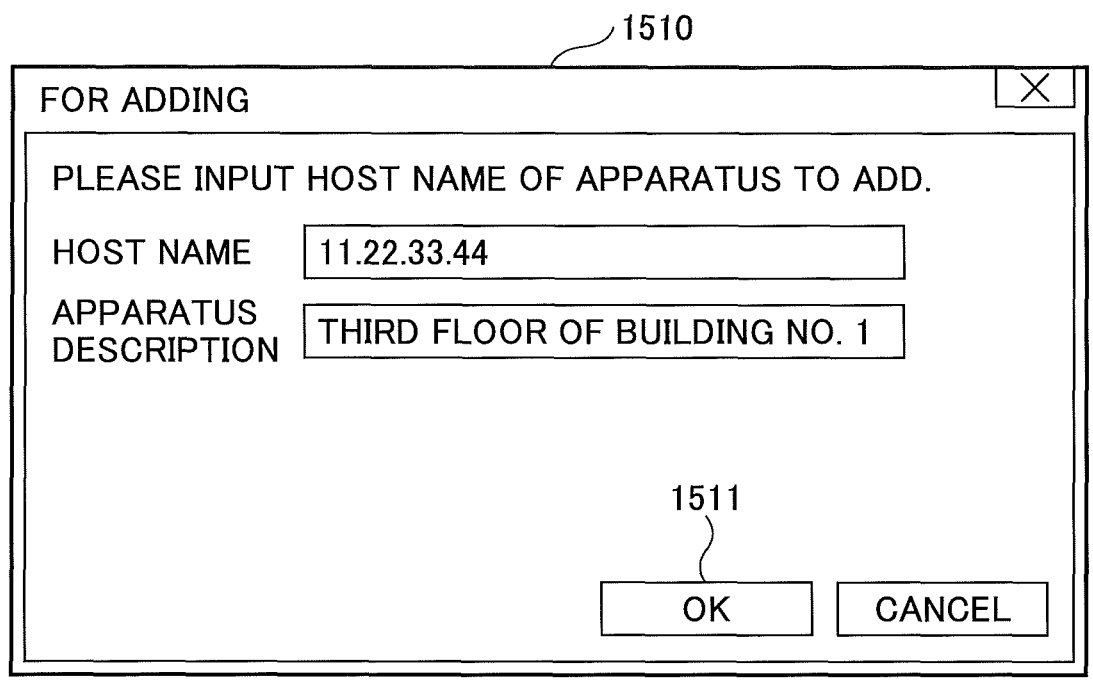
FIGS. 34A and 34B illustrate an example of apparatus information input screen pages according to the fourth embodiment.

In step S3306, if the administrator performs an operation to call an apparatus information input screen page, the apparatus information input screen page 1510 such as that illustrated in FIG. 34A, for example, is displayed on the display device 307 of the administrator terminal 1101 in step S3307.

In step S3308, the administrator inputs information (the host name, the IP address, or the like) from the apparatus information input screen page 1510, and selects the "OK" button 1511. Thus, apparatus information is input.

In step S3309, the information input unit 1201 receives the thus input apparatus information, and requests the apparatus information management unit 1205 to store the thus input apparatus information.

In step S3310, the apparatus information management unit 1205 stores the requested apparatus information in the storage unit 1206. As a result, for example, as illustrated in FIG. 34B, an apparatus list screen page 1520 of a management tool displays information 1521 of the thus registered image forming apparatus 110A.

Note that, if the apparatus information of a plurality of image forming apparatuses is registered, steps S3306-S3310 are repeated, for example.

Figure 34B:
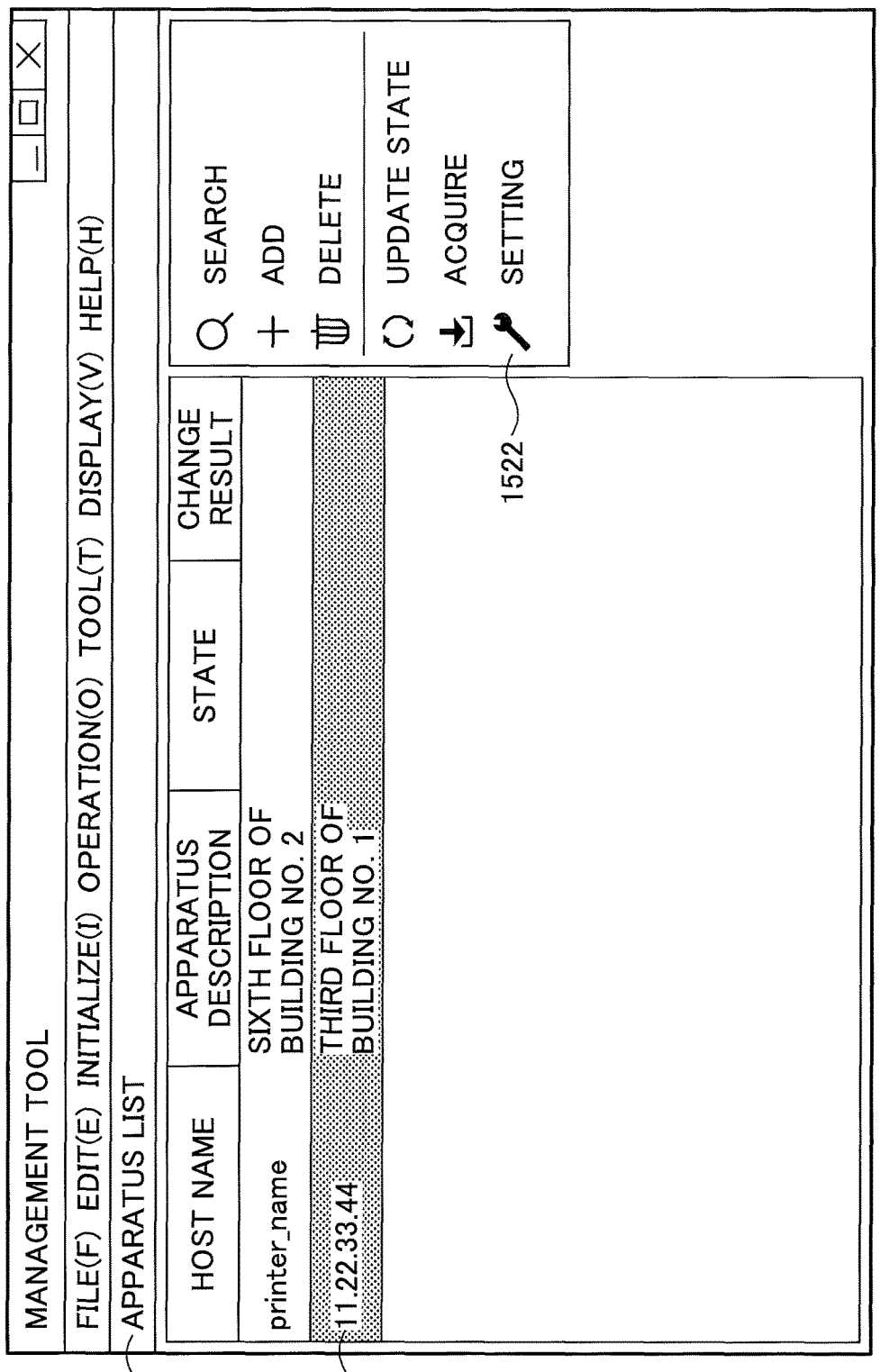

In step S3311, from the apparatus list screen page 1520 of the management tool illustrated in FIG. 34B, the administrator performs a registration operation by selecting the image forming apparatus 110 with which the user information will be registered, and selecting the "setting" button 1522.

In steps S3312 and S3313, the user information registration unit 1202 acquires the user information stored in the storage unit 1206 by the user information management unit 1204.

In steps S3314 and S3315, the user information registration unit 1202 acquires the apparatus information stored in the storage unit 1206 by the apparatus information management unit 1205.

In step S3316, the user information registration unit 1202 transmits, to the image forming apparatus 110A selected by the administrator, a user information registration request requesting registration of the user information.

In step S3316, the second authentication management unit 523 of the image forming apparatus 110A receives the user information registration request transmitted from the administrator terminal 1101.

In step S3317, the second authentication management unit 523 registers (stores) the user information included in the user information registration request to be included in the second user information 461 stored in the nonvolatile storage unit 460 by the authentication information storage unit B 453.

It is desired that, in step S3318, the second authentication management unit 523 transmits the user information registration request requesting registration the user information included in the user information registration request to the first authentication information management unit 514 of the operating unit 111A.

In step S3319, the first authentication information management unit 514 of the operating unit 111A registers (sores) the user information included in the user information registration request to be included in the first user information 431 stored in the volatile storage unit 430 by the authentication information storage unit A 423.

Note that, steps S3318 and S3319 may be omitted.

(Process of Body of Image Forming Apparatus)

In the authentication process of the image forming apparatus 110A according to the fourth embodiment, the process the same as the process in the variant of the first embodiment illustrated in FIGS. 10, 12 and 14 is carried out, if the card ID that is read from the IC card has been included in the stored first user information of the operating unit 111A or the second user information of the body 112A.

Figure 35:
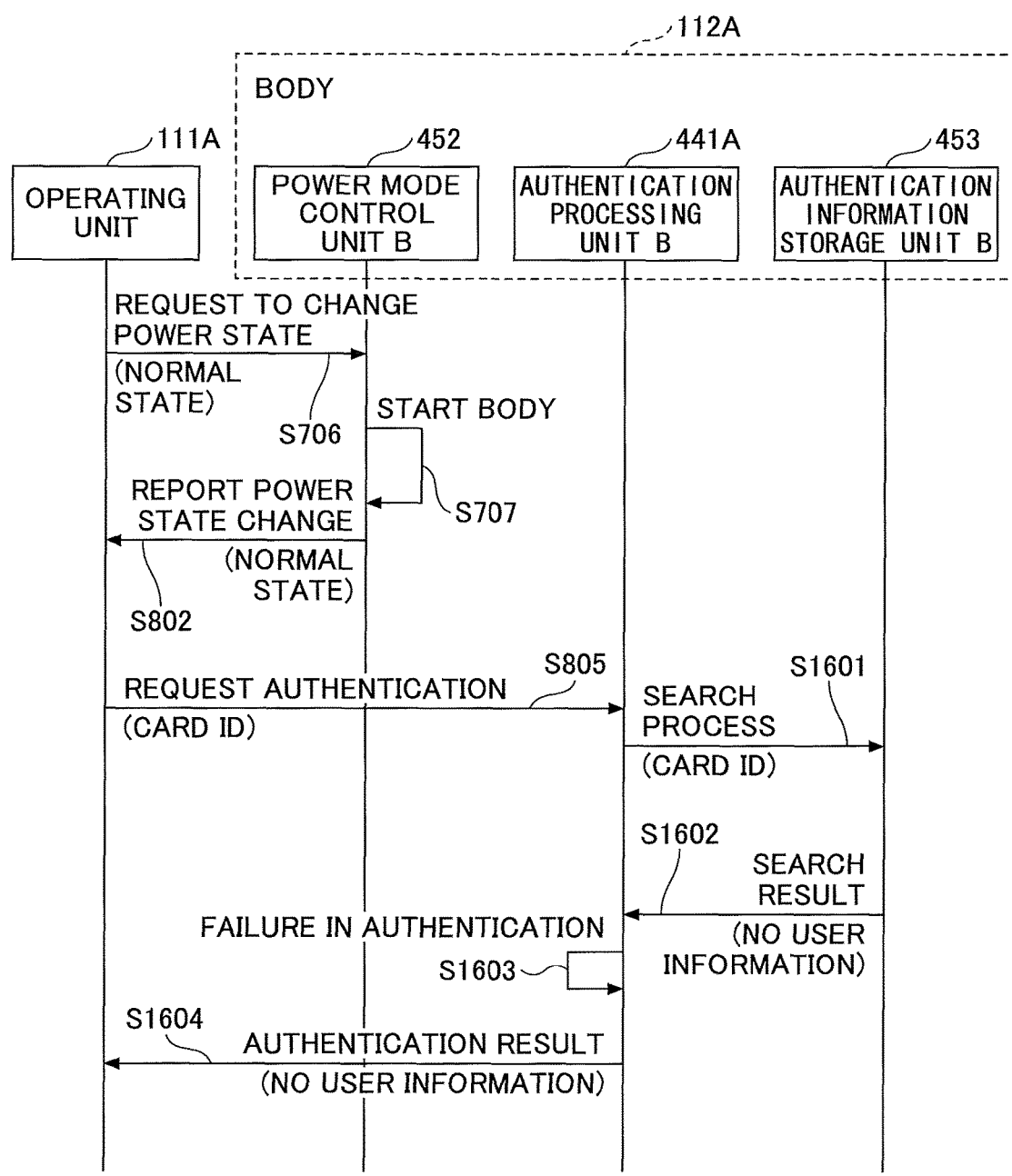
FIG. 35 is a sequence diagram illustrating one example of a process of a body according to the fourth embodiment.

On the other hand, if the card ID that is read from the IC card has been included in neither the stored first user information of the operating unit 111A nor the stored second user information of the body 112A, the body 112A carries out a process of FIG. 35.

FIG. 35 is a sequence diagram illustrating one example of a process of the body according to the fourth embodiment. This process is one example of a process carried out when the card ID that is read from the IC card has been included in neither the stored first user information of the operating unit 111A nor the stored second user information of the body 112A.

Note that, steps S706-S805 other than steps S1601-S1604 of FIG. 35 are the same as steps S706-S805 according to the variant of the first embodiment illustrated in FIG. 16. Therefore, mainly the points different from the variant of the first embodiment illustrated in FIG. 16 will now be described.

In steps S1601 and S1602, the second authentication unit 521 of the authentication processing unit B 441A authenticates (second authentication) the card ID included in the authentication request received from the operating unit 111A.

For example, in step S1601, the second authentication unit 521 searches, for example, the mapping table 461a illustrated in FIG. 8B, using the card ID included in the authentication request as a key.

Here, as described above, the card ID of the user's IC card is not included in the stored second user information 461, and therefore, in step S1602, the search result indicating that no user information corresponding to the card ID is present (i.e., the second authentication is failed in) is acquired.

In step S1603, the authentication processing unit B 441A according to the fourth embodiment determines that the authentication is failed in without requesting the authentication server 120 to carry out authentication.

In step S1604, the authentication processing unit B 441A transmits the authentication result indicating that there is no user information corresponding to the card ID (i.e., the second authentication is failed in) to the operating unit 111A.

Thus, according to the fourth embodiment, it is possible to acquire the same advantageous effects as the variant of the first embodiment in the image forming apparatus 110A even without using the authentication server 120.

Fifth Embodiment

The fourth embodiment described above may be combined with the variant of the first embodiment also described above.

Figure 36:
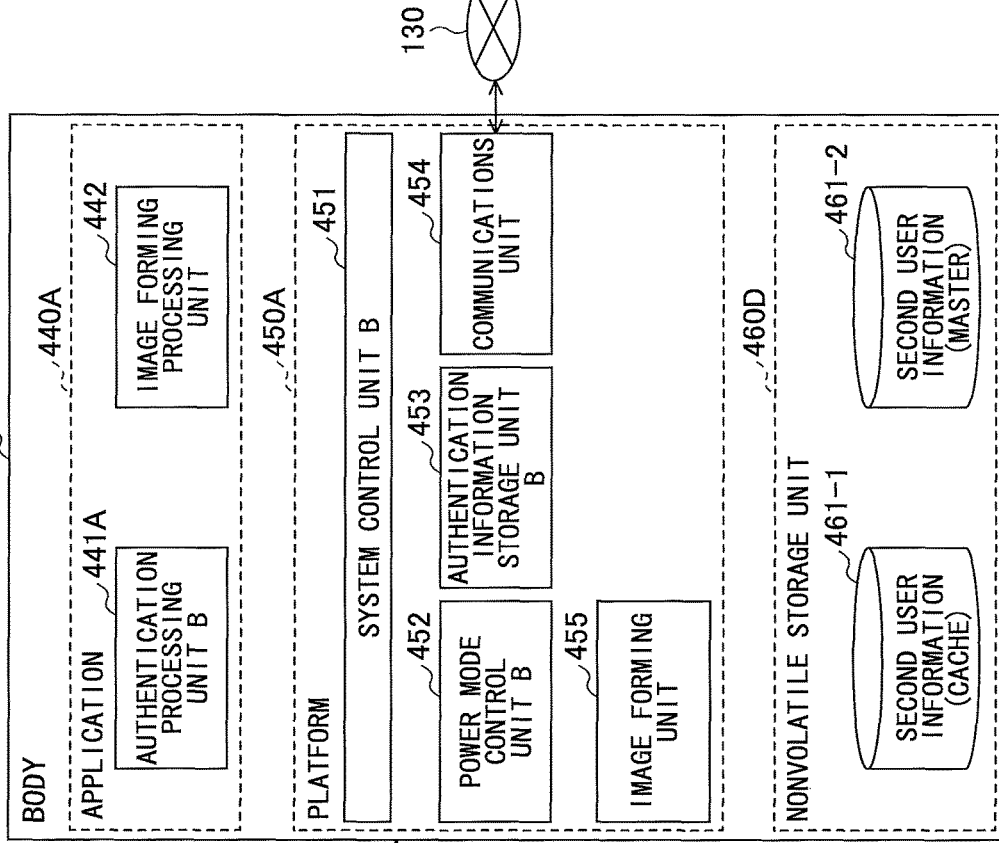
FIG. 36 is a functional configuration diagram of an image forming apparatus according to a fifth embodiment.

FIG. 36 is a functional configuration diagram of an image forming apparatus according to a fifth embodiment of the present invention. In FIG. 36, the image forming apparatus 110D includes, instead of the second user information 461 according to the variant of the first embodiment illustrated in FIG. 5, a second user information (cache) 461-1 and a second user information (master) 461-2.

The second user information (cache) 461-1 is used as the second user information 461 according to the variant of the first embodiment. The second user information (master) 461-2 includes the user information registered by the administrator terminal 1101 according to the fourth embodiment.

According to the fifth embodiment, when the second authentication unit 521 of the body 112A will carry out the second authentication, each of the second user information (cache) 461-1 and the second user information (master) 461-2 is searched with the use of the card ID as a key.

As a result, even if, for example, a temporary user is not registered with the authentication server 120 which is managed by the entirety of the company, the administrator of the image forming apparatus 110A can locally register the temporary user to be included in the second user information (master) 461-2 from the administrator terminal 1101.

Also, in the same way as the variant of the first embodiment, it is possible to authenticate a user by using the latest user information registered with the authentication server 120.

According to the above-described embodiments, in an authentication system where a user of an electronic apparatus that enters a power saving state is authenticated, it is possible to shorten a time for the authentication when the electronic apparatus has been in the power saving state.

According to one aspect, an authentication system includes a process-carrying-out apparatus carrying out a process and an operating apparatus connected with the process-carrying-out apparatus, wherein the operating apparatus includes one or more processors configured to: store first user information including authentication information of one or more users permitted to use the process-carrying-out apparatus in a volatile storage unit of the operating apparatus; acquire authentication information of a user of the process-carrying-out apparatus; in response to acquiring the authentication information of the user of the process-carrying-out apparatus, return a state of the process-carrying-out apparatus from a power saving state into a normal state, the normal state being a state of being able to carry out the process and the power saving state being a state of consuming power less than the normal state; carry out first authentication of the user of the process-carrying-out apparatus based on the acquired authentication information of the user of the process-carrying-out apparatus and the first user information; permit the user of the process-carrying-out apparatus to use the process-carrying-out apparatus if the first authentication is successful; store information of the user who has been permitted to use the process-carrying-out apparatus to be included in the first user information; store, in a nonvolatile storage unit of the process-carrying-out apparatus, restoration information to be used to restore the first user information, and, when power supply is turned on in the operating apparatus, use the restoration information to restore the first user information.

According to another aspect, the restoration information includes information for identifying the users who are included in the first user information.

According to yet another aspect, the process-carrying-out apparatus includes one or more processors configured to: store, in the nonvolatile storage unit of the process-carrying-out apparatus, second user information including authentication information of one or more previously registered users; and, when power supply is turned on in the operating apparatus, acquire information of the users who are identified by the information for identifying the users from the second user information, and store the acquired information to be included in the first user information.

According to yet another aspect, the one or more processors of the operating apparatus are further configured to: communicate with an external server which stores third user information including authentication information of previously registered one or more users; and, when power supply is turned on in the operating apparatus, acquire information of the users who are identified by the information for identifying the users from the external server, and store the acquired information to be included in the first user information.

According to yet another aspect, the one or more processors of the operating apparatus are further configured to: after storing the information of the user who has been permitted to use the process-carrying-out apparatus to be included in the first user information, generate the corresponding restoration information, and store the generated restoration information in the nonvolatile storage unit of the process-carrying-out apparatus.

According to yet another aspect, the information for identifying the users is a list of identification information of the users who are included in the first user information.

According to yet another aspect, the one or more processors of the process-carrying-out apparatus are further configured to: in response to a request from the operating apparatus, store the information of the user who has been permitted to use the process-carrying-out apparatus to be included in the restoration information stored in the nonvolatile storage unit; and the one or more processors of the operating apparatus are further configured to: after storing the information of the user who has been permitted to use the process-carrying-out apparatus to be included in the first user information, cause the one or more processors of the process-carrying-out apparatus to store the information of the user who has been permitted to use the process-carrying-out apparatus to be included in the restoration information stored in the nonvolatile storage unit.

According to yet another aspect, the one or more processors of the operating apparatus are further configured to: when power supply is turned on in the operating apparatus, acquire the restoration information stored in the nonvolatile storage unit of the process-carrying-out apparatus, and store the acquired information to be included in the first user information.

According to yet another aspect, the one or more processors of the operating apparatus are further configured to: if the first authentication is not successful, request the process-carrying-out apparatus to carry out second authentication of the authentication information of the user of the process-carrying-out apparatus; and, if the second authentication is successful, permit the user to use the process-carrying-out apparatus.

According to yet another aspect, the one or more processors of the process-carrying-out apparatus are further configured to: store, in the nonvolatile storage unit, second user information including authentication information of previously registered one or more users; in response to a request from the operating apparatus, carries out the second authentication of the authentication information of the user of the process-carrying-out apparatus based on the authentication information of the user of the process-carrying-out apparatus and the second user information; and, if the use of the process-carrying-out apparatus is permitted, store the information of the user who has been permitted to use the process-carrying-out apparatus to be included in the second user information.

According to yet another aspect, the one or more processors of the operating apparatus are further configured to, if the second authentication is not successful, request an external server connected via a network to carry out third authentication of the authentication information of the user of the process-carrying-out apparatus; and, if the third authentication is successful, permit the user to use the process-carrying-out apparatus.

According to yet another aspect, the one or more processors of the operating apparatus are further configured to: acquire, from the external server, the user information of the user corresponding to the authentication information with which the third authentication is successful.

According to yet another aspect, the first user information includes identification information of the one or more users who have been permitted to use the process-carrying-out apparatus and the authentication information corresponding to the users.

According to yet another aspect, the first user information includes dates and times at which the authentication information of the one or more users who have been permitted to use the process-carrying-out apparatus is stored; and the one or more processors of the operating apparatus are further configured to: if the number of records of the first user information has reached a limit of storing the first user information, delete records of the first user information from a record of the first user information having the oldest date and time at which the corresponding authentication information was stored.

According to yet another aspect, an authentication apparatus communicatable with the operating apparatus is used, and the one or more processors of the operating apparatus are further configured to: acquire, from the authentication apparatus, the authentication information of the user of the process-carrying-out apparatus.

According to yet another aspect, the authentication apparatus is an IC card reading device configured to read, from an IC card, identification information of the IC card.

According to yet another aspect, the one or more processors of the operating apparatus are further configured to: start the first authentication before a completion of a start-up of the process-carrying-out apparatus.

According to yet another aspect, an operating apparatus is connected to a process-carrying-out apparatus carrying out a process, and displays an operation screen page for the process-carrying-out apparatus. The operating apparatus includes one or more processors configured to: store first user information including authentication information of one or more users permitted to use the process-carrying-out apparatus in a volatile storage unit of the operating apparatus; acquire authentication information of a user of the process-carrying-out apparatus; in response to acquiring the authentication information of the user of the process-carrying-out apparatus, return a state of the process-carrying-out apparatus from a power saving state into a normal state, the normal state being a state of being able to carry out the process and the power saving state being a state of consuming power less than the normal state; carry out first authentication of the user of the process-carrying-out apparatus based on the acquired authentication information of the user of the process-carrying-out apparatus and the first user information; permit the user of the process-carrying-out apparatus to use the process-carrying-out apparatus if the first authentication is successful; store information of the user who has been permitted to use the process-carrying-out apparatus to be included in the first user information; store, in a nonvolatile storage unit of the process-carrying-out apparatus, restoration information to be used to restore the first user information, and, when power supply is turned on in the operating apparatus, use the restoration information to restore the first user information.

According to yet another aspect, a program, when executed by a computer as an operating apparatus that is connected to a process-carrying-out apparatus carrying out a process, and displays an operation screen page for the process-carrying-out apparatus. The program causes the operating apparatus to: store first user information including authentication information of one or more users permitted to use the process-carrying-out apparatus in a volatile storage unit of the operating apparatus; acquire authentication information of a user of the process-carrying-out apparatus; in response to acquiring the authentication information of the user of the process-carrying-out apparatus, return a state of the process-carrying-out apparatus from a power saving state into a normal state, the normal state being a state of being able to carry out the process and the power saving state being a state of consuming power less than the normal state; carry out first authentication of the user of the process-carrying-out apparatus based on the acquired authentication information of the user of the process-carrying-out apparatus and the first user information; permit the user of the process-carrying-out apparatus to use the process-carrying-out apparatus if the first authentication is successful; store information of the user who has been permitted to use the process-carrying-out apparatus to be included in the first user information; store, in a nonvolatile storage unit of the process-carrying-out apparatus, restoration information to be used to restore the first user information, and, when power supply is turned on in the operating apparatus, use the restoration information to restore the first user information.

According to yet another aspect, an authentication method is carried out by an authentication system that includes a process-carrying-out apparatus carrying out a process and an operating apparatus connected to the process-carrying-out apparatus. The operating apparatus which stores first user information including authentication information of one or more users permitted to use the process-carrying-out apparatus in a volatile storage unit of the operating apparatus acquires authentication information of a user of the process-carrying-out apparatus; in response to acquiring the authentication information of the user of the process-carrying-out apparatus, returns a state of the process-carrying-out apparatus from a power saving state into a normal state, the normal state being a state of being able to carry out the process and the power saving state being a state of consuming power less than the normal state; carries out first authentication of the user of the process-carrying-out apparatus based on the acquired authentication information of the user of the process-carrying-out apparatus and the first user information; permits the user of the process-carrying-out apparatus to use the process-carrying-out apparatus if the first authentication is successful; store information of the user who has been permitted to use the process-carrying-out apparatus to be included in the first user information; stores, in a nonvolatile storage unit of the process-carrying-out apparatus, restoration information to be used to restore the first user information, and, when power supply is turned on in the operating apparatus, uses the restoration information to restore the first user information.

The authentication systems, the operating apparatuses, and the authentication methods have been described in the embodiments. However, embodiments are not limited to the above-described embodiments, and various modifications and replacements may be made.

What is claimed is:

1. An authentication system comprising a process-carrying-out apparatus configured to carry out a process and an operating apparatus connected with the process-carrying-out apparatus, wherein
the process-carrying-out apparatus includes:
a non-volatile hardware memory; and
one or more hardware processors configured to:
perform the process;
store second user information including authentication information of one or more previously registered users, in the non-volatile hardware memory included in the process-carrying out apparatus;
receive, from the operating apparatus, a request to return from a power saving state to a normal state, the normal state being a state of being able to perform the process and the power saving state being a state of consuming less power than the normal state;
return to the normal state in response to the received request; and
send, after returning to the normal state, a power supply state change report indicating that the process-carrying-out apparatus has returned to the normal state, to the operating apparatus;
the operating apparatus includes:
a hardware display;
a volatile hardware memory; and
one or more hardware processors configured to:
store first user information including authentication information of one or more users permitted to use the process-carrying-out apparatus in the volatile hardware memory included in the operating apparatus;
acquire authentication information of a user of the process-carrying-out apparatus;
in response to acquiring the authentication information of the user of the process-carrying-out apparatus, request a return of the state of the process-carrying-out apparatus from the power saving state to the normal state;
receive, from the processing-carrying-out apparatus, the power supply state change report indicating that the process-carrying-out apparatus has returned to the normal state;
carry out first authentication of the user of the process-carrying-out apparatus based on the acquired authentication information of the user of the process-carrying-out apparatus, by searching the first user information stored in the volatile hardware memory included in the operating apparatus;
if the first authentication is not successful, after receiving the power supply state change report from the process-carrying-out apparatus, request the process-carrying-out apparatus to carry out second authentication of the acquired authentication information of the user of the process-carrying-out apparatus, the acquired authentication information being the same authentication information on which the first authentication was based, by the process-carrying-out apparatus searching the second user information stored in the non-volatile hardware memory included in the process-carrying-out apparatus;
if the first authentication or the second authentication is successful, permit the use of the process-carrying-out apparatus; and
if the use of the process-carrying-out apparatus is permitted, store the authentication information of the user who has been permitted to use the process-carrying-out apparatus to be included in the first user information; and
the carrying out of the first authentication of the user of the process-carrying-out apparatus based on the acquired authentication information of the user of the process-carrying-out apparatus, by searching the first user information stored in the volatile hardware memory included in the operating apparatus, is performed before receiving the power supply state change report from the process-carrying-out apparatus.

2. The authentication system according to claim 1, wherein
the process-carrying-out apparatus comprises one or more processors configured to:
in response to the request from the operating apparatus, carries out the second authentication of the acquired authentication information of the user of the process-carrying-out apparatus based on the acquired authentication information of the user of the process-carrying-out apparatus and the second user information; and
if the use of the process-carrying-out apparatus is permitted, store the authentication information of the user who has been permitted to use the process-carrying-out apparatus to be included in the second user information.

3. The authentication system according to claim 2, wherein
the one or more processors of the operating apparatus are further configured to:
if the second authentication is not successful, request an external server connected via a network to carry out third authentication of authentication information of the user of the process-carrying-out apparatus; and
if the third authentication is successful, permit the user to use the process-carrying-out apparatus.

4. The authentication system according to claim 3, wherein
the one or more processors of the operating apparatus are further configured to:
acquire, from the external server, the user information of the user corresponding to the authentication information with which the third authentication is successful.

5. The authentication system according to claim 1, wherein
the first user information includes identification information of the one or more users who have been permitted to use the process-carrying-out apparatus, and the authentication information corresponding to the users.

6. The authentication system according to claim 1, wherein
the first user information includes dates and times at which the authentication information of the one or more users who have been permitted to use the process-carrying-out apparatus is stored; and
the one or more processors of the operating apparatus are further configured to:
if the number of records of the first user information has reached a limit of storing the first user information, delete records of the first user information from a record of the first user information having the oldest date and time at which the corresponding authentication information was stored.

7. The authentication system according to claim 2, wherein
the second user information includes first correspondence information including identification information of the previously registered one or more users and the authentication information corresponding to the users.

8. The authentication system according to claim 7, wherein
the second user information includes second correspondence information including identification information of the users and accompanying information of the users.

9. The authentication system according to claim 8, wherein
the accompanying information includes destination information of the users and latest updated date and time information.

10. The authentication system according to claim 1, further comprising:
an authentication apparatus communicatable with the operating apparatus, and
the one or more processors of the operating apparatus are further configured to:
acquire, from the authentication apparatus, the authentication information of the user of the process-carrying-out apparatus.

11. The authentication system according to claim 10, wherein
the authentication apparatus is an IC card reading device configured to read, from an IC card, identification information of the IC card.

12. The authentication system according to claim 10, wherein
the authentication apparatus is a biological information reading device configured to acquire biological information of the user.

13. The authentication system according to claim 1, wherein
the one or more processors of the operating apparatus are further configured to:
start the first authentication before a completion of a start-up of the process-carrying-out apparatus.

14. The authentication system according to claim 2, further comprising:
an information terminal connected with the process-carrying-out apparatus via a network and configured to register the second user information with the process-carrying-out apparatus or register the second user information with the operating apparatus.

15. An authentication method for carrying out a process, the method comprising:
causing a process-carrying-out apparatus including a non-volatile hardware memory and one or more hardware processors to:
perform the process;
store second user information including authentication information of one or more previously registered users, in the non-volatile hardware memory included in the process-carrying out apparatus;
receive, from an operating apparatus, a request to return from a power saving state to a normal state, the normal state being a state of being able to perform the process and the power saving state being a state of consuming less power than the normal state;
return to the normal state in response to the received request; and
send, after returning to the normal state, a power supply state change report indicating that the process-carrying-out apparatus has returned to the normal state, to the operating apparatus; and
causing an operating apparatus including a hardware display, a volatile hardware memory, and one or more hardware processors to:
store first user information including authentication information of one or more users permitted to use the process-carrying-out apparatus in the volatile hardware memory included in the operating apparatus;
acquire authentication information of a user of the process-carrying-out apparatus;
in response to acquiring the authentication information of the user of the process-carrying-out apparatus, request a return of the state of the process-carrying-out apparatus from the power saving state to the normal state;
receive, from the processing-carrying-out apparatus, the power supply state change report indicating that the process-carrying-out apparatus has returned to the normal state;
carry out first authentication of the user of the process-carrying-out apparatus based on the acquired authentication information of the user of the process-carrying-out apparatus, by searching the first user information stored in the volatile hardware memory included in the operating apparatus;
if the first authentication is not successful, after receiving the power supply state change report from the process-carrying-out apparatus, request the process-carrying-out apparatus to carry out second authentication of the acquired authentication information of the user of the process-carrying-out apparatus, the acquired authentication information being the same authentication information on which the first authentication was based, by the process-carrying-out apparatus searching the second user information stored in the non-volatile hardware memory included in the process-carrying-out apparatus;
if the first authentication or the second authentication is successful, permit the use of the process-carrying-out apparatus; and
if the use of the process-carrying-out apparatus is permitted, store the authentication information of the user who has been permitted to use the process-carrying-out apparatus to be included in the first user information;
wherein the carrying out of the first authentication of the user of the process-carrying-out apparatus based on the acquired authentication information of the user of the process-carrying-out apparatus, by searching the first user information stored in the volatile hardware memory included in the operating apparatus, is performed before receiving the power supply state change report from the process-carrying-out apparatus.

* * * * *